United States Patent
Knight et al.

(10) Patent No.: US 10,824,690 B2
(45) Date of Patent: Nov. 3, 2020

(54) SYSTEM AND METHOD FOR PROVIDING SELECTABLE DISTRIBUTION OF USER-CUSTOMIZED CONTENT AND RESULTS MEASUREMENT

(71) Applicant: Adams & Knight, Inc., Avon, CT (US)

(72) Inventors: William Francis Knight, Avon, CT (US); Jill Marie Adams, Avon, CT (US); Brian Robert McClear, West Hartford, CT (US); Matthew Splain, Vernon, CT (US)

(73) Assignee: Adams & Knight, Inc., Avon, CT (US)

( * ) Notice: Subject to any disclaimer, the term of this patent is extended or adjusted under 35 U.S.C. 154(b) by 329 days.

(21) Appl. No.: 15/934,003

(22) Filed: Mar. 23, 2018

(65) Prior Publication Data

US 2018/0276226 A1    Sep. 27, 2018

Related U.S. Application Data

(60) Provisional application No. 62/475,673, filed on Mar. 23, 2017.

(51) Int. Cl.
| | | |
|---|---|---|
| G06F 16/958 | (2019.01) | |
| H04L 29/08 | (2006.01) | |
| G06F 16/26 | (2019.01) | |
| G06F 16/9535 | (2019.01) | |

(52) U.S. Cl.
CPC ............ *G06F 16/958* (2019.01); *G06F 16/26* (2019.01); *G06F 16/9535* (2019.01); *H04L 67/22* (2013.01); *H04L 67/306* (2013.01); *H04L 67/32* (2013.01)

(58) Field of Classification Search
CPC .................................................. G06Q 10/06311
USPC ............................ 707/732; 715/202; 705/14
See application file for complete search history.

(56) References Cited

U.S. PATENT DOCUMENTS

| | | |
|---|---|---|
| 8,312,056 B1 | 11/2012 | Peng et al. |
| 8,396,490 B2 | 3/2013 | Platt et al. |
| 9,123,074 B2 | 9/2015 | Jacobs |
| 9,171,289 B2 | 10/2015 | Kraft et al. |
| 9,253,051 B2 | 2/2016 | Phillips et al. |
| 9,495,693 B2 | 11/2016 | Box et al. |
| 9,514,483 B2 | 12/2016 | Chomsky et al. |
| 2005/0033657 A1* | 2/2005 | Herrington ............ G06Q 30/02 705/26.7 |

(Continued)

*Primary Examiner* — Baoquoc N To
(74) *Attorney, Agent, or Firm* — McCormick, Paulding & Huber PLLC

(57) ABSTRACT

A computer-based method and system for automatically distributing digital content includes displaying selectable content items, receiving data from a user a selection of at least one of the content items, displaying selectable distribution channel options for at least the selected content items, receiving from a user a selection of certain of the distribution channel options, and distributing the selected content items to the selected distribution channels. The system may also include a content management system configured to be operated by an administrator, which sets the "look and feel" data and user permissions for a user platform system which receives the user input selections and automatically distributes selected content items to selected distribution channels based on selected schedules, and also measures and ranks results of content items and channels, provides alerts, and can optimize results autonomously or by the user.

15 Claims, 49 Drawing Sheets

(56) References Cited

U.S. PATENT DOCUMENTS

| | | | |
|---|---|---|---|
| 2005/0207432 A1* | 9/2005 | Velez-Rivera | H04M 3/493 370/401 |
| 2008/0209325 A1* | 8/2008 | Suito | G11B 19/025 715/719 |
| 2009/0133090 A1* | 5/2009 | Busse | H04N 7/163 725/132 |
| 2012/0099589 A1* | 4/2012 | Kato | G06F 21/10 370/389 |
| 2016/0212484 A1* | 7/2016 | Kimble | H04N 21/44222 |

* cited by examiner

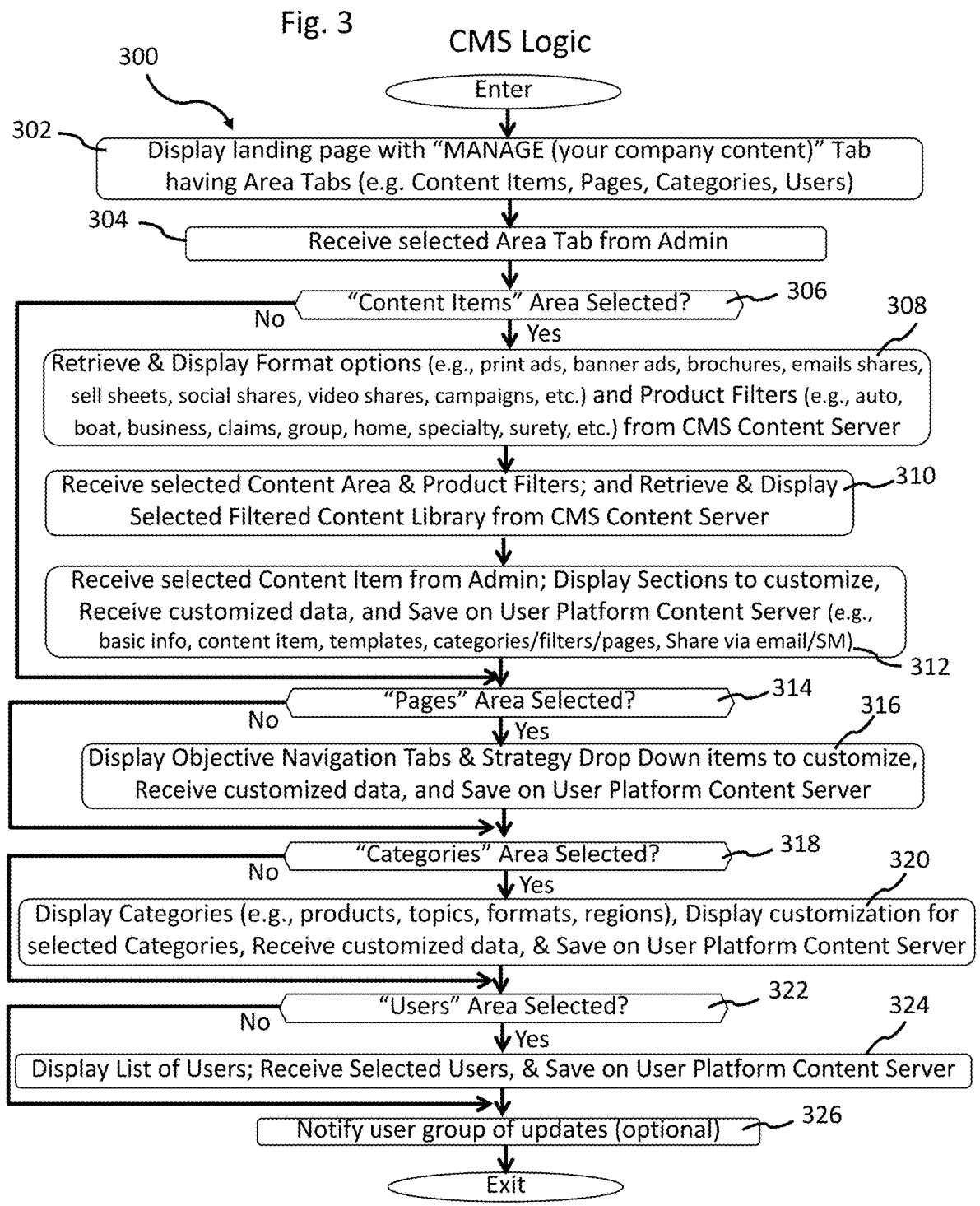

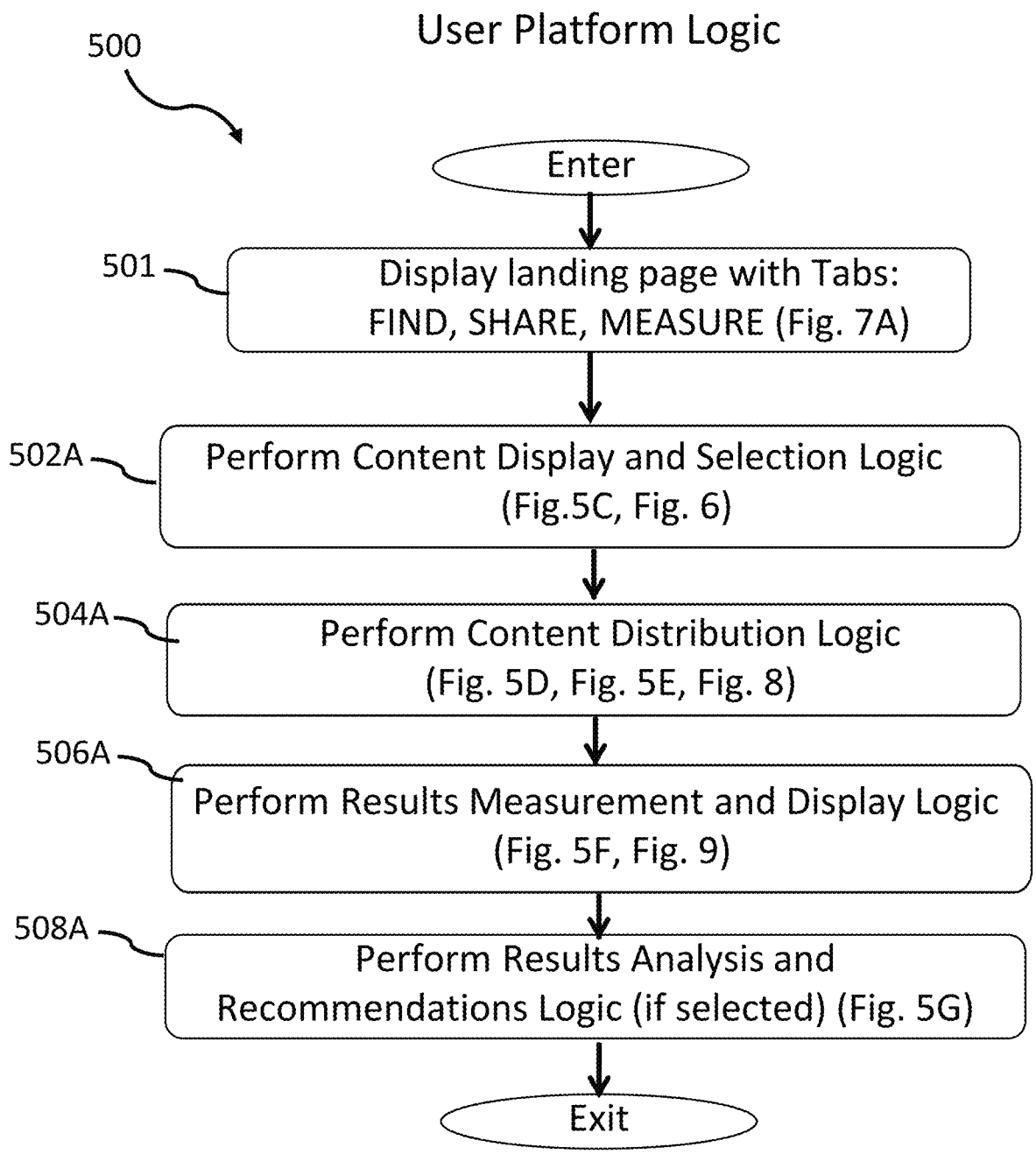

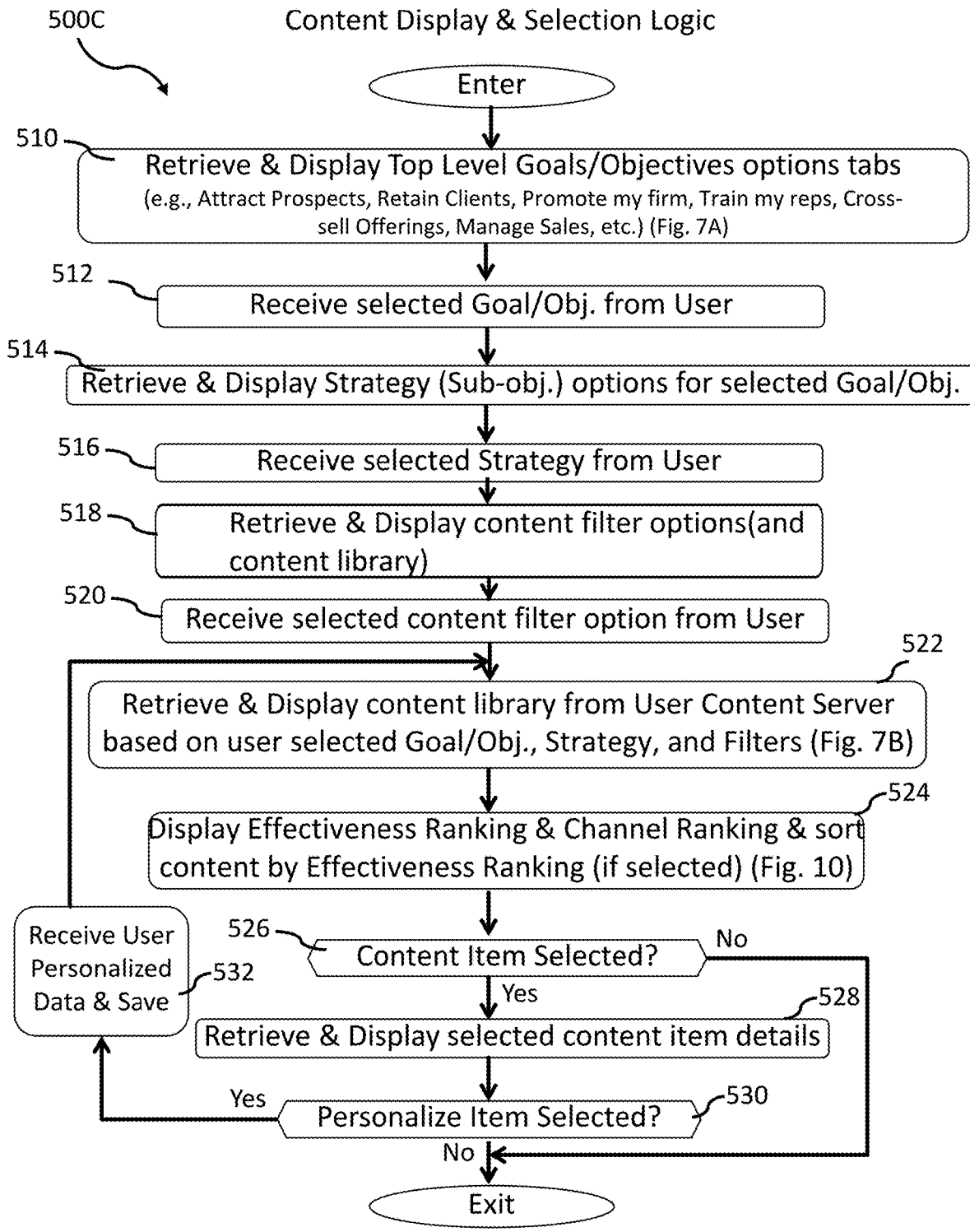

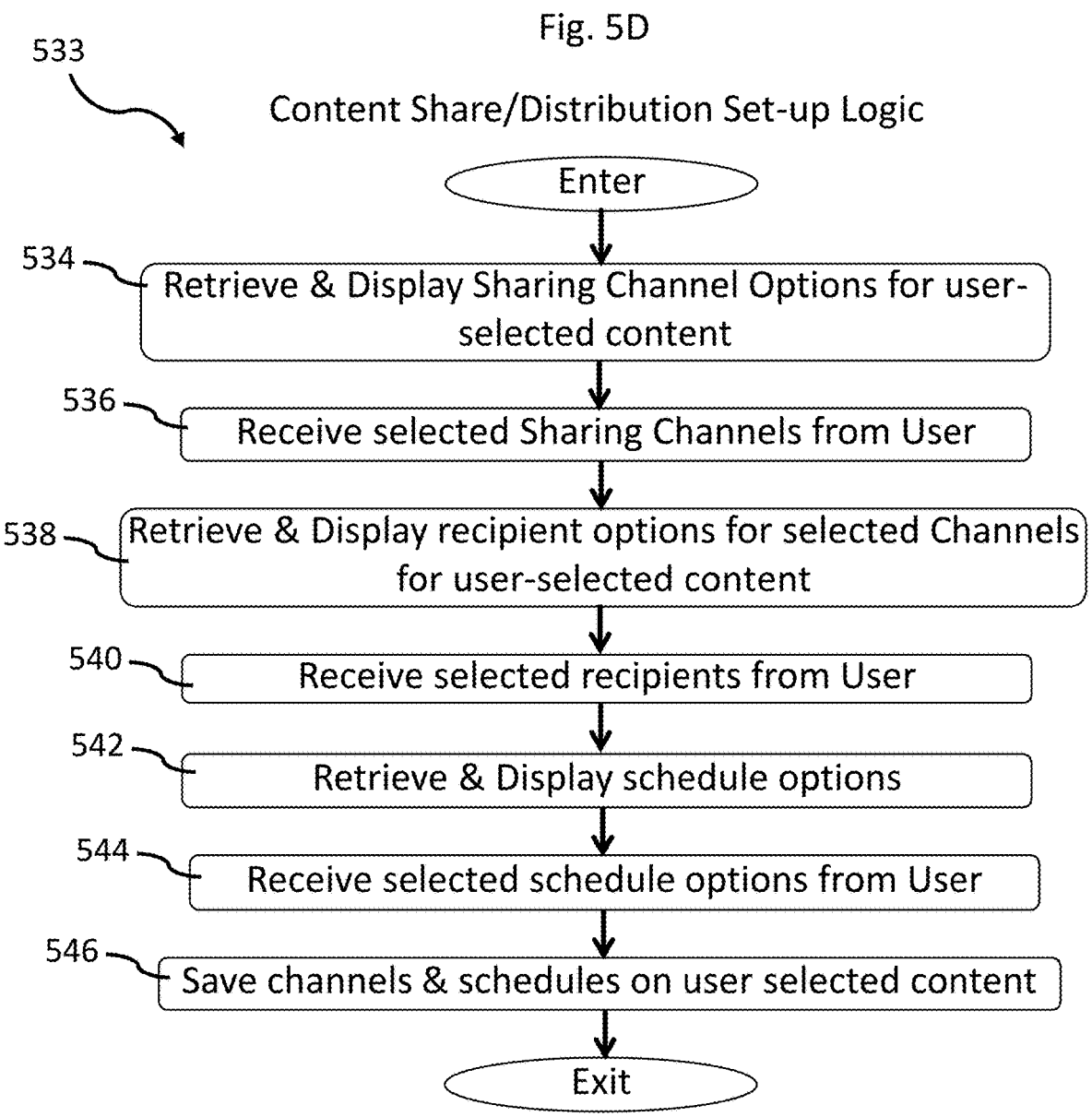

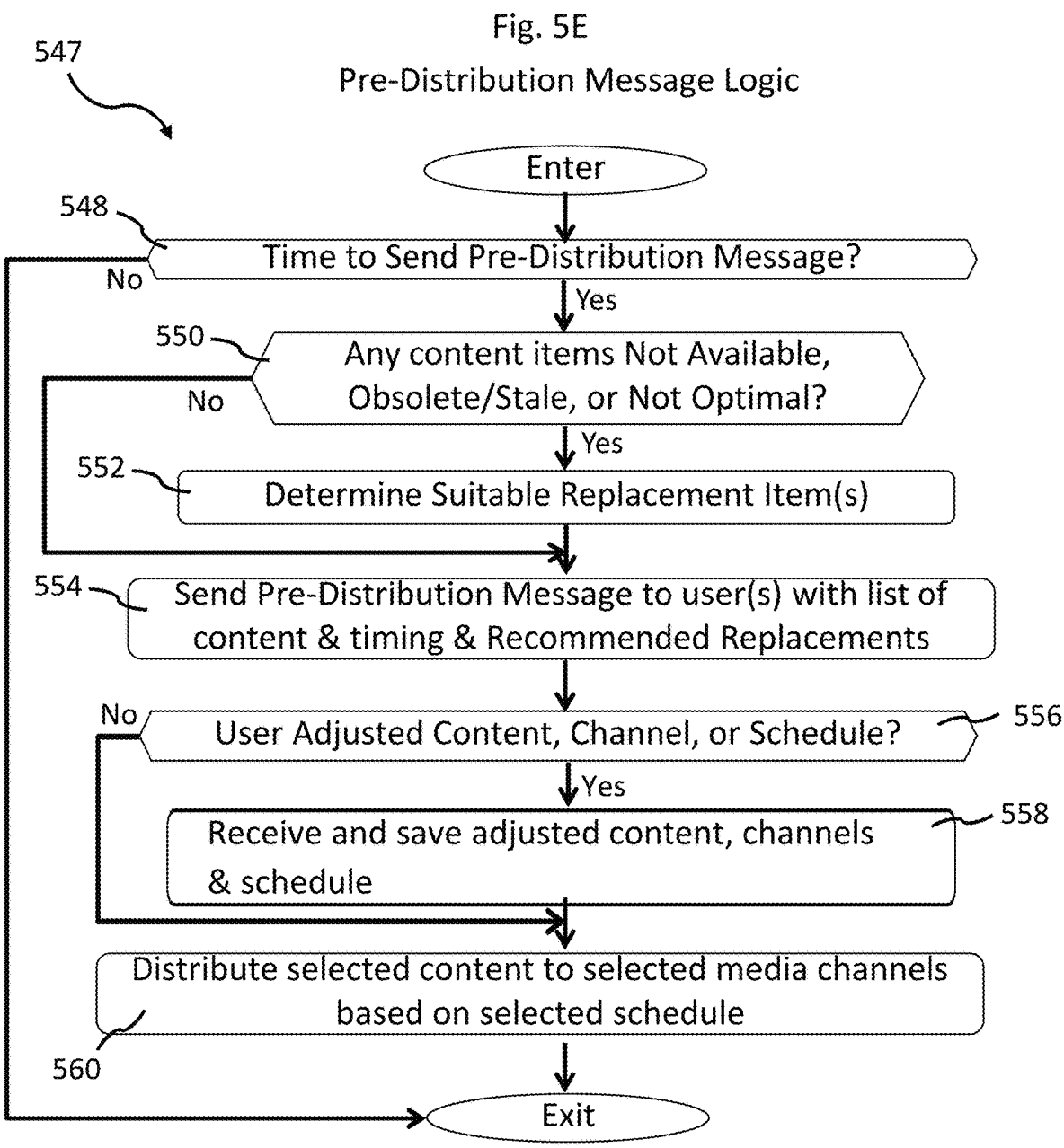

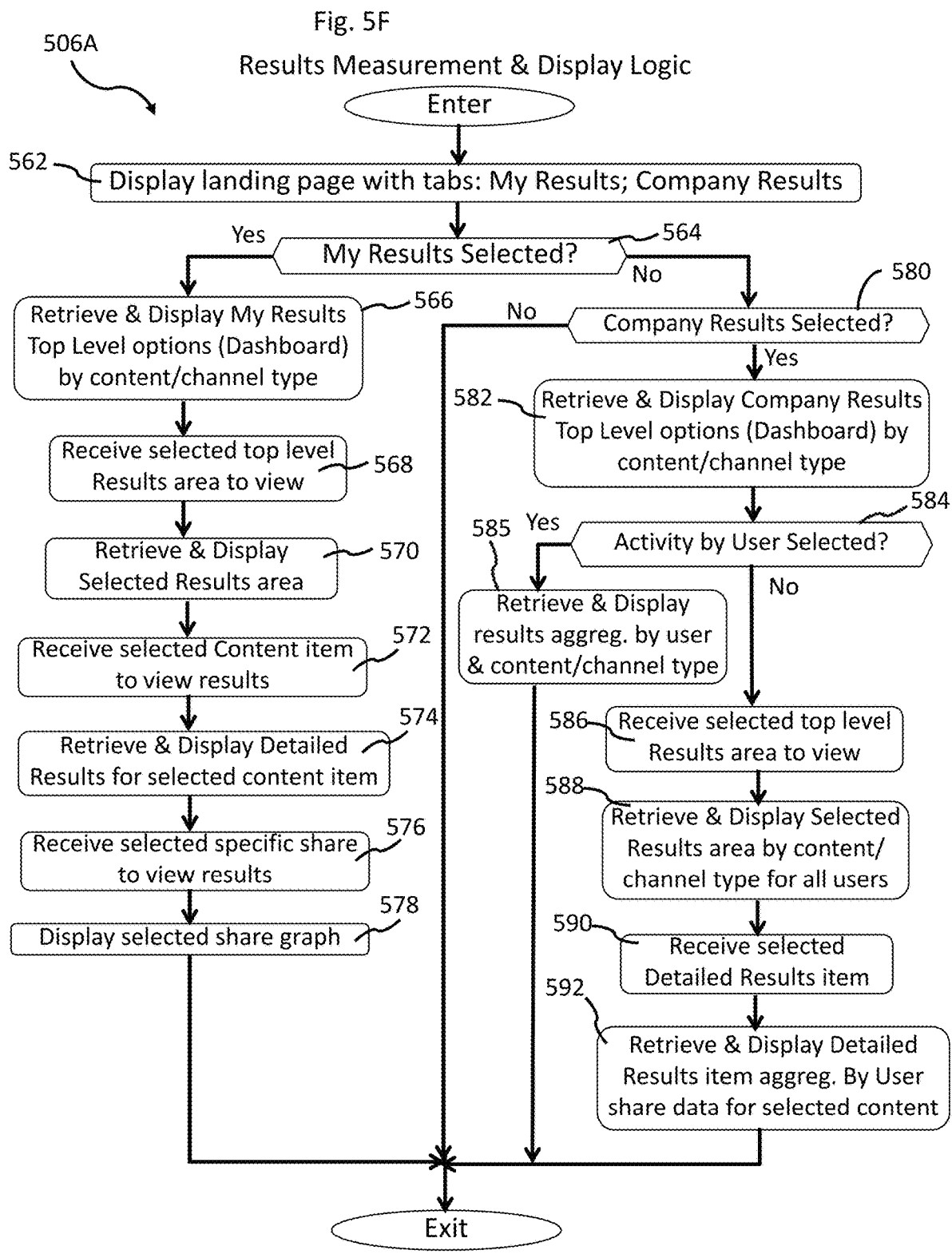

Pre-Distribution Message Notices/Settings 1252

The following content item is currently Not Available:
--Content Item 1 – "LinkedIn: Developing a Winter Storm Plan for your Business"
--Recommended Substitute(s) Higher Ranking Content Item(s) for this objective:
    Content item 10 – "Title of Content Item 10" (click to select/review); ☐ Replace
    Content item 14 – "Title of Content Item 14" (click to select/review); ☐ Replace
    Content item 24 – "Title of Content Item 24" (click to select/review); ☐ Replace
--Reason: Content removed by Admin., Obsolete/Stale, or Other reason
1254

The following content item has a higher ranked distribution channel for your objective:
--Content Item 2 – "Facebook: Developing a Winter Storm Plan for your Business"
--Recommended Alternate Distribution Channel: Twitter (click to select/review); ☐ Replace
--Reason: Facebook ranking = 3 ; Twitter ranking = 9
1256

The following content item is ranked lower than other available items for your objective:
--Content Item 3 – "eCard: The Cyber Risk Pressure Test" (click to review)
--Recommended Alternate Higher Ranking Content Item(s) for this objective :
    Content Item 22 – "title of Content Item 22" (click to select/review); ☐ Replace
--Reason: Content Item 3 Eff. Ranking = 2 ; Content Item 22 Eff. Ranking = 8
1258  1260

☐ Always replace with most effective (highest ranked) Content Items.
☐ Always replace with highest ranked Distribution Channels.
☐ Make all suggested replacements.

[ Done ]

1300

BRANDING CENTRAL Icon Key

| Channel/Format Icons | | Action/Edit Icons | |
|---|---|---|---|
| | Documents | | View |
| | E-cards/Email | | Details |
| | Videos | | Share |
| | Videos (Alt) | | Download |
| | Banner Ads | | Clone |
| | Facebook | | Bundle |
| | Twitter | | Add |
| | LinkedIn | | Calendar |
| | Campaigns | | Reschedule |
| | | | Cancel |
| | | | Results |
| | | | Edit |
| | | | Delete |

SYSTEM AND METHOD FOR PROVIDING SELECTABLE DISTRIBUTION OF USER-CUSTOMIZED CONTENT AND RESULTS MEASUREMENT

CROSS-REFERENCE TO RELATED APPLICATIONS

This application claims priority to U.S. Provisional Patent Application No. 62/475,673, filed Mar. 23, 2017, which is hereby incorporated by reference in its entirety.

BACKGROUND

Current techniques used to distribute and manage digital sales and/or marketing materials to existing or potential clients/customers are inefficient and often do not provide desired results. Thus, it would be desirable to have a system or method that improves the short-comings of existing distribution techniques, is more efficient, and provides more effective results.

BRIEF DESCRIPTION OF THE DRAWINGS

FIG. 3 is a flow diagram of Platform Logic that a Content Management System may be configured to execute according to embodiments of the present disclosure.

FIG. 4C is a screen illustration of the Content Management System of FIG. 4A according to embodiments of the present disclosure.

FIG. 4G is a screen illustration of the Content Management System of FIG. 4A according to embodiments of the present disclosure.

FIG. 5B is a flow diagram of the User Platform Logic of FIG. 5A that a User Platform System may be configured to execute according to embodiments of the present disclosure.

FIG. 5C is a flow diagram of a portion of the User Platform Logic of FIG. 5A that a User Platform System may be configured to execute according to embodiments of the present disclosure.

FIG. 5D is a flow diagram of a portion of the User Platform Logic of FIG. 5A that a User Platform System may be configured to execute according to embodiments of the present disclosure.

FIG. 5E is a flow diagram of a portion of the User Platform Logic of FIG. 5A that a User Platform System may be configured to execute according to embodiments of the present disclosure.

FIG. 5F is a flow diagram of a portion of the User Platform Logic of FIG. 5A that a User Platform System may be configured to execute according to embodiments of the present disclosure.

FIG. 7M is a screen illustration of the User Platform System of FIG. 7A according to embodiments of the present disclosure.

FIG. 7N is a screen illustration of the User Platform System of FIG. 7A according to embodiments of the present disclosure.

FIG. 7Q is a screen illustration of the User Platform System of FIG. 7A according to embodiments of the present disclosure.

FIG. 12 is a screen illustration of an exemplary notification email according to embodiments of the present disclosure.

DESCRIPTION

Figure 1:
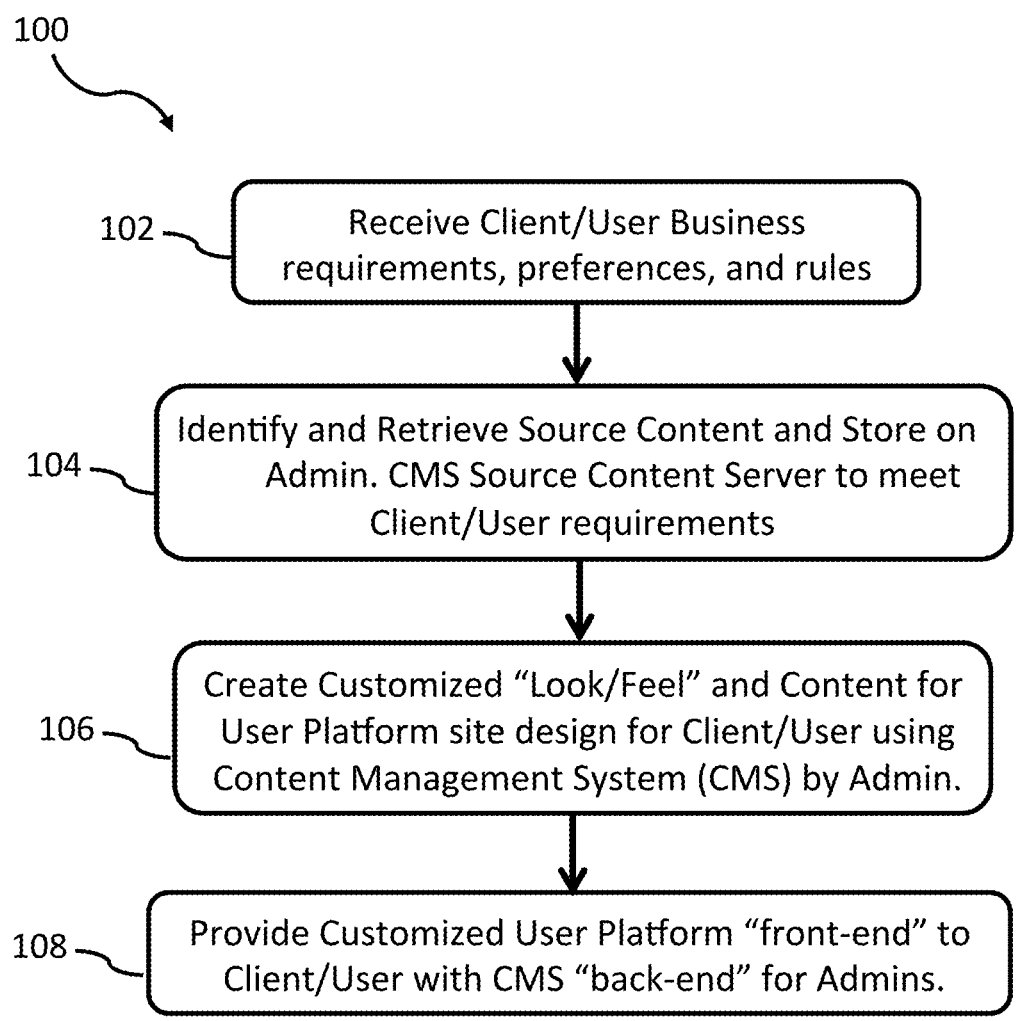
FIG. 1 is a flow diagram showing a process for creating customized client user platform design, according to embodiments of the present disclosure.

As described in more detail below, the content distribution and measurement system and method of the present disclosure provides a customizable platform that provides a centralized content (or materials) library where users can organize and store content/materials, as well as complete campaigns, so users can find and manage such content/material easily and efficiently. If desired, the content/materials may also be "tools" such as active Excel PowerPoint® presentations, calculator spreadsheets, and the like, that may be supported by (or run with) a separate software application (such as Excel or PowerPoint).

In addition to organizing material into a centralized content library, the platform provides the ability to personalize and share many content formats across various digital communication channels including email, webpages, Facebook, Twitter, LinkedIn, and the like.

Users also have access to their personal library of materials that they previously personalized allowing them to leverage existing content with new audiences. Their personal library can be refined using a variety of filters available on platform user interface. In addition, users have access to additional sorts, such as keyword, sort by date ascending/descending, sort by alpha ascending/descending, and the like. From the library of personalized materials, the user can quickly determine when an item was last shared and across which channel. The user also has ready access to previews, the ability to quickly share the item again, and view metrics resulting from its use.

Once content has been distributed or shared, the user platform provides a measurement/results analytics dashboard for users to visualize and track content utilization and client/customer engagement for the shared content. The platform may provide reports, emails or alerts for desired metrics to the user. In addition, the platform may have logic that analyzes the results and may provide visual indicators associated with each content piece in the library of certain Key Performance Indicators (KPI), such as level of sharing, use/staleness time, engagement level, and the like. This allows the user to easily identify the performance of each content piece when selecting. Also, the platform may review performance over a period of time and make recommendations for individual content or campaign content, to optimize effectiveness of the distribution, using optimization algorithms and/or machine learning, or the like.

The platform also provides administrators with a dashboard having an overview of content utilization by user groups and by content type across the organization down to the individual user. For example, in an insurance company with distributed agent sales force, the administrator may be an insurance company agent marketing manager and the users may be the individual agents and/or agency.

In addition to providing the ability to find, personalize and share individual materials/content and tools across multiple distribution channels, the platform also allows administrators to create or assemble pre-packaged campaigns (or collection of content) comprised of any material/content contained in the content library. This may be performed using a "back-end" Content Management System (CMS) of the present disclosure, discussed herein in greater detail below. Once a campaign has been created, it may be stored and "published" for use by users of the "front-end" user platform. Campaign materials can be organized across multiple weeks, channels and formats. A user can review all the recommended material in a given pre-packaged campaign and de-select (or remove) any content items that the user does not wish to include in the user's campaign. In some embodiments, the users may also be able to add content items to the campaign and launch it and/or save it for future use. Where appropriate, all campaign material formats may be automatically personalized utilizing the users main profile. Users can also send emails within the campaign to an individual or to one of multiple distribution lists uploaded and managed within the system.

Once the user selects a launch date for the campaign, each items is scheduled according to a recommended "glide path" established in the pre-packaged campaign by the administrator. From a calendar view, the user can preview the timing for the distribution of materials, remove (or delete) items, and reschedule the timing for individual content pieces. Also, throughout the course of the campaign, users may receive automated email reminders of campaign activity. There may also be reminders or alerts for the user to perform certain campaign activities that are not automated, such as launch a radio or TV advertisement, or the like.

Thus, the platform of the present disclosure provides companies/organizations and their distribution networks, e.g., internal sales staff, independent agents, representatives, franchisees, and the like, access to a centralized library of marketing materials/content, tools and other resources, regardless of type and format, e.g., collateral, ads, presentations, audio, video, info-graphics, and the like. The platform also lets users customize, co-brand, distribute and share the content with their clients and prospects, while maintaining the organization's brand standards (as the platform user interface may be customized to use the organization branding). The platform also provides users and administrators with the means to measure utilization and engagement across content type and distribution channel. In addition to the platform's integrated, fully configurable "front-end" functionality, all of the user platform content, campaigns, navigational structure, tagging criteria, templates, user group permissions, and the like, can be managed from a single "back-end" Content Management System (CMS), as discussed herein.

FIG. 1 is a top level flow diagram 100 showing a process for creating customized client/user platform design of the present disclosure. Referring to FIG. 1, the process begins at block 102 by receiving customer/client/users business requirements, preferences and rules, including desired "look and feel" of the platform user interface (UI) or graphic user interface (GUI). Next, at block 104 the process identifies and retrieves source content and stores on an administrator CMS source content server needed to meet the client/user requirements. Next, at block 106 a customized "look and feel" and content for the user platform site design may be created by the Admin. for the client/user using a content management system (CMS) of the present disclosure, which uses the CMS content server, as discussed hereinafter. The user platform design may include creating the user platform design of the present disclosure, including (but not limited to) navigation structure, objectives/goals (or theme), tags, sorting, filters, and the location, content and appearance of fields, images, text, menu bars, drop-downs, pop-ups, web links, clickable (or touchable) buttons, sliders, and the like. Next, at block 108, the customized user platform "front-end" and CMS "back-end" are provided to the client/user. This process may be performed in whole or in part by an administrator, and at least portions thereof may also be performed by a computer, if desired.

Figure 2:
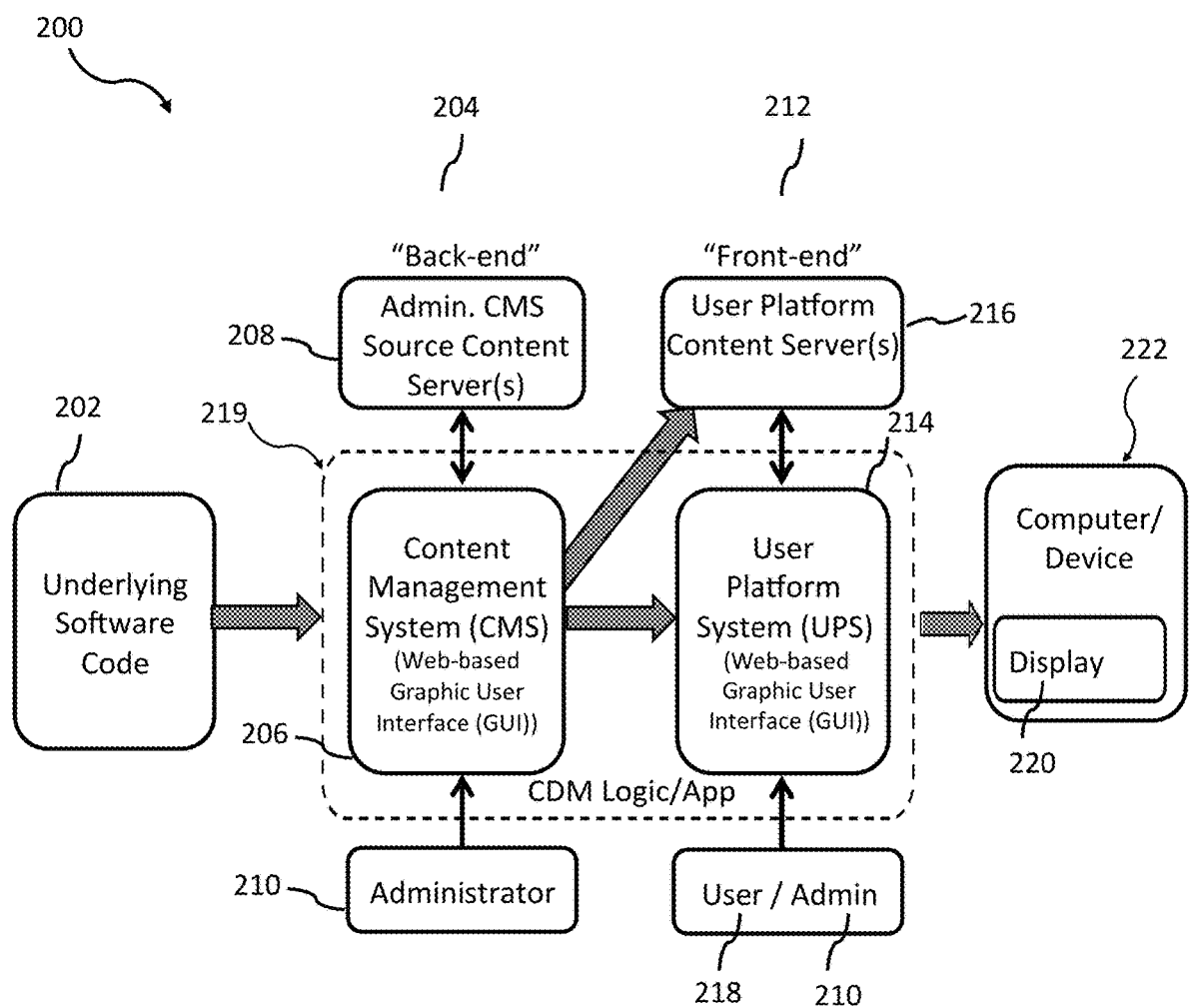
FIG. 2 is a block diagram showing certain logic, interactions, and data flow, which may be used to implement at least portions of FIG. 1, in accordance with embodiments of the present disclosure.

FIG. 2 is a top level block diagram of a content distribution and measurement system 200 showing certain logic, interactions, and data flow, in accordance with embodiments of the present disclosure, which may be used to implement at least portions of FIG. 1 (e.g. block 106, 108). Referring to FIG. 2, the overall platform/system 200 of the present disclosure may be viewed as having three layers: (1) an underlying software code layer 202, such as PHP (or any other programming language to provide the structure and functions described herein); (2) a content management system (CMS) layer (or "back end") 204 having a CMS (or CMS Platform Logic Or CMS Logic) 206 operatively connected to an Admin. CMS Source Content Server 208, written and/or executed using the underlying software code 202, which interacts with an "administrator" (or Admin.) 210 via an Administrator web-based graphic user interface (Admin. GUI) (as described further herein below); and (3) a user platform system layer (or "front end") 212 having a User Platform System (or UPS or Platform or User Platform Logic or UPS Logic) 214 operatively connected to a User Platform Content Server 216, which may be created or formatted or structured (in whole or in part) by the content management system (CMS) 206, and which interfaces with a "user" 218 or the administrator 210 via a User web-based graphic user interface (User GUI) (as described further herein below), which may be different from, the same as, or have overlapping features and/or functionality to, the Admin. GUI, as discussed herein. The user platform system 214 may also utilize the underlying software code 202 to perform its functions. The CMS 206 "back-end" and UPS 214 "front-end" may be part of a common system 219, and together may comprise the logic of the content distribution and measurement system 200, which may be in the form of a software application, e.g. CDM Application or logic residing on a computer having a back-end CMS and front-end UPS, which may also be used as a software as a service (Saas).

The CMS 206 receives inputs from the administrator 210 (or high-level user of the platform) via the Admin. GUI and also interacts with an Administrator 210 CMS Source Content Server 208 to access content to be reviewed and selected by the Administrator 210 and which may be used by the user platform system (discussed more hereinafter). In particular, the CMS 206 creates the desired "look and feel" (or visual configuration or design) of the user platform graphic user interface (User GUI), and creates the User GUI design including (but not limited to) navigation structure, objectives/goals, tags, sorting, filters, and the location, content and appearance of fields, images, text, menu bars, drop-downs, pop-ups, web links, clickable (or touchable) buttons, sliders, and the like.

The content selected by the Administrator 210, is provided to a user platform content server(s) 216, which provides the user platform system 214 with the content and user interface configuration for the User GUI and may store selections of the user and other data (discussed more herein after). The CMS 206 may also provide certain attributes or features directly to the user platform system 214 to achieve the desired design, function and performance of the user platform, as indicated by the arrows. The CMS 206 and UPS 214 (and the underlying code 202), individually or together, may interface (or interact) with or reside on a computer or device 222, which may have a display 220 supporting the GUIs for the CMS 206 and UPS 214.

Once the User platform GUI has been created (by the CMS 206 or otherwise), the User(s) 210, 218 can interface and interact with the User platform system 214 via the User GUI to easily and efficiently create the desired content distribution and measure results associated therewith, as discuss further herein.

Figure 4A:
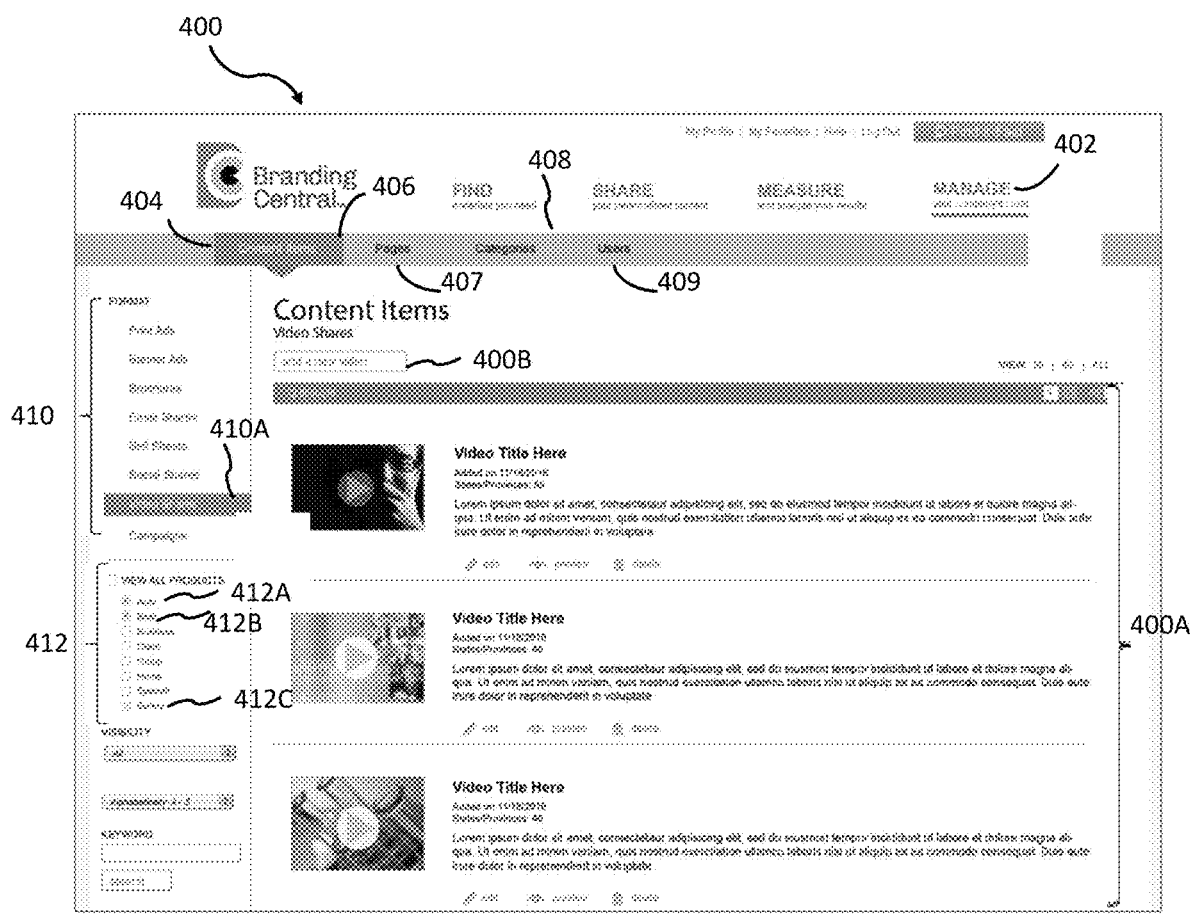
FIG. 4A is a screen illustration of a Content Management System according to embodiments of the present disclosure.

Referring to a flow diagram of FIG. 3 and screen illustrations of FIGS. 4A-4M, FIG. 3 is a flow diagram 300 of one embodiment of a process or logic CMS Platform for implementing the system or Logic 206 (FIG. 2) according to embodiments of the present disclosure. First, at block 302 the CMS Logic 206 displays an Admin "Manage" page 400 (FIG. 4A) to be used by the Administrator 210 (FIG. 2), having a "Manage (your company content)" tab 402 active/selected for the Manage page 400 and having Area Tabs 404, such as Content Items 406, Pages 407, Categories 408, Users 409, other Area Tabs may be used if desired. The "Manage" tab 402 may only appear when the Admin. 210 is logged into the CMS system, and enables the administrator 210 to create the look and feel and data structure of the UPS for use by the users 210, 218. Next, at block 304 receives a selected Area Tab 404 from the Admin 210. Next, at block 306 determines whether "Content Items" area 406 has been selected. If the determination 306 is Yes, block 308 retrieves & displays Format options 410 (e.g., print ads, brochures, emails, shares, sell sheets, social shares, video shares, campaigns, or other Format options) and Product Filters 412 (e.g., auto, boat, business, claims, group, home, specialty, surety, or other product filters) from CMS Content Server. FIG. 4A shows the content items selected. Next, block 310 receives selected Content Format 410 & Product Filters 412 from the administrator 210; and retrieves & displays selected, filtered content items from the Content Library from CMS Content Server. FIG. 4A shows Video Shares 410A selected and Auto, Boat, and Surety 412A, 412B, 412C, product filters selected. Next, block 312 receives selected Content Item from user; and displays the Sections screen 894A (e.g. FIG. 4B, Sections 1-8) corresponding to the Format selected to customize look/feel and structure, receives customized data from the administrator 210, and saves data on the User Platform Content Server 216 (FIG. 2) (e.g., basic info, content item, templates, categories/filters/pages, Share via email/SM), which is described with screen illustrations of FIGS. 4C-4K. The "Sections" displayed may be based on the selected Format. If the determination 306 is No, Content Item 406 was not selected and a block 314 determines if "Pages" area 407 (FIG. 4A) has been selected. If Yes, block 316 displays Objective Navigation Tabs (FIG. 4L) 422, 424, 426, 428, 430, 431 and Strategy (or sub-objective) Drop Down items 432, 434, 436, 438, 439, 440 to customize, receives customized data from the administrator 210, and saves on User Platform Content Server. If the determination 314 is No, the "Pages" area is not selected, and a block 318 determines whether the "Categories" area 408 (FIG. 4A) has been selected. If Yes, block 320 displays a Manage Categories screen 450 (FIG. 4M) having categories 452 that may be edited, added, or removed (e.g., products, topics, formats, regions), displays customization options 454 (e.g. format, geography, or others) for the selected Categories 452, receives customized data & saves on User Platform Content Server. If the determination 318 is No, a block 322 determines whether the "Users" area 409 (FIG. 4A) has been selected. If Yes, a block 324 displays a user accounts page 460 (FIG. 4N) having list of users 462; receives selected users, and saves the selections on User Platform Content Server. If the determination 322 is No, the "Users" area 409 has not been selected and the CMS 206 may optionally notify user group of updates, e.g. via email or a notification in the User Platform System or by text message or via another digital communication, at a block 326. After the user group(s) have been optionally notified, the CMS 206 may exit the CMS Platform Logic 300. The results (or outputs) of above flow diagram 300 are described further below with FIGS. 4A-4M screen illustrations.

As described with FIG. 3 and in more detail below, FIG. 4A is a view of a screen of an exemplary CMS according to an embodiment of the present disclosure. The CMS "back-end" has a user interface and various modules of functionality that are fully integrated, similar to a "front-end" user platform interface (discussed below). When the administrator 210 is logged into the system, the additional tab 402 is displayed "MANAGE your company's content." From this CMS tab 402, all the platform's content, campaigns, navigational structure, tagging criteria, user permissions, and the like, can be managed by the Admin 210. In this embodiment, there are four main areas tabs 404 managed within the CMS: Content Items 404, Pages 406, Categories 408, and Users 409 (as discussed herein).

In FIG. 4A, the Content Items area 406 is selected. From this section 406, the administrator 210 can search for existing content by format, product, visibility, various sort options or by keyword. In this way, the administrator 210 can quickly find existing content. Once located, the administrator 210 can preview the item, delete it, clone it, or edit any of its attributes, e.g., visibility status, description, thumbnail image, channel options, where it appears in the site, and the like. These search criteria are also configurable via the CMS.

From the same screen 400 shown in FIG. 4A, the administrator 210 can also add new content 400B, and define any of its attributes, e.g., description, thumbnail image, channel options, where it appears on the site, and the like (discussed more hereinafter).

Figure 4B:
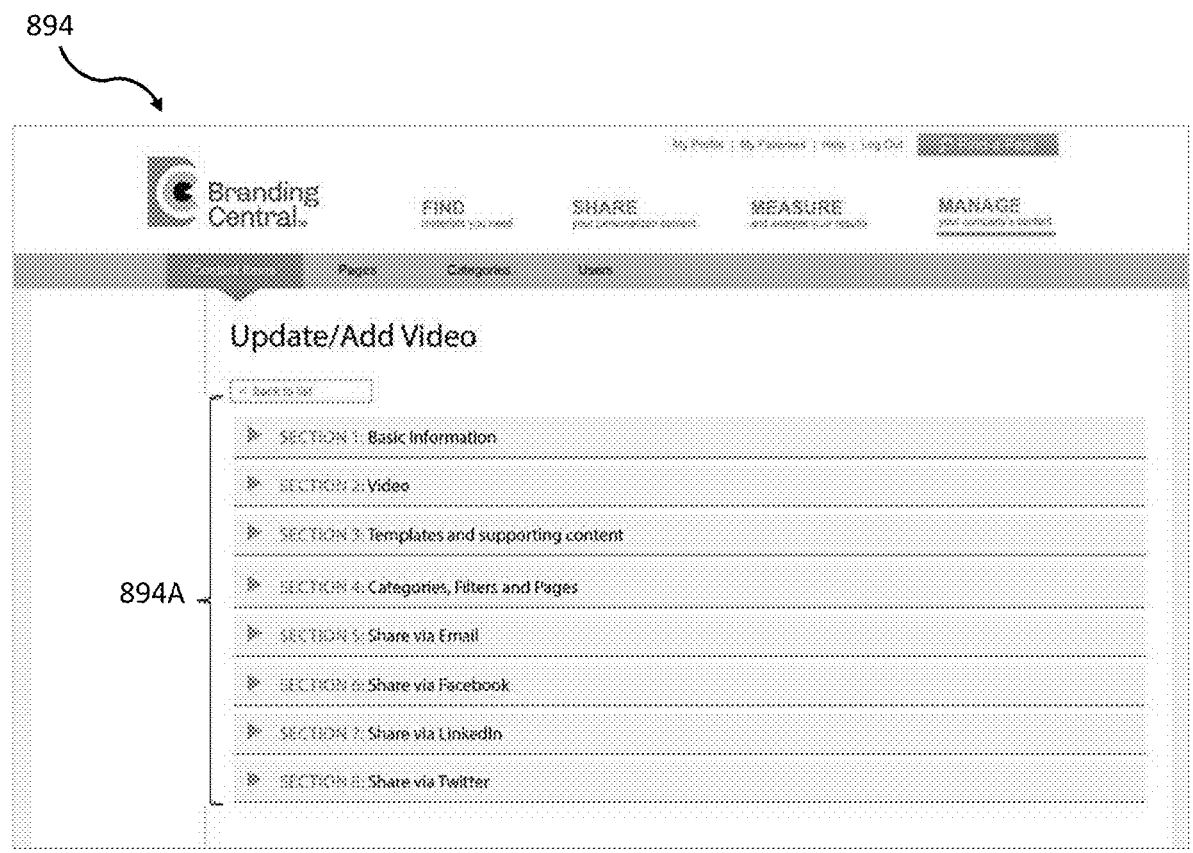
FIG. 4B is a screen illustration of the Content Management System of FIG. 4A according to embodiments of the present disclosure.
Figure 4C:
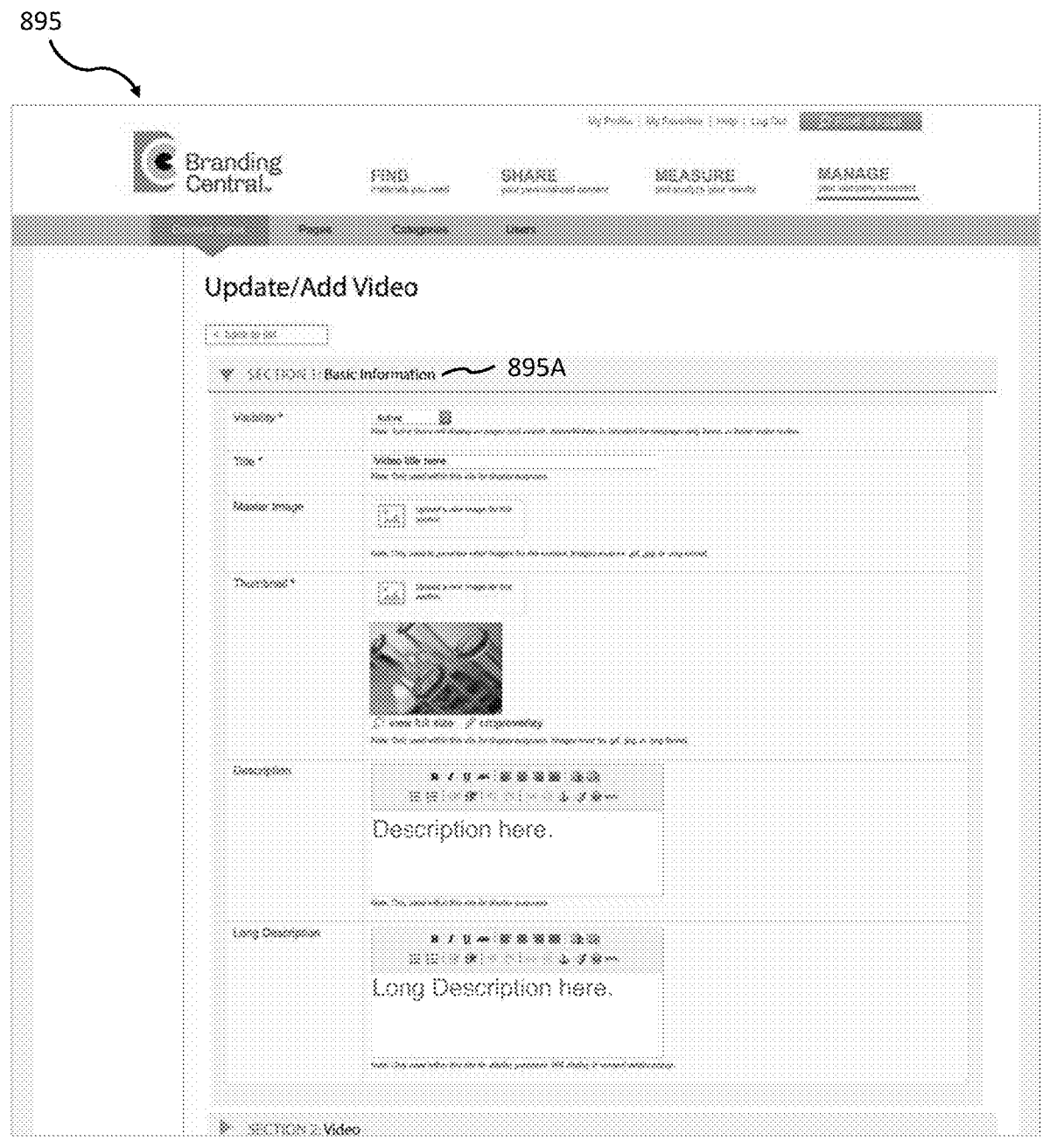
Figure 4D:
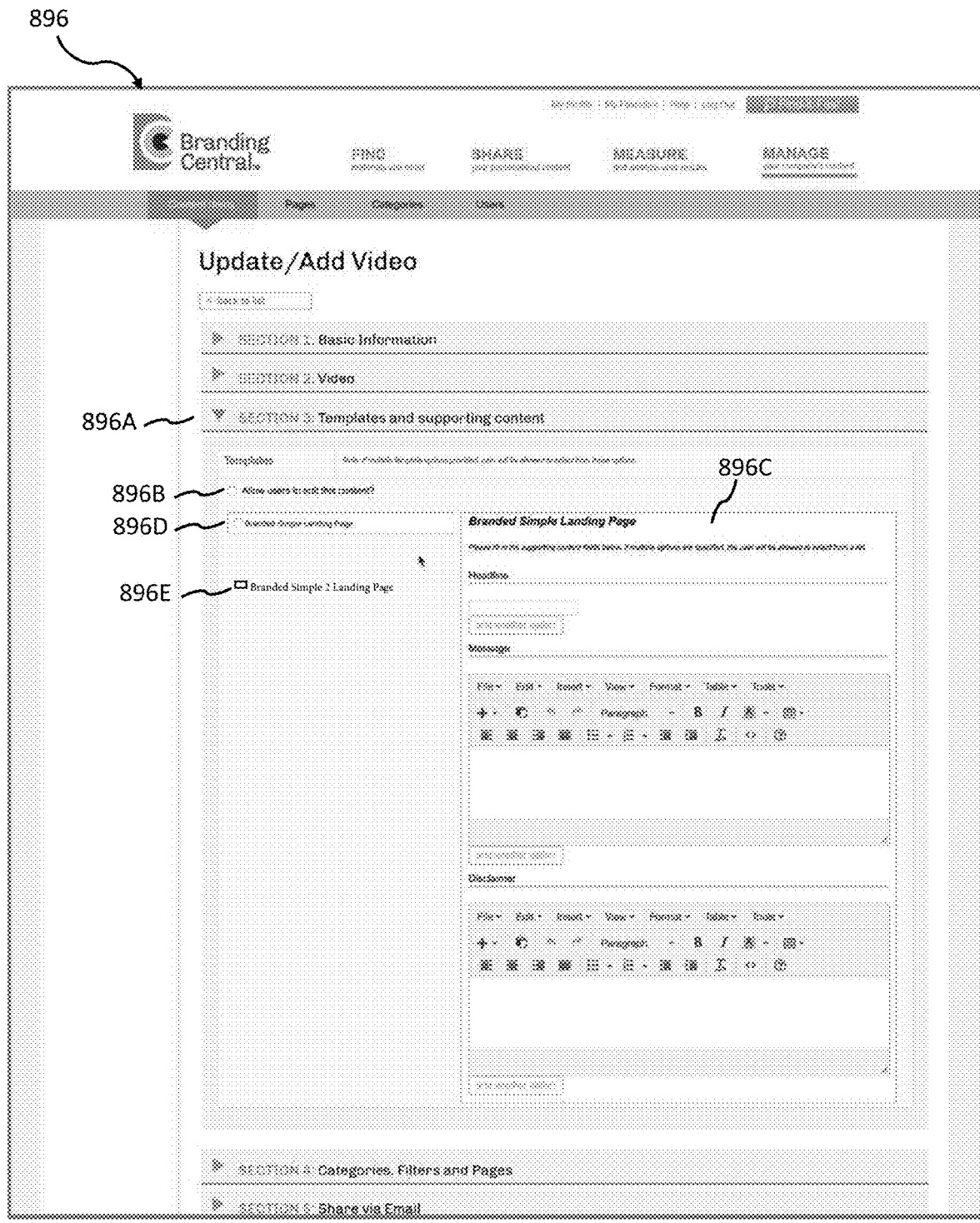
FIG. 4D is a screen illustration of the Content Management System of FIG. 4A according to embodiments of the present disclosure.

Referring to FIGS. 4B-4D, when a video item is selected from page 400 (FIG. 4A), and "Video Shares" 401 is selected from the format menu 410, FIG. 4B is a view of a Update/Add Video screen 894 of the CMS of FIG. 4A. The screen 894 in FIG. 4B depicts an administrator CMS interface when the administrator 210 selects to edit existing video content or add new video content on the previous screen. Because video content can be shared across multiple distribution channels, e.g., email, Facebook®, LinkedIn®, Twitter®, and others, there is a separate section dedicated to each channel (Sections 5-8). From each channel section (Sections 5-8) the administrator 210 can determine whether to make the channel available to users for that video content and, if so, determine how the content will appear in each channel. The CMS offers flexibility and control over content appearance of each content item in each channel and channel access—all of which can be determined by the administrator 210 on a piece-by-piece basis (for each content item). In one location, the administrator 210 can control how and where content materials appear within the user platform, the level of user customization that is available for each piece of content, and how it appears across multiple channels when shared and distributed.

FIG. 4C is a view of a screen 895 of the CMS of FIG. 4A. The screen 895 in FIG. 4C shows "Section 1: Basic Information" (FIG. 4B) 895A expanded. From the screen 895 in FIG. 4C, the administrator 210 can control how and where content/materials appear within the platform, the level of user customization that is available for each piece of content, and how it appears across multiple channels when shared and/or distributed. From this section, the administrator 210 can set a content item's title, visibility, preview page, master image, thumbnail image as well as its descriptions (short and long).

When "Section 2: Video" (FIG. 4B) is expanded (not shown) the administrator 210 can upload a video file and a still image (poster frame) for this content item. The video may be in various formats, such as .flv, .avi, .wmv, .mov, .mpg, .mp4 formats or other formats. The videos may follow various aspect ratios, such as 3:2, 4:3, 16:9 or other aspect ratios. While Section 2 is shown as being for a Video, every content type, e.g., videos, emails, social posts, etc. has a file section (or group of sections) associated with it. For instance, if the content item is a Facebook post, the administrator 210 can enter/upload via the CMS the post title, post text, target link and post image.

FIG. 4D is a view of a screen 896 of the CMS of FIG. 4A. The screen 896 in FIG. 4D shows "Section 3: Templates and Supporting Content" 896A expanded. When Section 3 (FIG. 4B) is expanded the administrator 210 can enter and manage where the content appears on the landing page 896C for the User Platform System (discussed hereinafter) that houses the video (or other content item) as shown by a pop-up landing page window 896C, having fields such as Headline, Message, Disclaimer or other options, which appears when the landing page name template 896D is selected. The administrator 210 can determine whether the landing page content can be edited by the user or "locked-down" to ensure content is not modified by users of the User Platform System (i.e. "compliant" content) by a check box 896B. In some embodiments, multiple landing page templates 896E can be associated with each video (or other content item) allowing the user to choose a template they prefer.

Figure 4E:
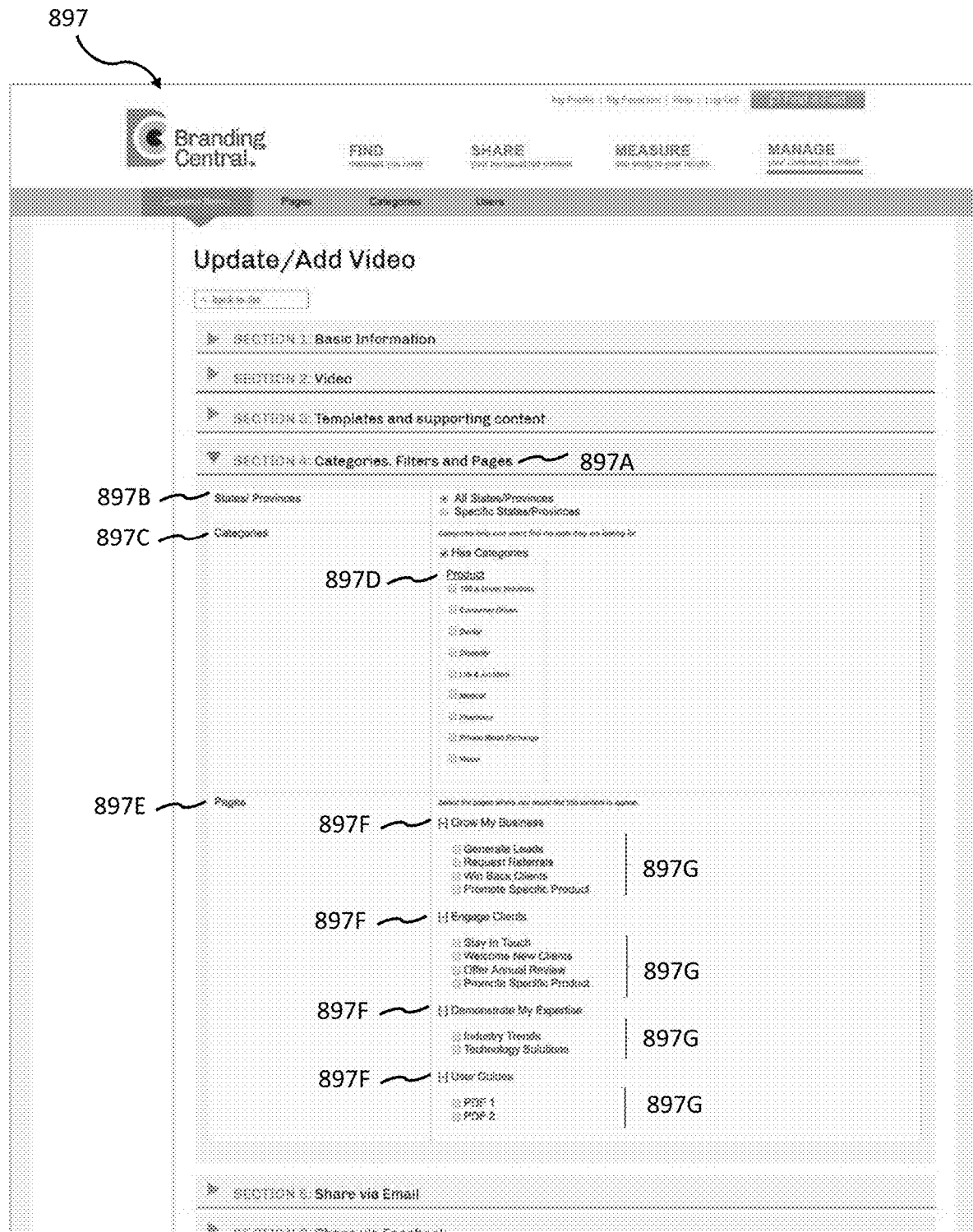
FIG. 4E is a screen illustration of the Content Management System of FIG. 4A according to embodiments of the present disclosure.

The screen 897 in FIG. 4E shows "Section 4: Categories, Filters and Pages" 897A expanded. In the case of a video (shown in FIG. 4E), this section is where the administrator 210 can associate the content item (in this case a video) with various tagging and filtering criteria (e.g. states/provinces 897B, categories 897C, and products 897D) and select the pages 897E that the content will appear such as what objective 897F and sub-objective 897G tabs will show this content item. The other sections (sections 5-8) allow the administrator 210 to set up parameters around email and social media shares as discussed hereinbefore.

Figure 4F:
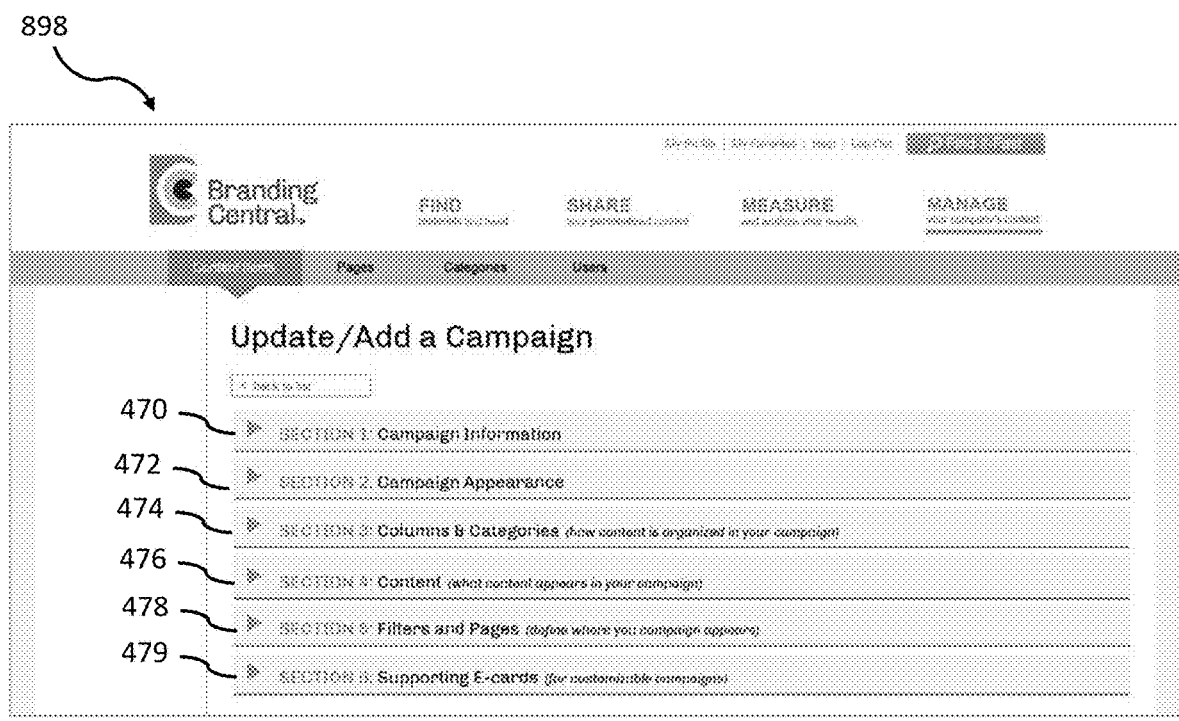
FIG. 4F is a screen illustration of the Content Management System of FIG. 4A according to embodiments of the present disclosure.

Referring to FIGS. 4F-4J, where a campaign content item is selected from page 400 (FIG. 4A), FIG. 4F is a view of a screen 898 of the CMS of FIG. 4A. The screen in FIG. 4F depicts an exemplary administrator interface when the user elects to update/edit/create a campaign showing six sections 470-479. Because campaigns are groupings of individual content items, there are several unique aspects of the campaign in the CMS including the design and organization of how the campaign is presented to the user, the selection of content items included in the campaign and establishing a recommended "glide path" that dictates when items will be distributed or executed. As such, the Sections provided to the user at block 312 may be different based on the selected content item. The CMS offers flexibility and control over the appearance of individual content items within the campaign, how and where campaigns appear within the platform, the level of user customization that is available for each piece of content, and how content appears across multiple channels when shared and distributed.

Figure 4G:
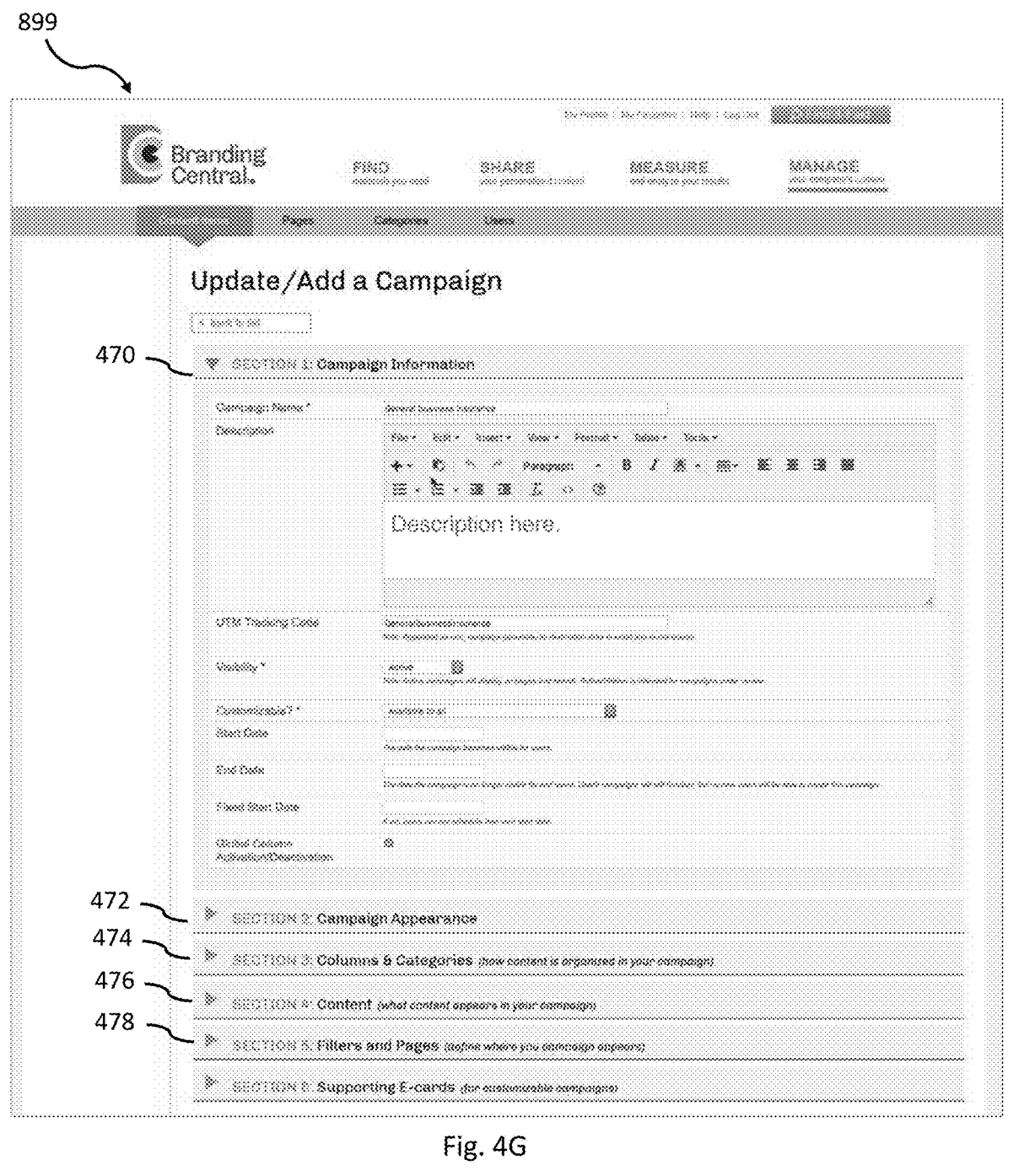

FIG. 4G is a view of a screen 899 of the CMS of FIG. 4A. The screen 899 in FIG. 4G shows "Section 1: Campaign Information" 470 (FIG. 4E) expanded. This section 470 is used to establish the basic campaign information and attributes within the platform including its title, description, UTM (Urchin Tracking Module) tracking code, visibility, status setting (e.g., active, hidden, inactive). It also has a "customizable" setting which can allow users to customize the campaign, e.g. add/remove content. The administrator 210 can also establish a date range (start, end) for the campaign's availability within the system as well as determine a fixed start date. The campaign may also be configured to repeat according to a predetermined interval. For instance, a campaign may be configured to repeat annually, semi-annually, seasonally, weekly, daily, and the like, until an end date, or indefinitely.

Figure 4H:
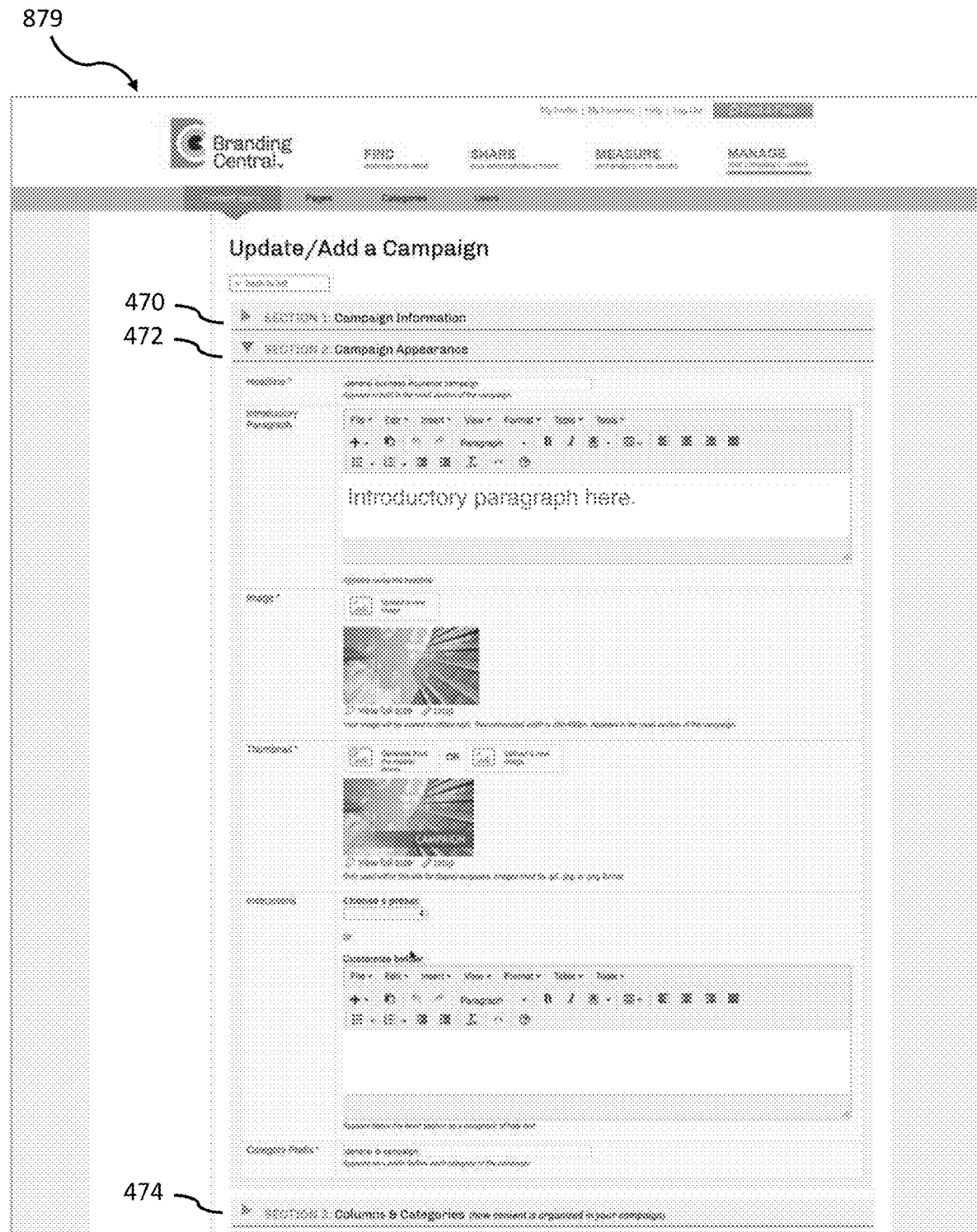
FIG. 4H is a screen illustration of the Content Management System of FIG. 4A according to embodiments of the present disclosure.

FIG. 4H is a view of a screen 879 of the CMS of FIG. 4A. The screen 879 in FIG. 4H shows "Section 2: Campaign Appearance" 472 (FIG. 4F) expanded. The section 472 determines how the campaign appears to platform users, including its title, headline, introduction paragraph, preview image, thumbnail image, description as well as the ability to select from a variety of preset user instructions or enter custom instructions.

Figure 4I:
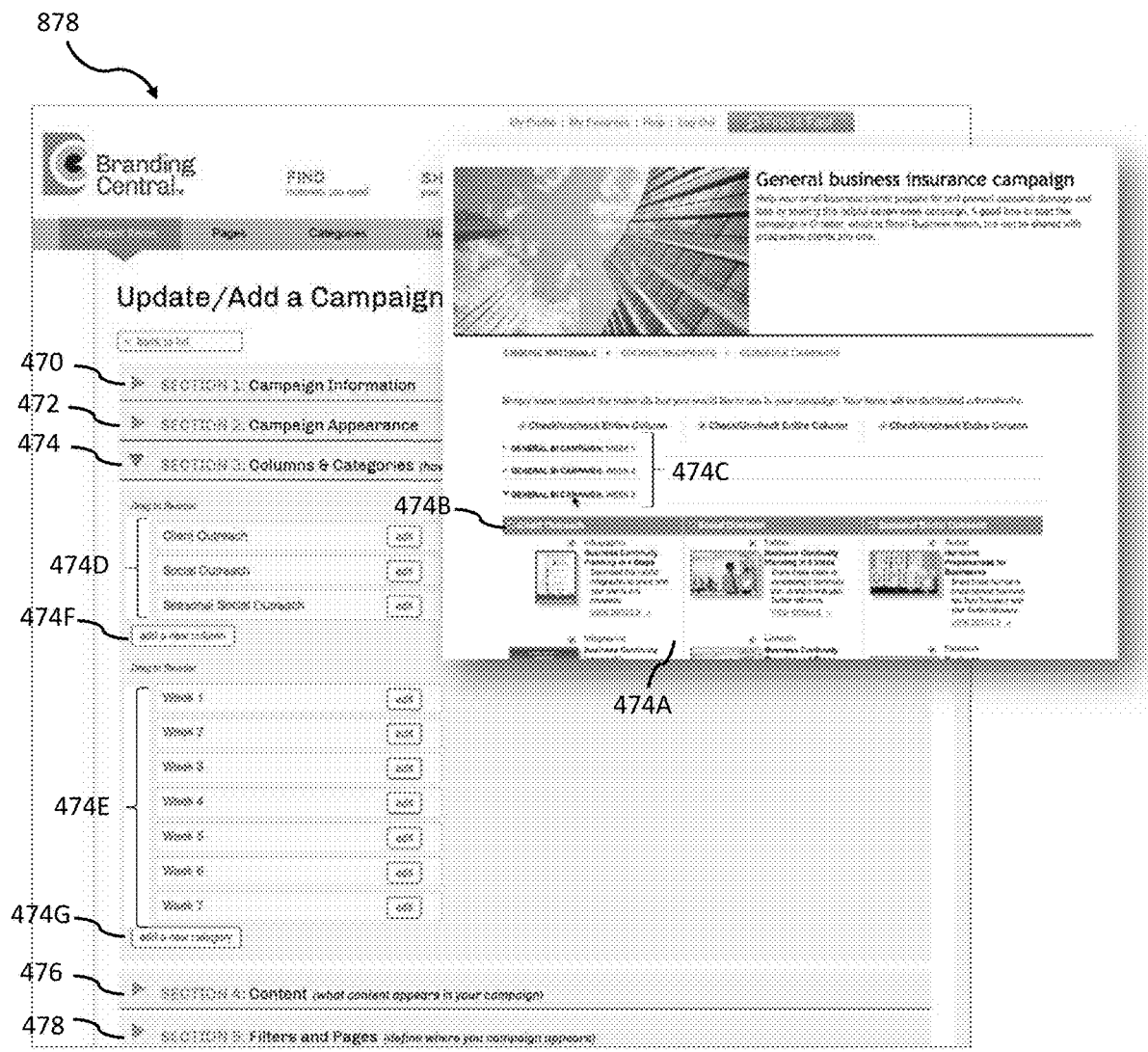
FIG. 4I is a screen illustration of the Content Management System of FIG. 4A according to embodiments of the present disclosure.

FIG. 4I is a view of a screen 878 of the CMS of FIG. 4A. The screen 878 in FIG. 4I shows "Section 3: Columns & Categories" 474 (FIG. 4F) expanded. The section 474 determines the framework for how content is organized within the campaign. The number of columns and column labels can be established, edited and reordered by the administrator 210. In particular, when the section 474 is selected, a pop-up window 474A may appear showing how the campaign appears to a user. The columns 474B and categories/weeks 474C, in the window 474A, correspond to editable columns 474D and editable categories/weeks 474E, respectively. Thus, columns 474D, e.g. client outreach, social outreach and seasonal outreach, and Categories 474E e.g. week 1, week 2, etc. can be added (474F, 474G), edited, named and reordered by the administrator 210. Once the campaign structure has been established, content can be added to the campaign and a distribution schedule established (see "Section 4: Content" 476 next).

Figure 4J:
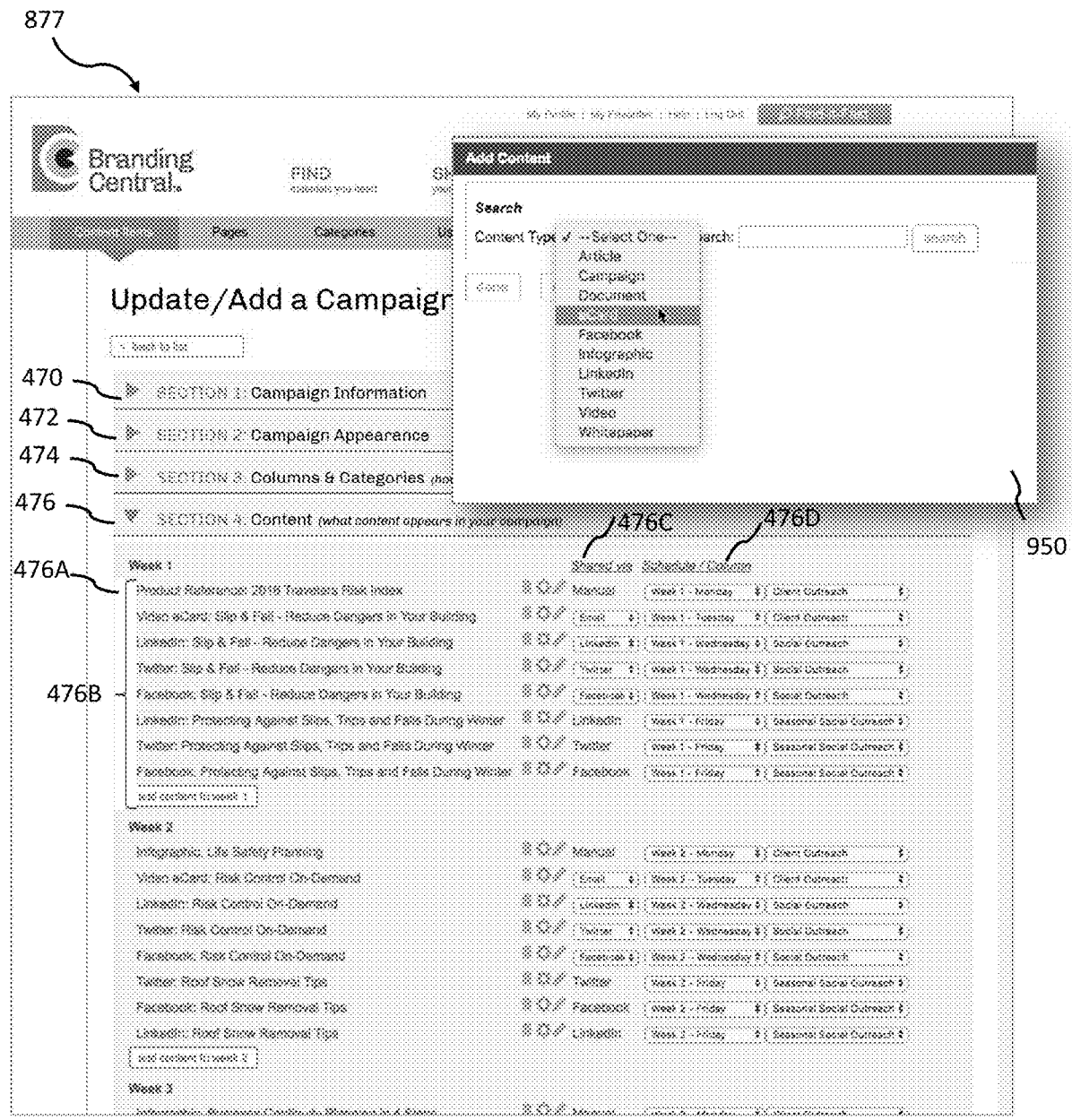
FIG. 4J is a screen illustration of the Content Management System of FIG. 4A according to embodiments of the present disclosure.

FIG. 4J is a view of a screen 877 of the CMS of FIG. 4A. The screen 877 in FIG. 4J shows "Section 4: Content" 476 (FIG. 4F) expanded showing a breakdown screen 476A by week, and showing current content 476B for each week. For each content item (or piece) it shows a "shared via" column 476C indicating how the item is to be distributed and "schedule/column" column 476D showing what day of the week the item will be distributed, and what column it is associated with. The settings in columns 476C, 476D are adjustable where appropriate/available. The section 476 determines the content items that comprises the campaign, where the content appears within the campaign and when it will be distributed or executed. The administrator 210 can easily search across the entire platform for appropriate content to be added to the campaign via the Add Content search box 950. Once added to a category (or schedule), the content item can be associated with a column, distribution channel, as well as its recommended execution date.

Figure 4K:
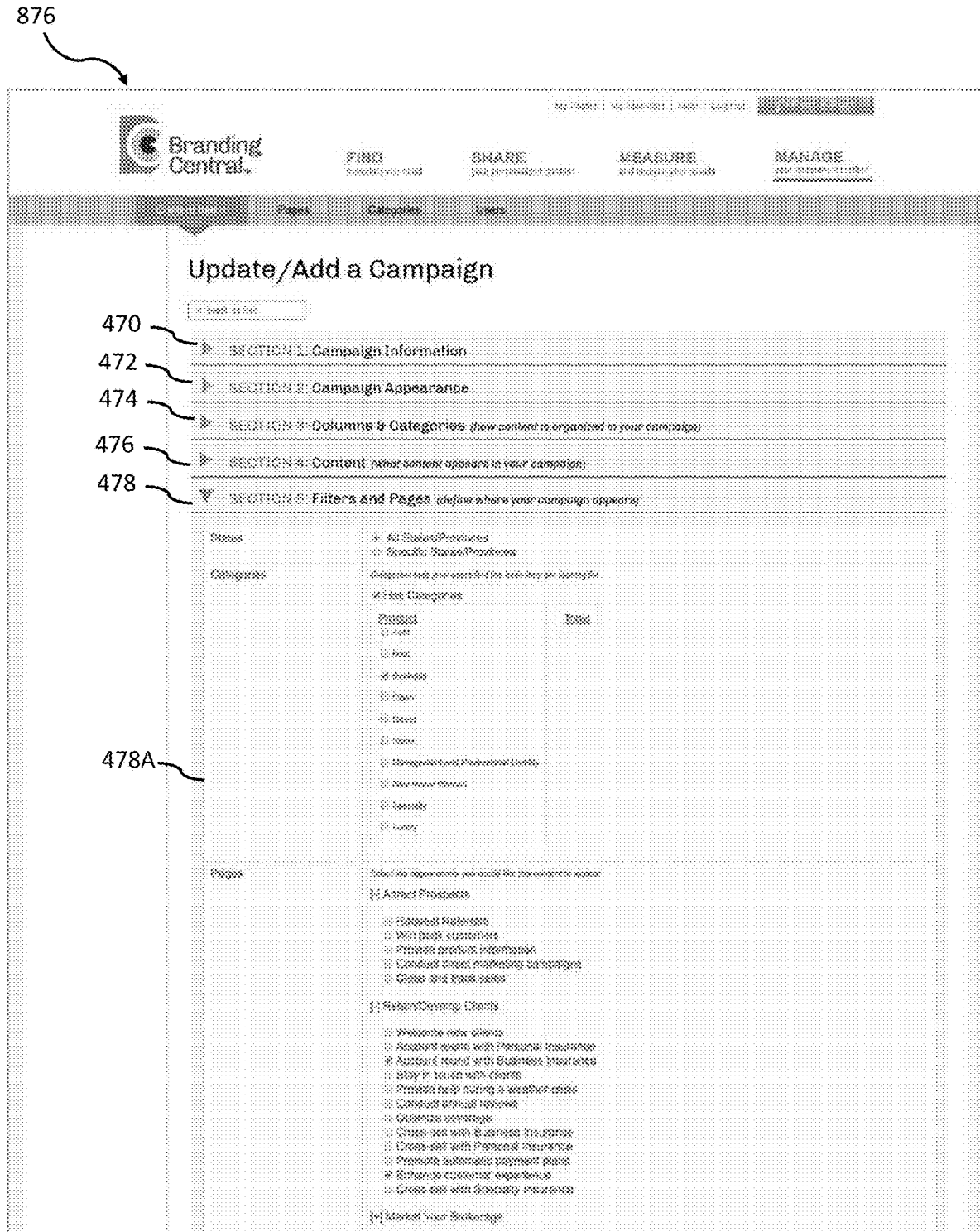
FIG. 4K is a screen illustration of the Content Management System of FIG. 4A according to embodiments of the present disclosure.

FIG. 4K is a view of a screen 876 of the CMS of FIG. 4A. The screen 876 in FIG. 4K shows "Section 5: Filters and Pages" 478 (FIG. 4F) expanded screen 478A. This section 478 defines where the campaign appears within the user platform. The administrator 210 can associate the campaign with various tagging and filtering criteria (e.g. states, categories, products) as well as select the pages (e.g. objectives, sub-objectives tabs) that the campaign will appear in the user platform, similar to that described for a video content item with FIG. 4E.

Figure 4L:
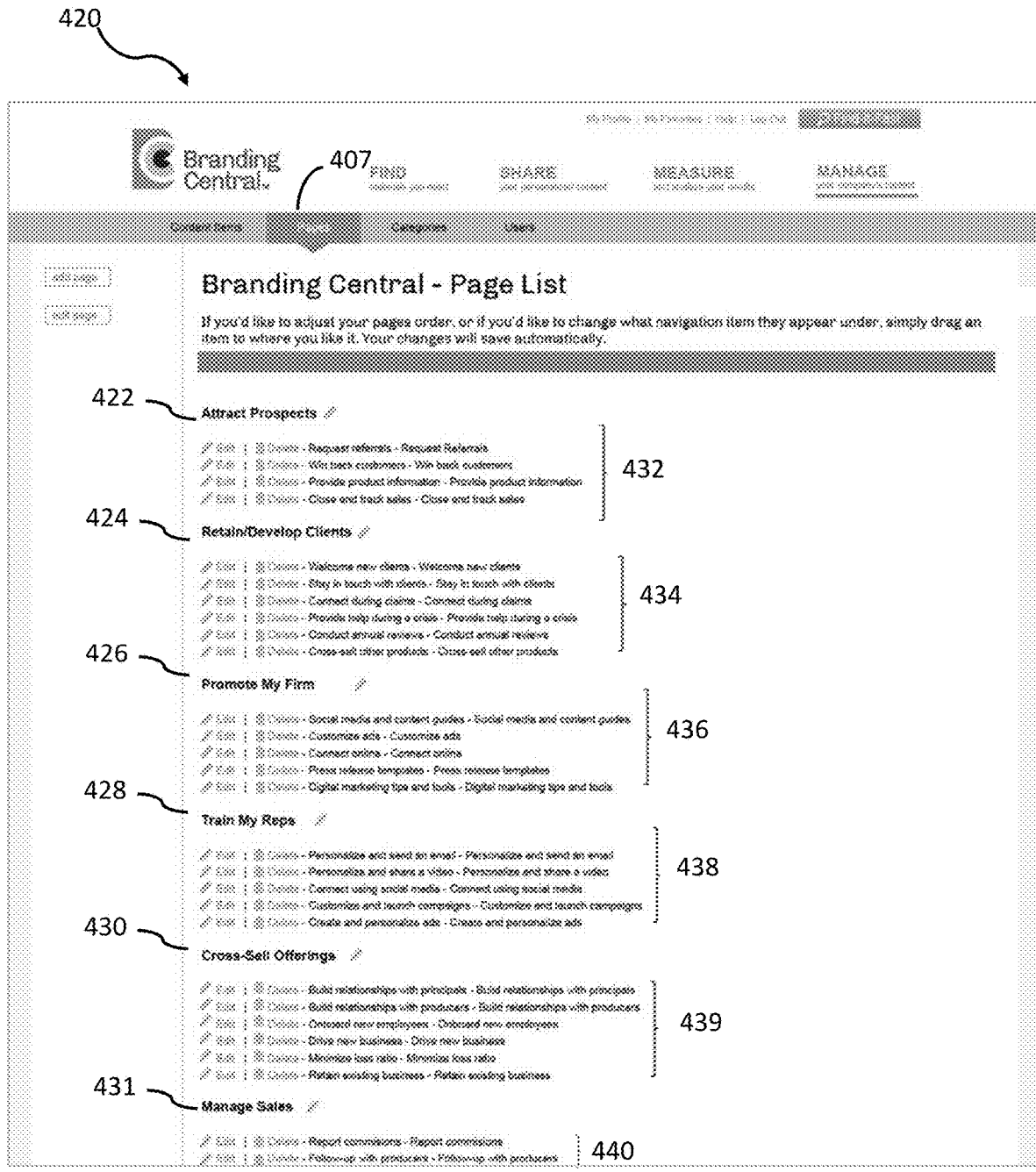
FIG. 4L is a screen illustration of the Content Management System of FIG. 4A according to embodiments of the present disclosure.

FIG. 4L is a view of a screen 420 of the CMS of FIG. 4A. The screen 420 in FIG. 4L depicts the "Pages" section 407 of the CMS 206. The CMS 206 also allows the administrator 210 to manage the structure (e.g. tabs, sub-tabs, navigation, and the like) of the platform itself. From this screen in FIG. 4L, the administrator 210 can add, edit, delete and reorder the primary tabs within the content library as well as all secondary objective-based navigation options/drop-down menus.

Figure 4M:
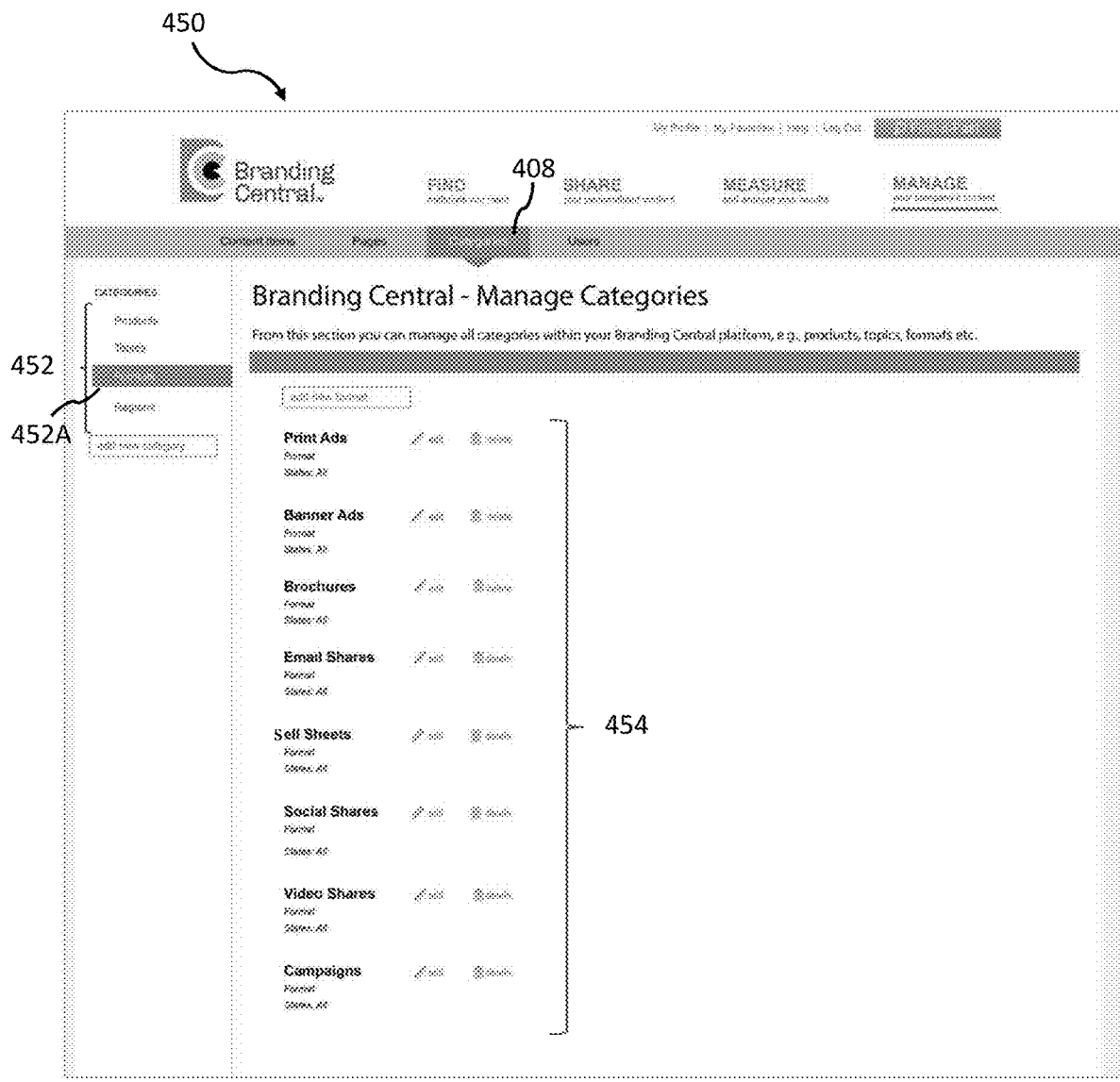
FIG. 4M is a screen illustration of the Content Management System of FIG. 4A according to embodiments of the present disclosure.

FIG. 4M is a view of a screen of the CMS of FIG. 4A. The screen in FIG. 4M depicts the "Categories" section 408 of the CMS 206. The Categories 408 may provide a means to organize and sort content, making it easier to quickly find relevant content within large content libraries. The platform is fully configurable, providing the administrator 210 the ability to add categories and all the content items within them. For example, as shown in FIG. 4M, the sample category "Formats" 452A is selected, which causes the CMS 206 to display a formats 454 list. From the screen 454 in FIG. 4M, the administrator 210 can edit, rearrange, delete, and add new formats as the client's (or administrator's 210 or user's 218) needs evolve over time.

Figure 4N:
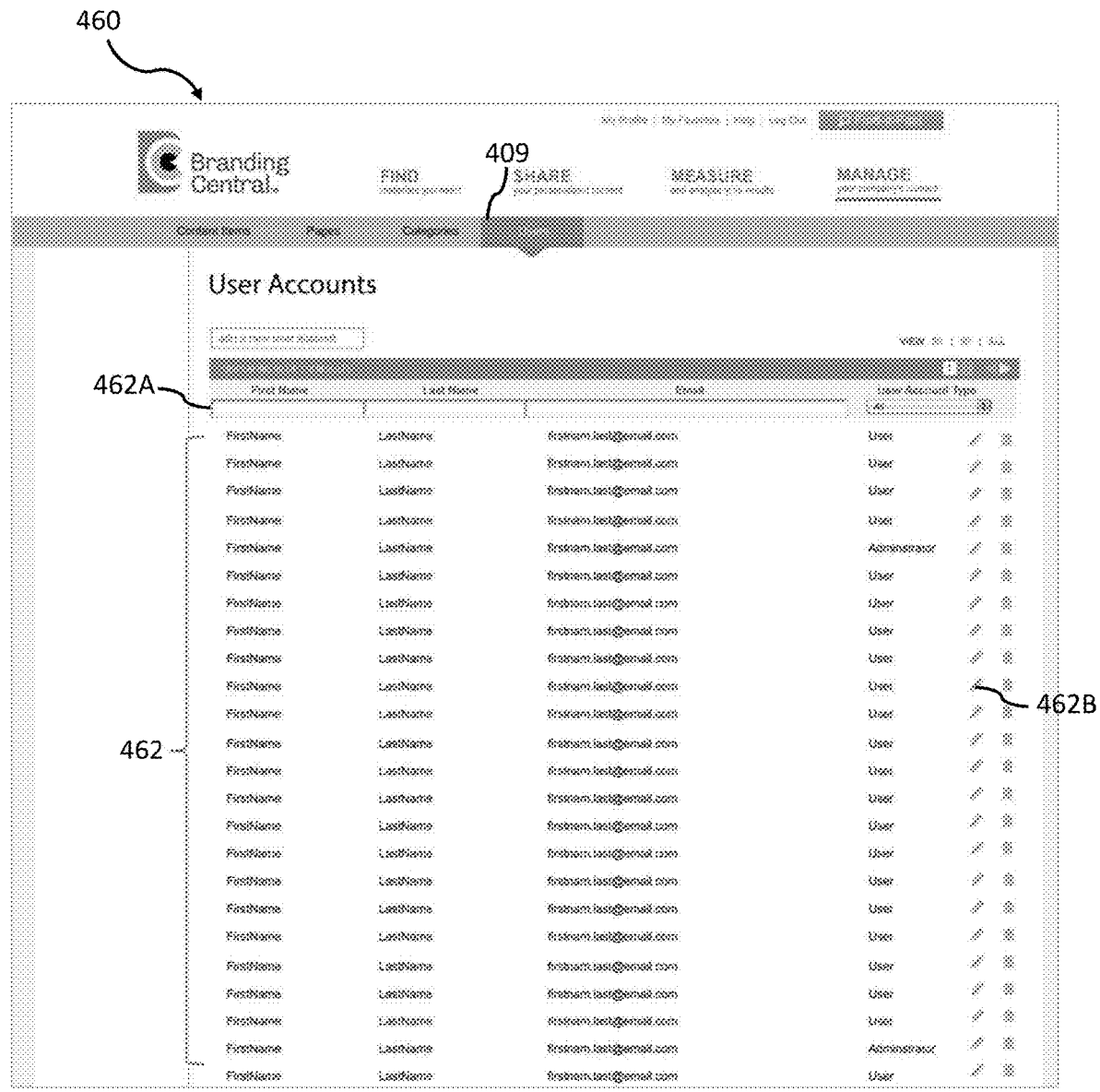
FIG. 4N is a screen illustration of the Content Management System of FIG. 4A according to embodiments of the present disclosure.

FIG. 4N is a view of a screen of the CMS of FIG. 4A. This screen in FIG. 4N depicts the "Users" section 409 of the CMS. The administrator 210 can add new users and manage users in one or more user lists 462, their user profiles, and their user permissions from this screen within the CMS 206. Existing users can be searched by typing into any of the predictive search fields 462A at the top of any column. As the administrator 210 enters each letter of a first name, last name, email address or other column field, the list is refined and/or updated automatically. The administrator 210 can also search users by permission level, e.g., user, manager, administrator, and the like. If the administrator 210 selects the edit button (e.g. pencil icon) 462B associated with a particular user, the administrator 210 will be taken to that user's profile where it can be edited and saved/updated e.g. in the user attributes server or other server.

Figure 5A:
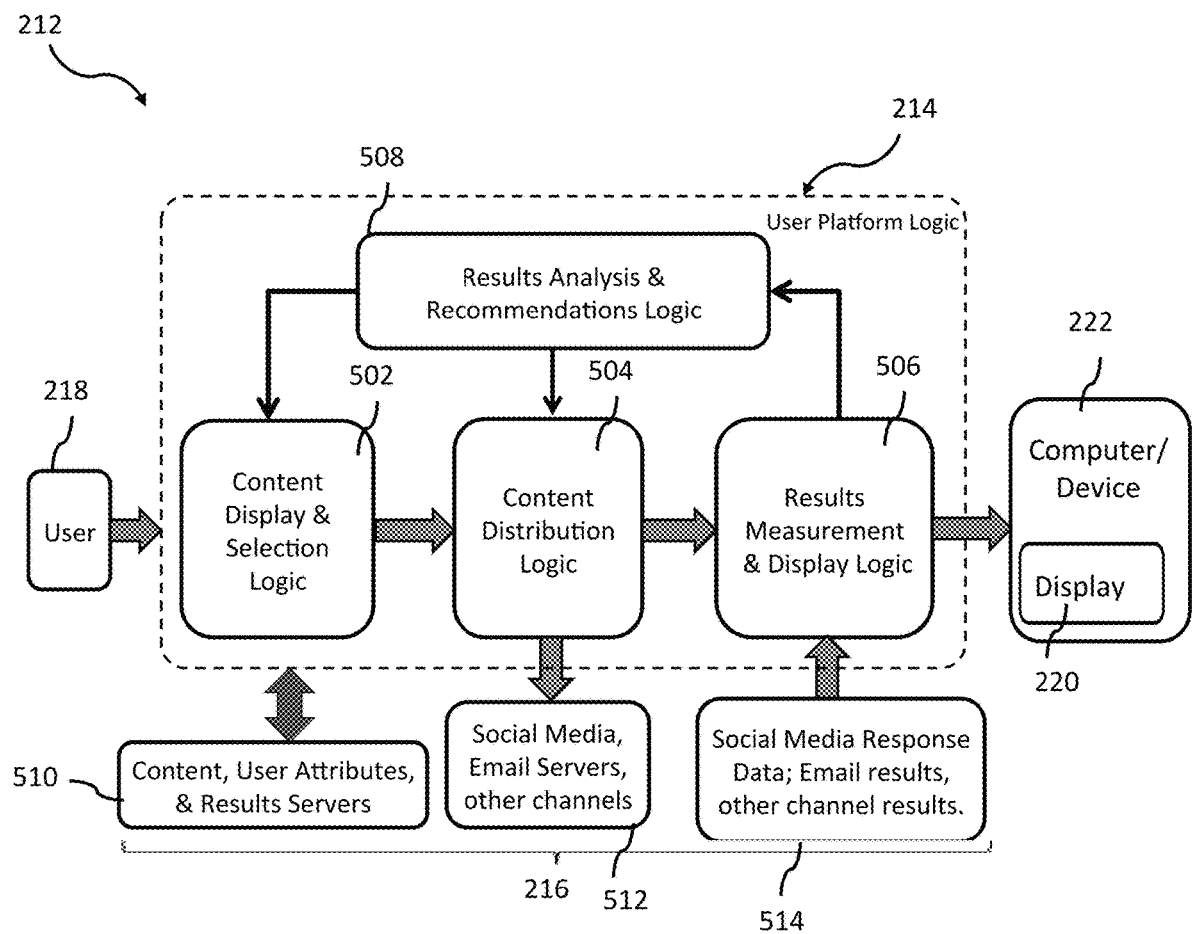
FIG. 5A is a top level block diagram of components of a User Platform System "front-end" according to embodiments of the present disclosure.

Referring to FIGS. 5A-5G, 6 and 7A-7P, FIG. 5A illustrates various components (or devices or Logics) of the UPS "Front-end" 212 (FIG. 2), which may include the user platform system logic 214 in accordance with embodiments of the present disclosure. Referring to FIG. 5A, the User Platform Logic 214 (FIG. 2) may contain various components (or devices or logic) for performing the functions of the present disclosure, such as Content Display & Selection Logic 502, Content Distribution Logic 504, Results Measurement & Display Logic 506, and Results Analysis & Recommendations Logic 508. The Content Display & Selection Logic 502 may receive inputs from the user 218 and content from various content servers 510 and allows the user to find or identify desired content (which may also include a collection of content, such as for a campaign) for distribution and to select and personalize (or customize) the content as desired, as discussed more hereinafter. In some embodiments, the Content Display and Selection Logic 502 may also receive inputs from the Results Analysis and Recommendations logic 508 to provide information or metadata associated with each content piece based on prior performance and also for making recommendations on which content items to select for a given objective (or theme) (discussed more hereinafter). Other logic components may be used if desired, provided they provide comparable function and performance to that described herein for the present disclosure.

The Content Distribution Logic 504 may receive inputs from the user 218 and from the Content Display and Selection Logic 502, as well as various content servers 510, and allows the user to select desired distribution channels for the selected and/or personalized content to be distributed, and sends the selected content to the selected distribution channels 512, as discussed more herein. The Results Measurement & Display Logic 508 may receive inputs from the user 218 and the Content Distribution Logic 504 and performance/results data, such as Key Performance Indicators (KPIs) discussed hereinafter, from various distribution channel sources 514 and/or from results servers 510, formats the data/information for display, visualization or reports on the display 220 which may be part of the computer or device 222 (FIG. 2), for review by the user 218. In some embodiments, the results, measurement and display logic 506 may provide performance or results data to the Results Analysis and Recommendations Logic 508.

The Results Analysis and Recommendations Logic 508 may provide data relating to the analysis of results data provided by the Results Measurement and Display Logic 506, such as content and channel ranking data, recommendations data or other data, (as discussed herein) to the Content Display and Selection Logic 502 and Content Distribution Logic 504.

The User Platform Logic 214 also receives inputs from and stores data to a User Attributes server 510, which contains information/data about the user 218, such as for personalizing content, and information for other personalizing or customizing purposes. As described hereinbefore with FIG. 2, the User Platform System 214 may be accessed/used by the user 218 and/or the Admin 210, which may be collectively referred to herein as the user 218.

FIG. 5B is a flow diagram 500 of one embodiment of a process or Logic for implementing the User Platform Logic 214 of FIG. 5A. The logic begins at a block 501, which displays a landing page 700 with tabs 707: FIND, SHARE, MEASURE (see FIG. 7A). Next, at block 502A, the UPS 214 performs the Content Display and Selection Logic 502 (FIG. 5A, FIG. 5C). Next, at block 504A, the UPS 214 performs the Content Distribution Logic 504 (FIG. 5A, FIG. 5D, FIG. 5E). Next, at block 506A, the UPS 214 performs the Results and Measurement and Display Logic 506 (FIG. 5A, FIG. 5F). Next, at block 508A, the UPS 214 performs the Results Analysis and Recommendations Logic 508 (FIG. 5A, FIG. 5G) (if selected).

Figure 7A:
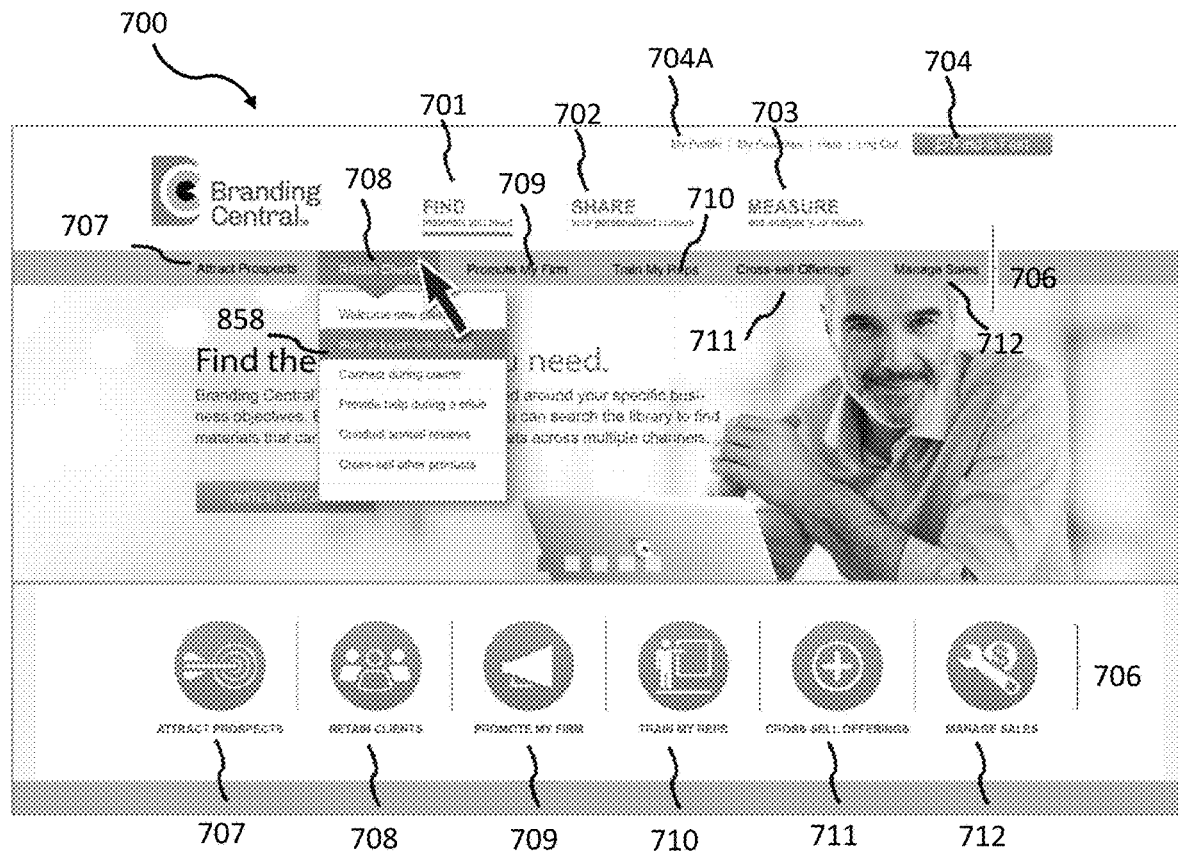
FIG. 7A is a view of a screen illustration of a User Platform System according to embodiments of the present disclosure.
Figure 7B:
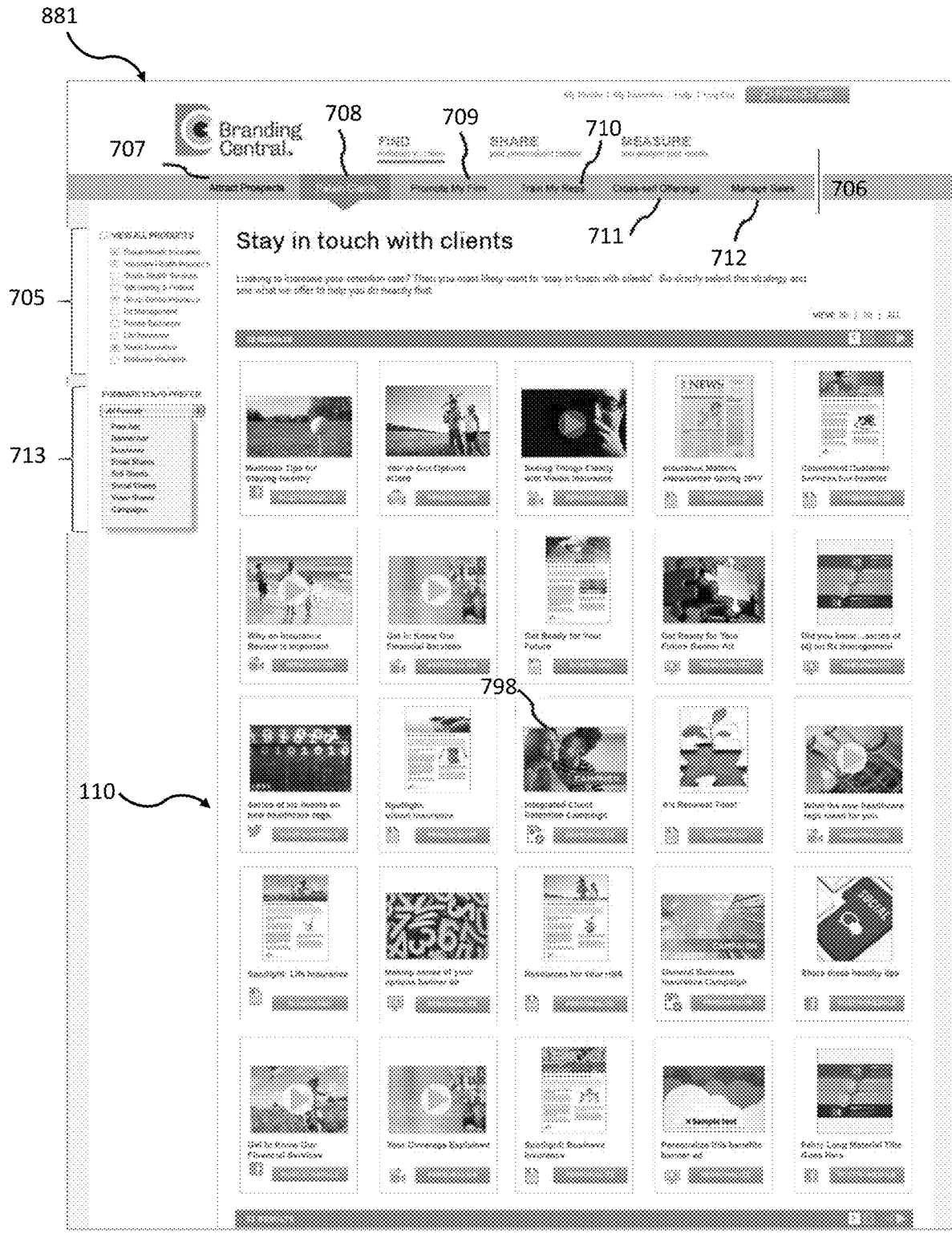
FIG. 7B is a screen illustration of the User Platform System of FIG. 7A according to embodiments of the present disclosure.

FIG. 5C is a flow diagram 500C of one embodiment of a process or logic for implementing the Content Display and Selection Logic 502 (FIG. 502A) according to embodiments of the present disclosure. At block 510, the UPS 214 (FIG. 2, FIG. 5A) retrieves and displays Top Level Goals/Objectives options tabs 706 (FIG. 7A), for example, Attract Prospects 707, Retain Clients 708, Promote My Firm 709, Train My Reps 710, Cross-Sell Offerings 711, Manage Sales 712, and the like. Next, at block 512, the UPS 214 receives selected Goals/Objectives 706 from the user 218 or Administrator 210 (FIG. 2). Next, at block 514, the UPS 214 retrieves & displays strategy options (or sub-objectives) 858 for selected goals and objectives 706 (FIG. 7A). Next, at block 516, the UPS 214 receives selected goals and objectives 706 from the user 218 or administrator 210 (FIG. 2). Next, at block 518, the UPS 214 retrieves & displays content filter options 705 (FIG. 7B). The logic may also display a content library screen 881 (FIG. 7B), with a central library 110 based on the objective and sub-objective selected in screen 700. Next, block 520 receives selected content filter option 705 from the user 218 or administrator 210 (FIG. 2). Next, block 522 retrieves and displays content library 110 (FIG. 7B) from Content Server 216 (FIG. 2) based on user selected goals and objectives 706, strategy 858, and filters 705. Next, block 524 displays effectiveness ranking & channel ranking and sorts content items by effectiveness ranking (FIG. 10), if selected (discussed in greater detail hereinafter with FIG. 7D for Video item or FIG. 7G for a campaign as discussed). The term "ranking" may be used interchangeably with the term "rating" for the purposes of this disclosure. The UPS 214 may also provide recommendations based on the effectiveness ranking, if selected (discussed in greater detail hereinafter). Next, block 526 determines if a content item, is selected from the content library 110. If no content item is selected, the UPS 214 may exit the Content Display & Selection Logic 502. If a content item is selected, block 528 retrieves and displays selected content item details. Next, block 530 determines if the option to personalize the selected content item was selected. If the option to personalize the selected item was not selected, the UPS 214 may exit the Content Display & Selection Logic 502. If the option to personalize the selected content item was selected, block 532 receives User Personalized Data in one or more fields 716A, 716B, 716C, 718 (FIG. 7C) to personalize/customize the selected content item & saves the data in the UPS Content Server. The UPS 214 may proceed again to block 522 and display content library 110 (FIG. 7B) from User Content Server 216 based on user selected goals/objectives 706, strategy 858 and filters 705, as discussed above. When the user 218 is finished selecting content items 110 (FIG. 7B), the UPS 214 will determine at block 526 that no more content items are being selected and proceed to exit the Content Display & Selection Logic 500C, or proceed to block 530 and determine that the user has chosen not to personalize a selected content item and exit the Content Display & Selection Logic 502.

Referring to FIGS. 5D and 5E, the Content Share/Distribution Logic 504 (FIG. 5A) may comprise two components or logics, a Content/Share Distribution Set-up Logic (FIG. 5D) and a pre-distribution message logic (FIG. 5E). FIG. 5D is a flow chart of the Content Share/Distribution Set-up Logic 533 according to embodiments of the present disclosure. Here, at block 534, the UPS 214 (FIG. 2) retrieves and displays Sharing Channel Options (e.g., with reference to FIG. 7D, email 719, Facebook 721, Twitter 723, LinkedIn 725, and the like) which is discussed in greater detail hereinafter. Next, block 536 receives selected Sharing Channels (or distribution channels) from the user 218 or administrator 210 (FIG. 2). Next, block 538 retrieves and displays recipient options for selected Channels. Next, block 540 receives selected recipients from the user 218 or administrator 210 (FIG. 2), for example, by manually entering recipients individually in an input field 726 or by selecting from a predetermined mailing lists 727 (FIG. 7E). Next, block 542 retrieves and displays schedule options 728 (FIG. 7F) for scheduling distribution of the selected content item. Next, block 544 receives selected schedule options 728 (FIG. 7F) from the user 218 or administrator 210. Next, block 546 saves channels and schedules on user selected content on the UPS server. Then, the UPS 214 may exit the Content Share/Distribution Set-up Logic 504.

The Content Share/Distribution Logic 504 may also comprise Pre-Distribution Message Logic (FIG. 5E). Referring to FIGS. 5E and 12, FIG. 5E is a flow chart of the Pre-Distribution Message Logic 547. Here, at block 548, the UPS 214 determines whether it is the appropriate time to send pre-distribution message 1200 (FIG. 12), e.g., a predetermined time before a content item is scheduled to be distributed, such as 4 hours beforehand. Other times may be used, if desired, and may be pre-set by the system or set/adjusted by the user 218 or the administrator 210. If the determination 548 is No, the UPS 214 exits the Pre-Distribution Message Logic 547. If the determination 548 is Yes, block 550 determines whether any content items are not available, obsolete/stale, or not optimal. If the determination 550 is Yes, block 552 determines suitable replacement item(s), discussed more hereinafter. If the determination 550 is No, the UPS 214 may skip the determination step 552 for suitable replacement items. Then, block 554 sends pre-distribution message(s) (such as a pre-distribution message 1200 shown in FIG. 12) to user(s) with list of content and timing, and recommended replacements. Next, block 556 determines whether the user has adjusted the content, channel, or schedule, e.g. based on the pre-distribution message 1200 (FIG. 12). If the determination 556 is Yes, block 558 receives and saves the adjusted content, channels and schedule. If the determination 556 is No, block 560 distributes selected content to selected media channels based on selected schedule. Then, the UPS 214 exits the Pre-Distribution Message Logic 547.

FIG. 5F is a flow diagram 506A of one embodiment of a process or logic for implementing the Results Measurement & Display Logic 506 according to embodiments of the present disclosure. Here, at block 562 the UPS 214 displays a page 739 (FIG. 7J) with tabs 740 such as, for example, My Results 742, Company Results 744, etc. Then, at block 564 the UPS 214 determines whether the My Results tab 742 is selected. If the determination 564 is Yes, block 566 retrieves and displays My Results top level options 746 (i.e. a "Dashboard" 746) by content/channel type, and showing certain key performance indicators (KPIs) for each; for example, by documents (# views, downloads) 748, emails (# created, recipients) 750, videos (# personalized views/impressions) 752, banner ads (# created, impressions) 754, Facebook posts (# posts shared, impressions/reached) 756, Twitter posts (# posts shared, impressions/reached) 758, LinkedIn posts (# posts shared, impressions/reached) 760 and campaigns (# created, impressions) 762. Then, block 568 receives selected top level results area to view (e.g. for document shares 748 shown in FIG. 7K); then, block 570 retrieves and displays selected results area 764 (discussed more hereinafter with FIG. 7K). Then, block 572 receives selected Content item 766 (FIG. 7K) to view results. Then, block 574 retrieves and displays detailed results 768 (FIG. 7L) for the selected content item 766; then, block 576 receives selected specific share 770 (FIG. 7N) to view results for the specific share 770. Then, block 578 displays selected share graph 772 (FIG. 7N) or receives selected details of a share 940, 942 (FIG. 7M) at block 576 and block 578 displays corresponding pop-up displays 941, 943 showing desired details; and then exits the Results Measurement & Display Logic 506. Similar actions occur for FIGS. 7N, 7P, 7Q discussed hereinafter. If the determination 564 is No, block 580 determines whether Company Results 774 is selected. If the determination 580 is No, the UPS 214 may exit the Results Measurement & Display Logic 506. If the determination 580 is Yes, block 582 retrieves and displays Company Results Top Level options 774 (FIG. 7R) (e.g. a similar Dashboard as shown in FIG. 7J but for data associated with multiple users) by content/channel type (and showing certain KPIs) such as documents 776, emails 778, videos 780, banner ads 782, Facebook posts 784, Twitter posts 786, LinkedIn posts 788 and campaigns 790. Other categories and KPIs may be displayed if desired. Then, block 584 determines whether "Activity By User" 792 (FIG. 7S) is selected. If Yes, block 585 retrieves and displays results table 794 (FIG. 7S) aggregated by user and content/channel type; or, if the determination 584 is No, block 586 receives selected top level results area to view; then, block 588 retrieves and displays selected results area by content/channel type for all users; then, block 590 receives selected detailed results item; then, block 592 retrieves and displays selected detailed results item aggregated by User share data (for all users) for selected content; and then the UPS 214 may proceed to exit the Results Measurement & Display Logic 506. Blocks 586, 588, 590, 592 are similar to the structure and process (and display) for My Results described in connection with blocks 568, 570, 572, 574, 576 and 578, but aggregated for data associated with a plurality of users.

Figure 5G:
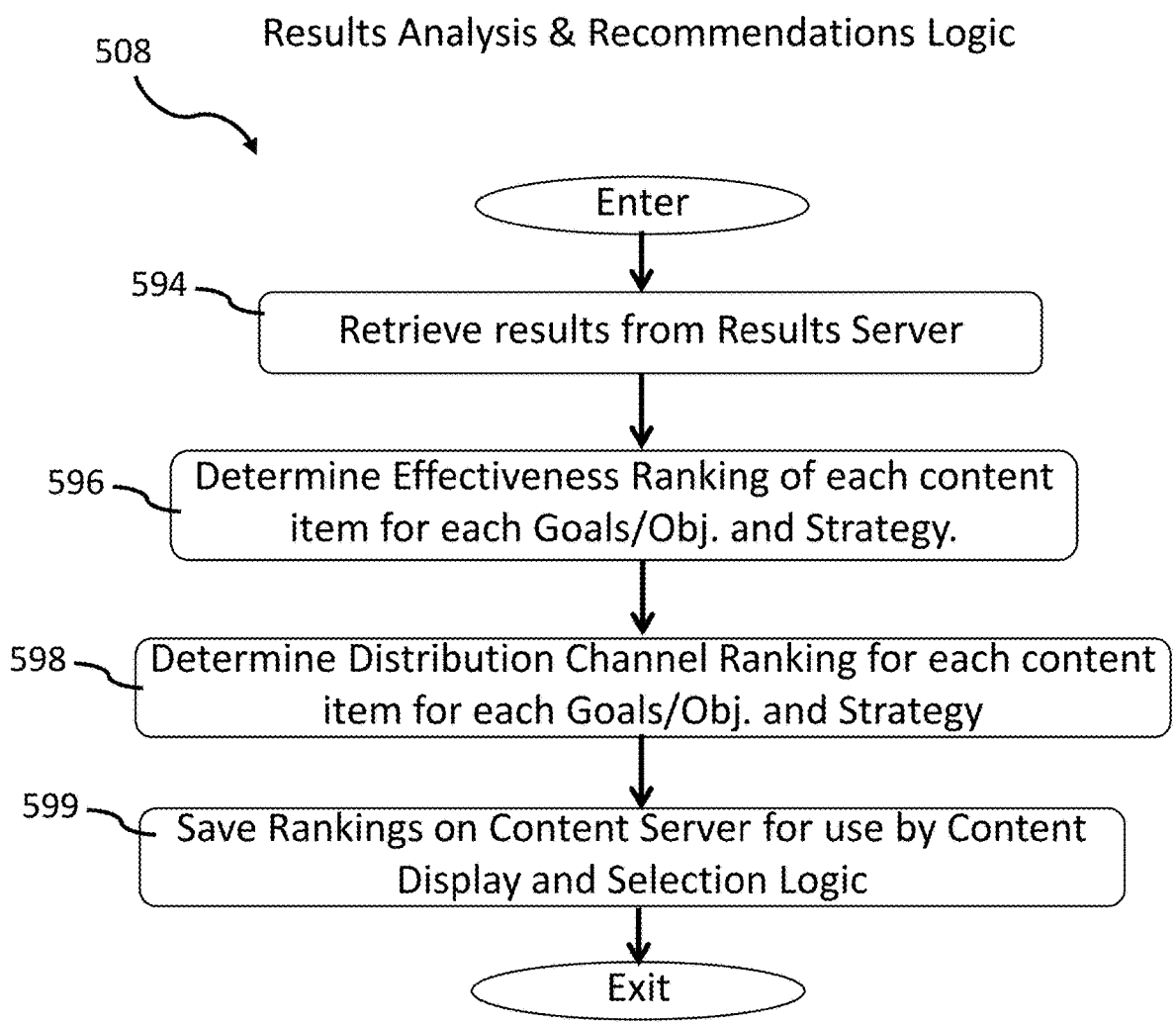
FIG. 5G is a flow diagram of a portion of the User Platform Logic of FIG. 5A that a User Platform System may be configured to execute according to embodiments of the present disclosure.
Figure 9:
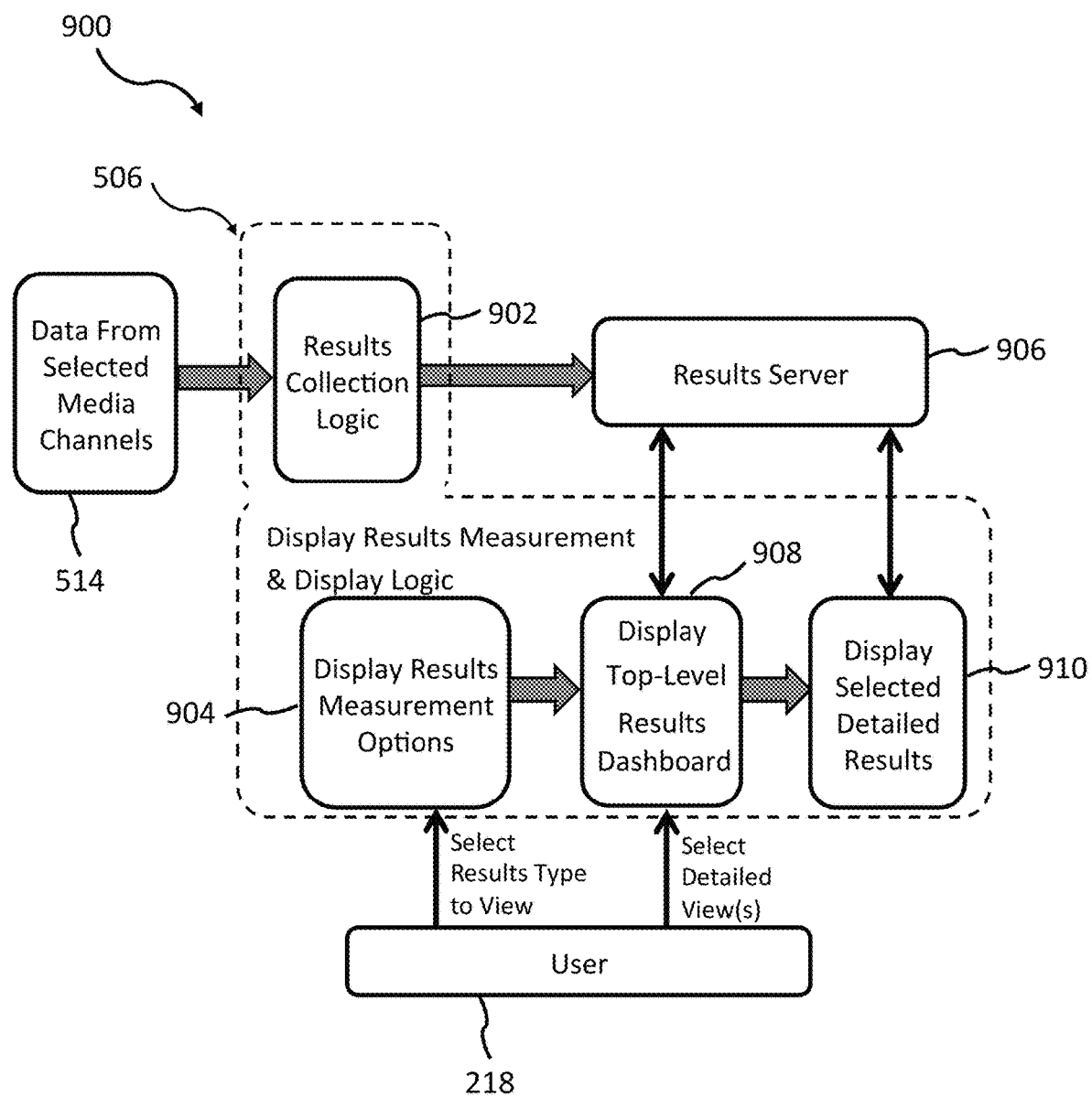
FIG. 9 is an overview of logic that may be used to provide the Results Measurement & Display features/functions of the User platform logic, in accordance with embodiments of the present disclosure.

FIG. 5G is a flow diagram 508 of one embodiment of a process or logic for implementing the Results Analysis & Recommendations Logic 508 according to embodiments of the present disclosure. Here, at block 594, the UPS 214 retrieves results from the Results Server 906 (FIG. 9). Then, at block 596, the UPS 214 determines overall effectiveness ranking of each content item for each goal/objective and/or strategy/sub-objective. For example, effectiveness ranking may be determined by summing KPIs for each content item and rank/compares by totals (or averages) for each content item, comparing content items based on a ratio of KPIs over the number of distributions. Then, at block 598, the UPS 214 determines distribution channel ranking for each content item for each Goals/Objective and Strategy. For example, effectiveness ranking may be determined by summing KPIs for each content item and rank/compares by totals (or averages) for each content item, comparing content items based on a ratio of KPIs over the number of distributions. Then, at block 599, the UPS 214 saves rankings on the Content Server 216 for use by Content Display and Selection Logic 502. Then, the UPS 214 may exit the Results Analysis & Recommendations Logic 508.

Figure 6:
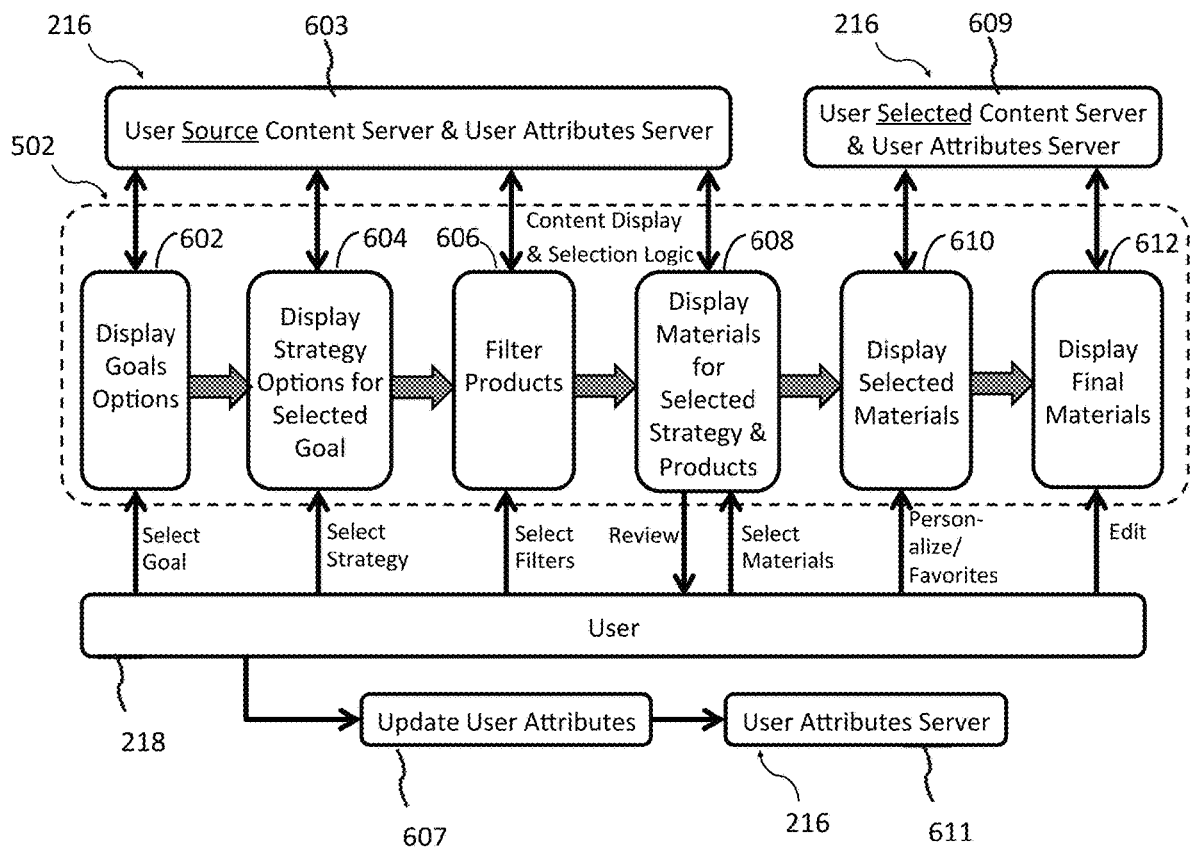
FIG. 6 is a more detailed block diagram of one of the components of FIG. 5A in accordance with embodiments of the present disclosure.

FIG. 6 is a block diagram 600 showing some of the logic components that may be used to implement the Content Display and Selection Logic 502 (FIG. 5A), and the interaction with the user 218, a sample of data exchanged or actions or results, and interactions with certain servers; e.g. User Content and Attributed Servers, some of which are also shown/discussed in the low diagram 500C of FIG. 5C and may also be referred to as "Find and Personalize" herein. There may be a user "source" content server 603 which may hold content to the UPS and a user "selected" content server which may hold content selected by the user for a given objective/strategy or a given set of personalized content or information/attributes of user, and a User Attributes Server 611 which may hold personalized information or data of user or admin (e.g. profile info, job, contact info, and the like), which may collectively be referred to as the servers 216. Referring to FIG. 6 (and flow diagram of FIG. 5C and screen illustrations of FIGS. 7A-7D and 7G), at block 602, the logic 502 displays screen options (e.g. FIG. 7A) for the goals or objectives 706 selected by the user 218 from the content servers 216. The specific goals/objectives 706 listed on the screen 700 are based on how the user platform 214 (FIG. 2) has been customized by the administrator 210 for the organization/user, as discussed hereinbefore regarding the "back end" Content Management System (CMS) (FIG. 2). Next, at block 604, the logic displays options (e.g. FIG. 7A) for "strategies" (or sub-objectives 858) based on the user-selected goal/objective 708, and the user 218 selects the desired content item material to address the selected strategy (or sub-objective). Next, at block 606 the logic 502 displays various product filters 705 (FIG. 7B) from content servers 216 and the user may select any product filters 705 desired, which limits the number of content items 110 that are displayed for review/selection, based on which product filters 705 are selected. Next, at block 608, the logic 502 obtains the desired content items for the selected strategy and products from a User "Source" Content Server 603 and displays the content items 110 (FIG. 7B). The logic 502 may also save the "selected" content in the User "Selected" Content Server 608 or place a pointer in this server 608 to the location of the selected content in the User "Source" Content Server 603. The "Selected" Content Server 609 may be used for the User's Content Library or User's Library to store user selections (and personalization) for later use. The user 218 can now review and select the desired content items/materials for personalization and distribution. Next, at block 610, the logic 502 displays (e.g. FIGS. 7C and 7G) the selected materials and provides the option to the user to personalize the materials based on the user's profile or attributes, and the user selects which items to personalize. Next, at block 612, the logic displays the final version of the materials selected by the user. During the performance of the logic 502 to find and personalize content, the logic 502 at a block 607 may update the User Attributes Server with information about the user content selections or other information/data or updates about the user for future use, e.g. profile data, and the like. Also, the user may at anytime click on a My Profile 704A (FIG. 7A), on any of the screens, to view and update the user's profile information, e.g. name, contact info, image, and the like, which when saved may be stored in the User Attributes Server 611.

FIG. 7A is a view of a screen of an exemplary UPS according to an embodiment of the present disclosure. This screen of FIG. 7A depicts a default user platform home screen (or page) 700. The user platform is fully customizable, meaning defaults screens that follow may be customized with subscriber and/or client (e.g. admin 210) branding and colors, or if further customization is required, a completely unique user interface (UI) may be implemented. Even navigation elements, sorts, filters and tagging criteria, can be completely customized and managed by the administrator 210 via a robust CMS 206. The default home page 700 also provides a large central area where the administrator 210 can manage several promotions, announcements, access to tutorials, and the like.

The UPS of FIG. 7A has three main areas of functionality and purpose: (1) Find Materials 701; (2) Personalize & Share 702; and (3) Measure Results 703. The Find Materials 703 section provides a centralized library where the administrator 210 can organize and store materials and/or content so users can quickly find the individual materials and/or content and campaigns they need using a customized organizational strategy and tagging structure that aligns with how the subscriber/client (e.g. admin 210) does business. The content may also be a tool, such as an active Excel spreadsheet, PowerPoint slides, Calculator spreadsheet, and the like. The content may also be a HTML 5 banner ad. The centralized library of the Find Materials 701 section leverages a flexible organizational structure that can be tailored for each client's (e.g. admin 210) unique needs, including the ability to organize content by business objective.

In addition to customizable objective based navigation, the User Platform System may include a "Find-It-Fast" feature 704 which allows users to search across all objectives and find materials by keyword, product, or type of material. The search criteria employed by the Find-It-Fast feature 704 can be tailored to fit a client's (e.g. (admin 210) specific needs, e.g., stock keeping unit (SKU) number, date added, region, and the like. Users 218 can even access a list of favorite materials, campaigns, and programs that they can manage and maintain.

The default materials library page 110 also provides a large central area where the administrator 210 can manage several promotions, announcements, access to tutorials, and the like.

The Personalize & Share section provides the function to personalize many material types utilizing a centralized user profile, e.g., photo, company logo, contact information, hours, social media tokens, and the like, and provides the means to share those materials across all kinds of channels including email, webpages, Facebook, Twitter, LinkedIn, and the like. This section provides access to: a content library of customizable materials by type; a user library of materials that have been previously personalized for ready reuse; a user activity calendar which provides an overview of all user activity that has taken place or is scheduled for a future date; an area to manage their user profile; and an area to manage their contact and distribution lists (as shown and discussed herein).

The Measure Results section provides, once content has been shared as discussed above, an analytics dashboard (as discussed above) for users to track utilization and engagement for the materials (or content items) they have used. The administrator 210 has access to a dashboard within an overview of active users, material counts, utilization by user groups and by content type across the organization (or subgroup of the organization) and down to the individual user.

FIG. 7B is a view of a screen 881 of the UPS of FIG. 7A. The screen in FIG. 7B depicts a results screen which displays all materials appropriate for their selection. In this case, the results screen shows Retain Clients 708 (FIG. 7A)>"Stay in touch with clients" 858 (FIG. 7A). When searching by objective, all materials regardless of format, channel or product, etc., are displayed. Results can be further refined by using a variety of filters 705, 713 such as product filters 705 and/or formats 713 available on the left of the screen. In addition, users have access to additional sorts such as keyword, date ascending/descending, alphabetically ascending/descending, and the like. Users can also choose how they would like results to be displayed, e.g., a gallery view, list view, or a horizontal scrolling window.

For some content items, users can select content items for viewing and/or downloading from the User Platform Source Content Server. Advantageously, the UPS provides ready access to content items. For some content items, the UPS provides the users the ability to personalize the content and means to distribute the content once personalized. For example, a user can select a content item that contains a sample email or ecard. The UPS will provide a screen that provides an overview of the customization and distribution process. An ecard is typically a short email message, which may include an email message having text and an HTML image and/or link to a web page. The UPS may be configured with button labels that reflect the appropriate action for selected content items, e.g., View, Download, Personalize, and the like.

Figure 7C:
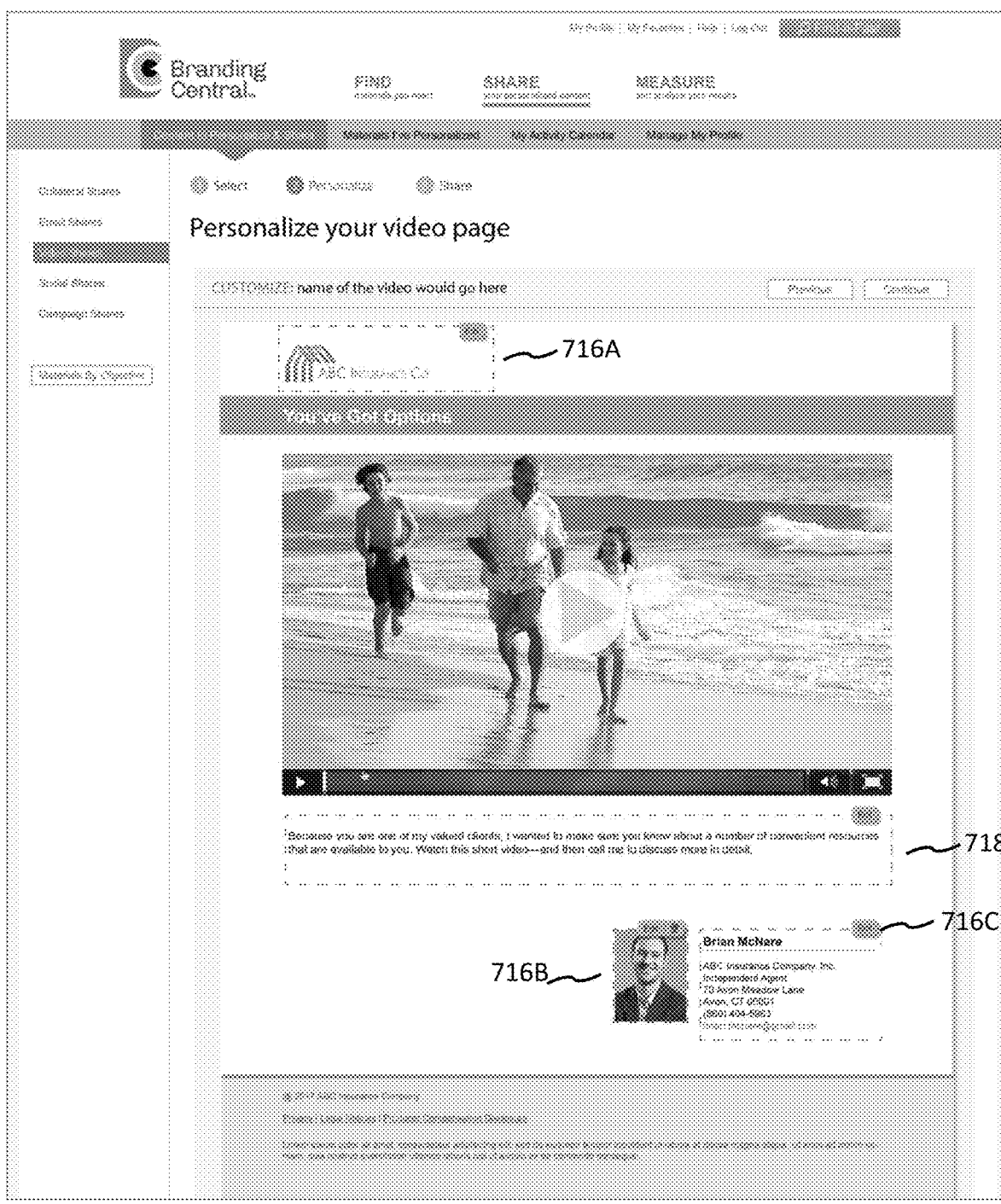
FIG. 7C is a screen illustration of the User Platform System of FIG. 7A according to embodiments of the present disclosure.

FIG. 7C is a view of a screen 882 of the UPS of FIG. 7A. The screen in FIG. 7C depicts an example video landing page if Personalize was selected from a previous screen. As discussed above, content within the video landing page can be personalized automatically according to information contained in the user's profile, including without limitation, company logo 716A, photo 716B, and contact information 716C, streamlining the personalization process for the user. Additional user customization can be accomplished by selecting from pre-approved images, headlines and content blocks 718. If appropriate, any or all regions can be made available for user content as well. The administrator 210 can dictate whether any or all regions of an email (or other content item) are editable by the user or are "locked down" to manage brand compliance. If the regions are editable then the user 218 can edit those fields 716A, 716B, 716C, 718 from this screen 882 or by selecting the My Profile link and editing the user attributes of the user 218 in the User Attributes server 611.

Once the user is finished personalizing the content item, the user can continue, for example, to another screen, and save the personalized content item. Once saved, the video (or other content item) can be saved to the user's personal library for later use. Videos (or other content items) can be distributed via the platform itself. Users can send videos (or other content items) to an individual or to one of multiple distribution lists which are uploaded and managed within the system by the user. The user can schedule the email (or other content item) to be distributed to the selected recipient(s) at a predetermined date and time, as discussed herein.

If an HTML 5 banner ad content item is selected, the platform may support multiple ad sizes for each banner ad in the system, such as 728×90, 300×250, and 160×600. Once the desired size is selected by the user for an HTML 5 banner ad, users are taken step-by-step through each region that can be tailored by the user, e.g., headline, copy, images, contact information, destination link as well as tracking code. As each step is complete, a check mark appears indicating where the user is in the process. The banner and its animation (not shown) can also be reviewed along the way. Once complete, an HTML5 directory archive is made available for download, and is ready for the user to send to media outlets. Alternatively, multiple HTML5 directory archives prepared for a variety of media outlets are made available for download. In addition, banner ads are automatically saved to the user's library for later use.

Video content is another content item that may be selected as a content item in the UPS. Video content items offer users even more opportunity for customization and distribution, including the ability to share across multiple channels. If a video content item is selected, users can choose how they would like to use their video. Users can generate embed code enabling them to post video content within a site they manage. Users can also create a personalized video landing page to share with their clients and prospects across multiple channels as discussed herein.

If the user selects to create a personalized video landing page, a video page may be personalized automatically according to the user's profile (similar to email and other digital content discussed above), including photo, contact information and company logo. Additional customization can be accomplished by selecting from pre-approved images, headlines and content blocks. If appropriate, any or all regions can be made available for user content. The platform supports multiple landing page templates, providing the user even more options, from a simple page to pages with cross-sells and lead generation forms. The administrator 210 can dictate whether any or all regions of a video landing page are editable by the user or are "locked down" to manage brand compliance, as discussed herein.

Figure 7D:
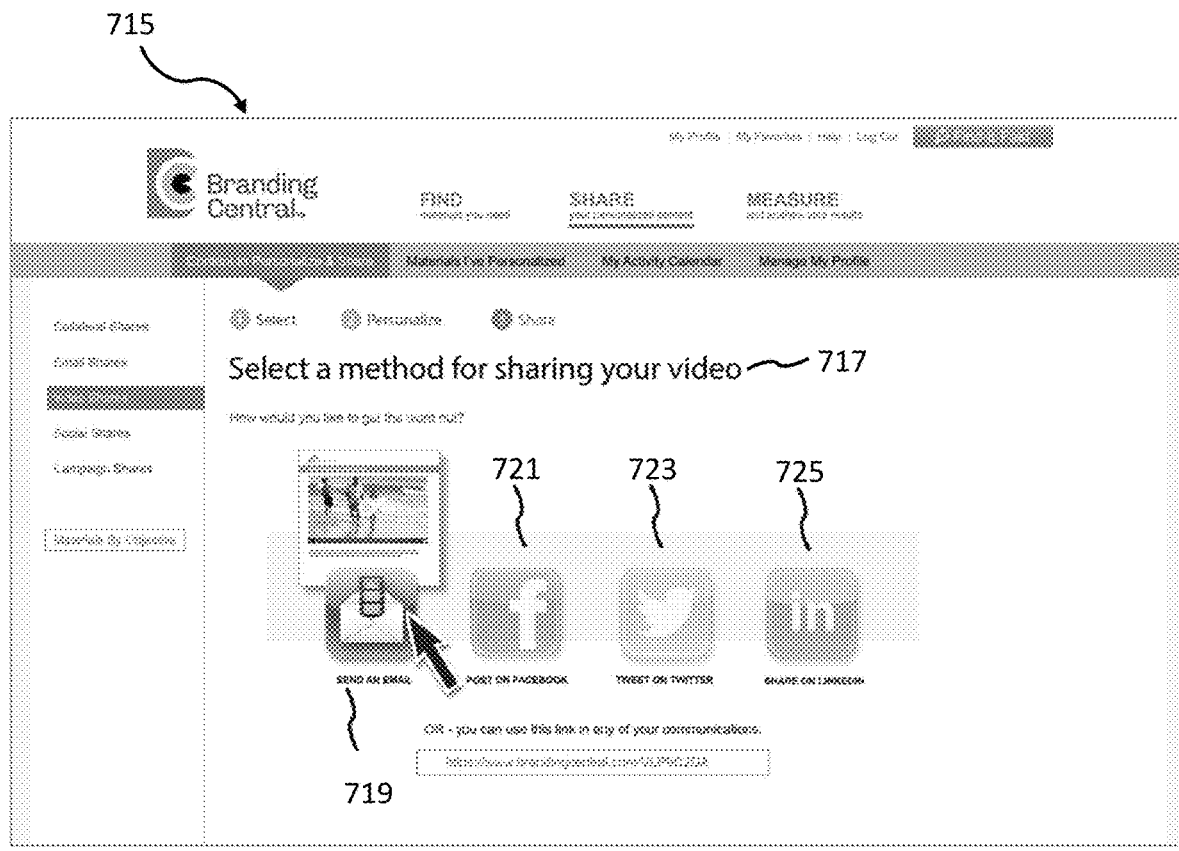
FIG. 7D is a screen illustration of the User Platform System of FIG. 7A according to embodiments of the present disclosure.
Figure 7E:
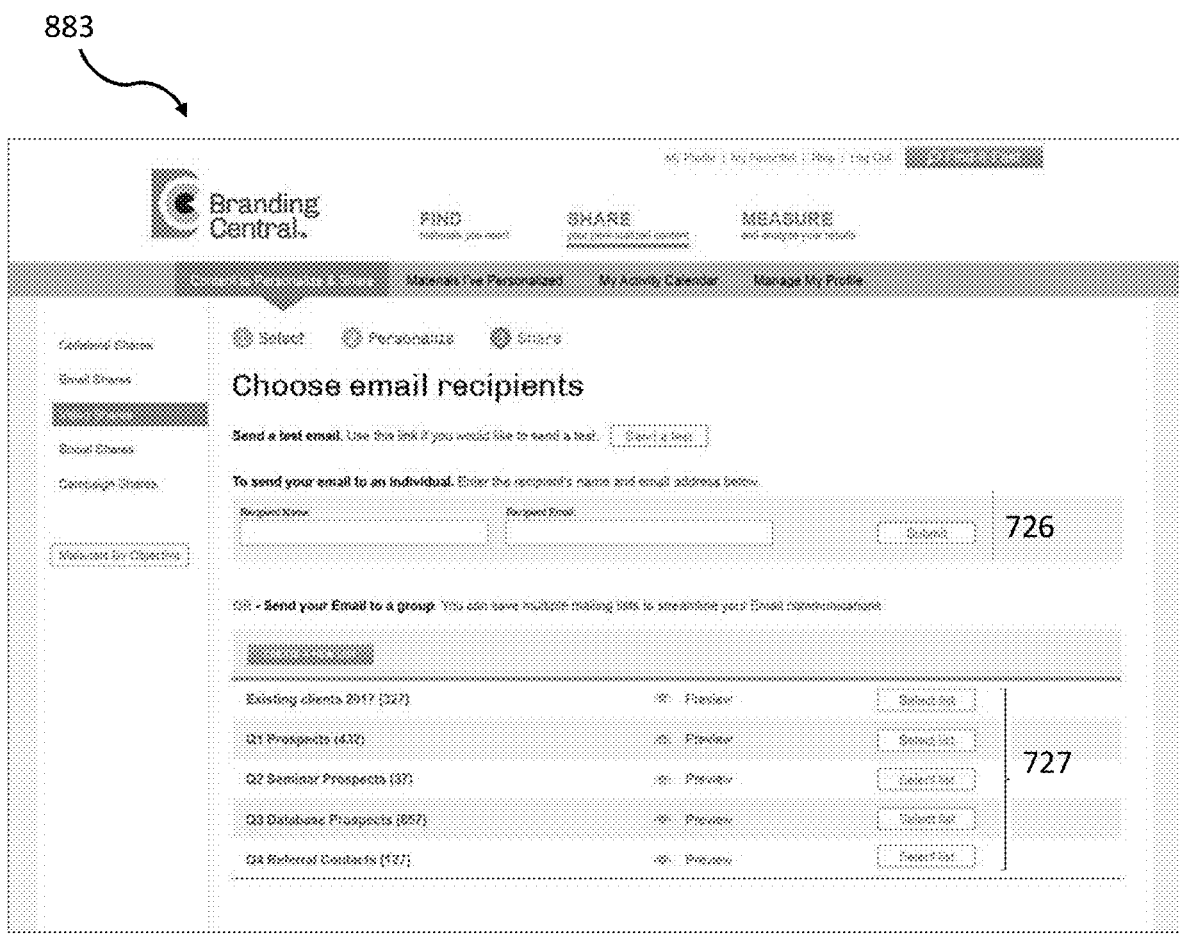
FIG. 7E is a screen illustration of the User Platform System of FIG. 7A according to embodiments of the present disclosure.

Once saved to the user's library, the video landing pages can be shared across multiple channels. Referring to FIG. 7D, the UPS 214 (FIG. 2) generates a screen 715 for allowing the user to select a method of sharing the user's video 717. The UPS 214 provides the user with the different distribution options including, without limitation, email 719, Facebook 721, Twitter 723, LinkedIn 725, and the like. All channel specific content is automatically personalized from the user profile. Emails and social media post can be shared immediately or scheduled for a later date and time. The platform is scalable to accommodate additional channels over time. This same method used to distribute video content via landing page and distributing/sharing it across multiple channels, e.g. referring to FIG. 7D, the video may be distributed via email 719, Facebook 721, Twitter 723, LinkedIn 725, and the like is employed to share other content types as well, such as sell sheets, presentations, and the like.

In addition to selecting content items from the content library (e.g. FIG. 7B), a use may select a pre-packaged campaign from the content library. A pre-packaged campaign may comprise any one or more of individual content items from the content library.

FIG. 7E is a view of the screen 883 of the UPS of FIG. 7A. The screen in FIG. 7E depicts an exemplary recipient selection screen generated by the UPS 214 (FIG. 2). As discussed above, a user 218 can individually enter intended recipients for the selected content item by manually entering the recipient's name and email address (or other address field, for example, a Twitter handle) in the input field 726. Additionally, or alternatively, the user 218 can select one or more mailing lists from a group of predetermined mailing lists 727.

Figure 7F:
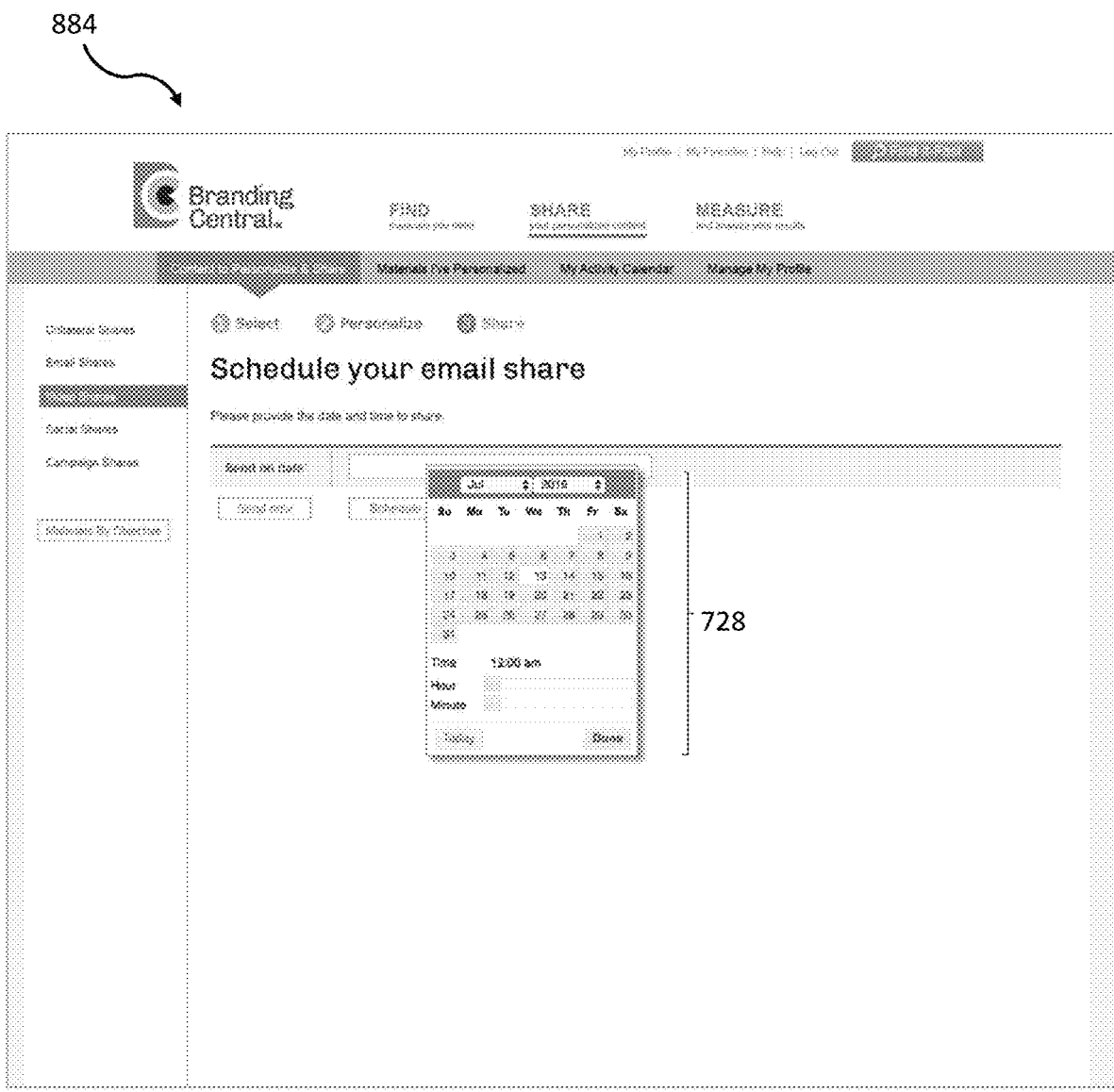
FIG. 7F is a screen illustration of the User Platform System of FIG. 7A according to embodiments of the present disclosure.

FIG. 7F is a view of a screen 884 of the UPS of FIG. 7A. The screen in FIG. 7F depicts an exemplary schedule selection screen generated by the UPS 214 (FIG. 2). As discussed above, a user 218 can select the intended day, month, year and time for distribution of the selected content item from an schedule options field 728. Additionally, if desired, the UPS 214 can include another schedule options field that permits the user to select a frequency of distribution of the selected content item to the selected recipients. Additionally, from this screen, a user can choose to add more content items by selecting the Add Content item button.

Figure 7G:
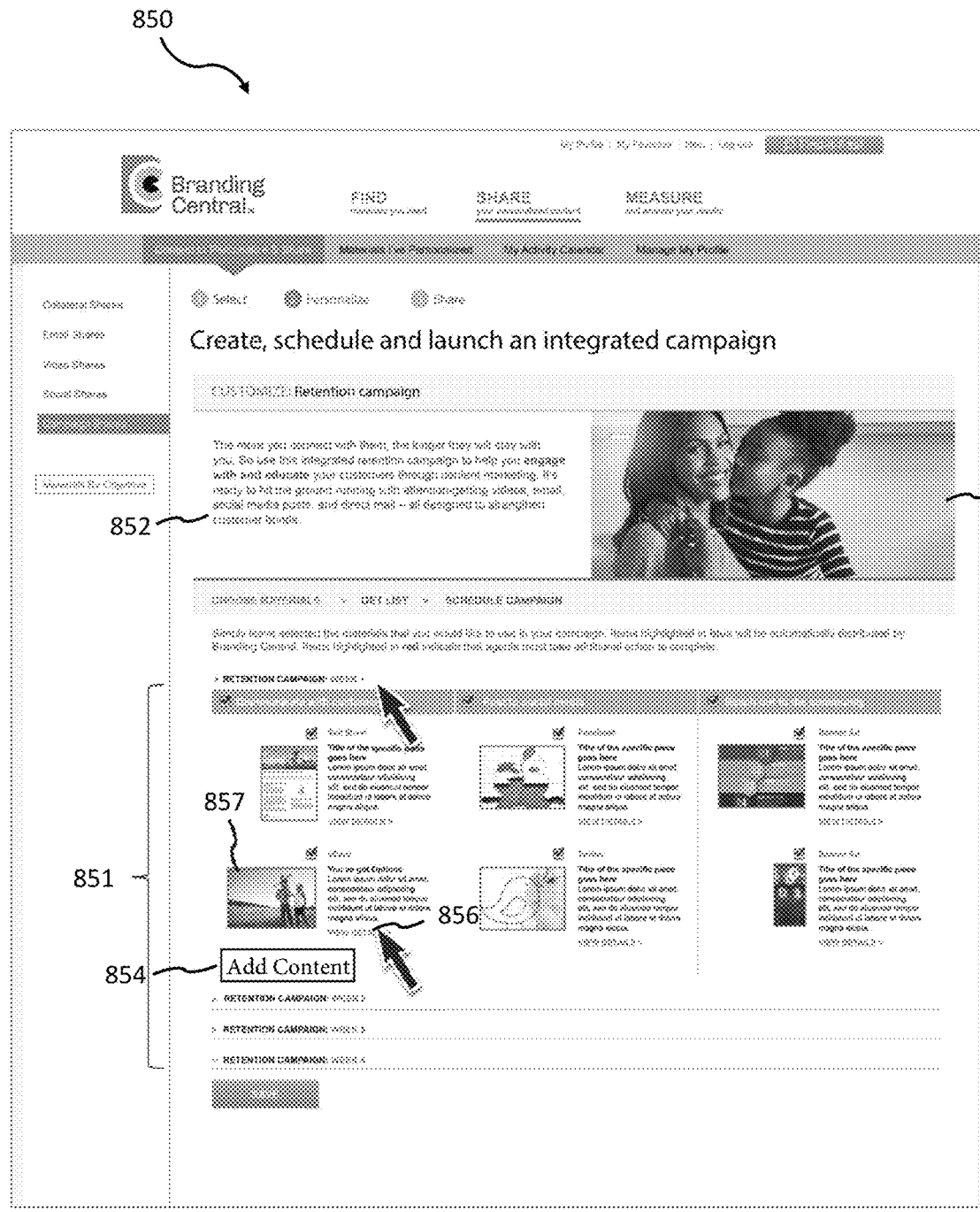
FIG. 7G is a screen illustration of the User Platform System of FIG. 7A according to embodiments of the present disclosure.

FIG. 7G is a view of a screen 850 of the UPS of FIG. 7A. The screen 850 in FIG. 7G depicts an exemplary user experience page had the user selected Personalize from a pre-packaged campaign item from the content library, such as campaign content item 798 shown in FIG. 7B. A pre-packaged campaign 798 groups individual materials together across type and channel to provide the user a pre-defined best practices marketing plan that includes an automated glide path 851 or calendar. The Campaign page provides users an overview of the campaign itself including a description 852 and representative image 853. Below the campaign description, all the recommended material included in the campaign is displayed. Materials can be organized across multiple weeks, channels and formats. Users can review all the recommended material in a campaign and deselect any that they do not wish to include. Additionally, users can add additional content items by selecting the Add Content button 854.

Figure 7H:
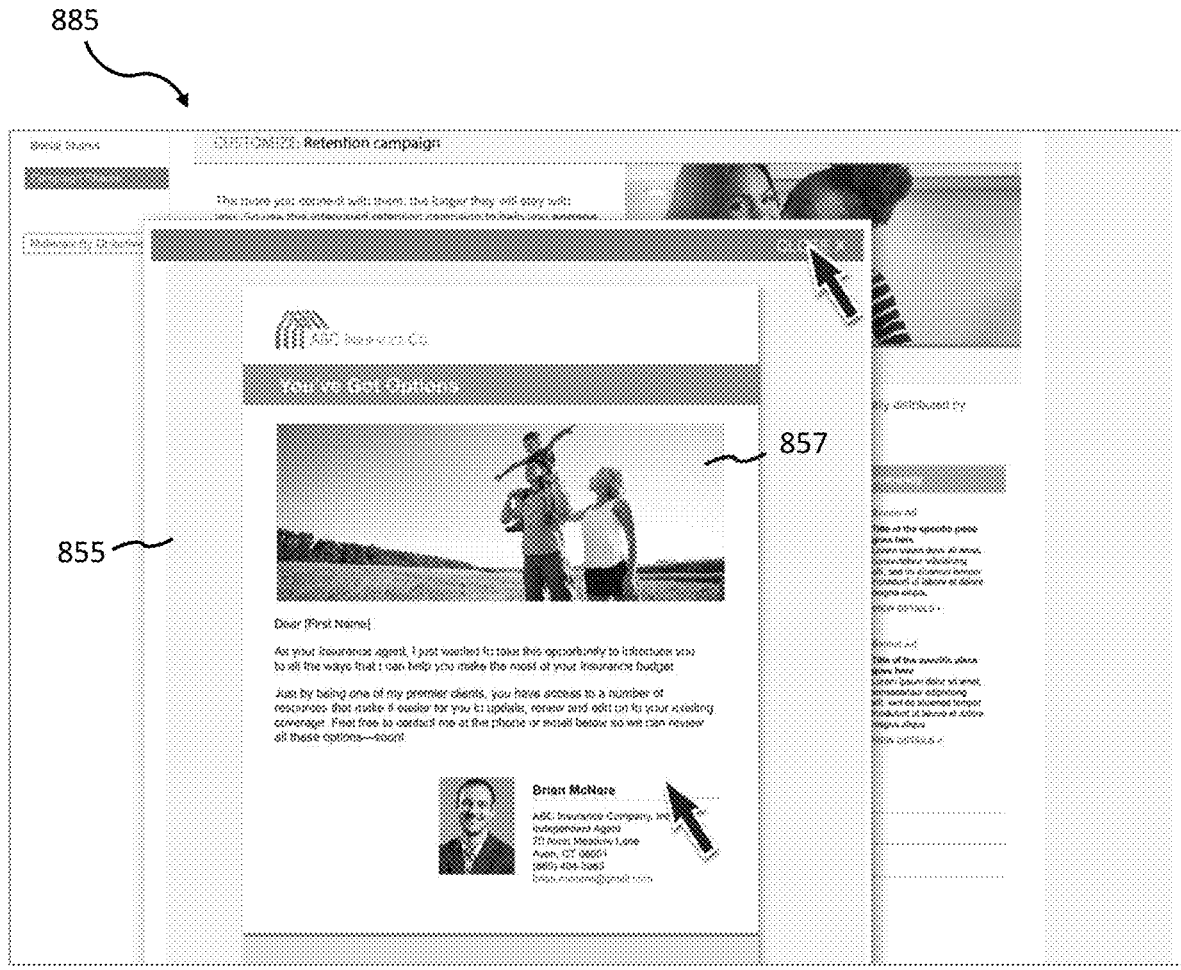
FIG. 7H is a screen illustration of the User Platform System of FIG. 7A according to embodiments of the present disclosure.

FIG. 7H is a view of a screen 885 of the UPS of FIG. 7A. The screen 885 in FIG. 7H depicts an exemplary preview 855 that is available when the user selects the "VIEW DETAILS" links from the campaign overview page. FIG. 7H shows a preview 855 if the VIEW DETAILS link 856 was selected for content item 857 from FIG. 7G. As the preview of the in FIG. 7H shows, wherever appropriate, all material formats are automatically personalized utilizing the user's main profile. All campaign items can be previewed by selecting the "VIEW DETAILS" button adjacent to each item in the campaign including social posts, videos, emails, banner ads, and the like, providing users the opportunity to review all recommended content, how it will appear and even provides the ability to watch videos right from the details window.

Once the user is satisfied with the recommended campaign content, the user can select to continue from the campaign overview screen. Then, the user can automatically send all emails within the campaign to an individual or to one of multiple distribution lists uploaded and managed within the system.

Figure 7I:
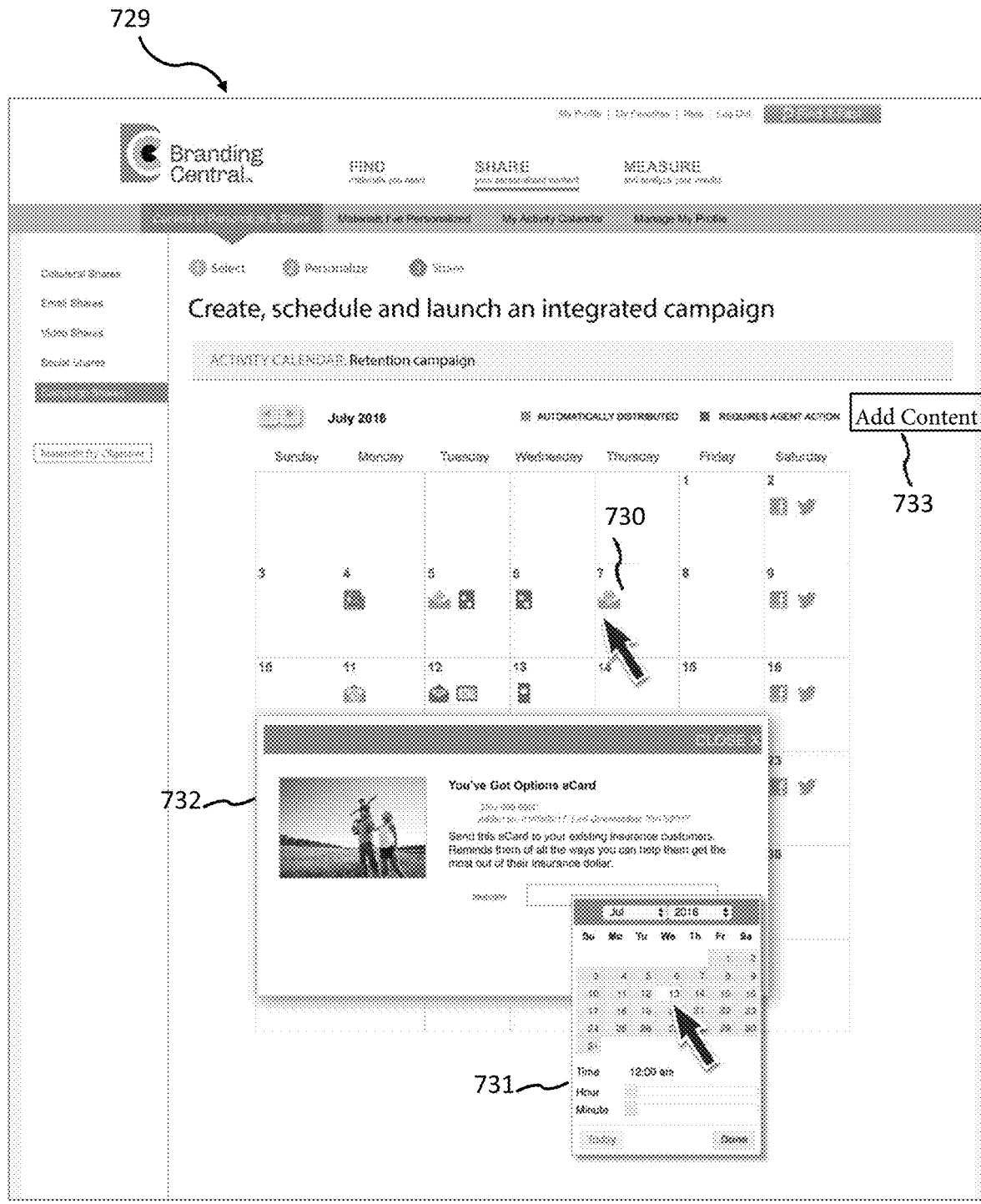
FIG. 7I is a screen illustration of the User Platform System of FIG. 7A according to embodiments of the present disclosure.
Figure 7J:
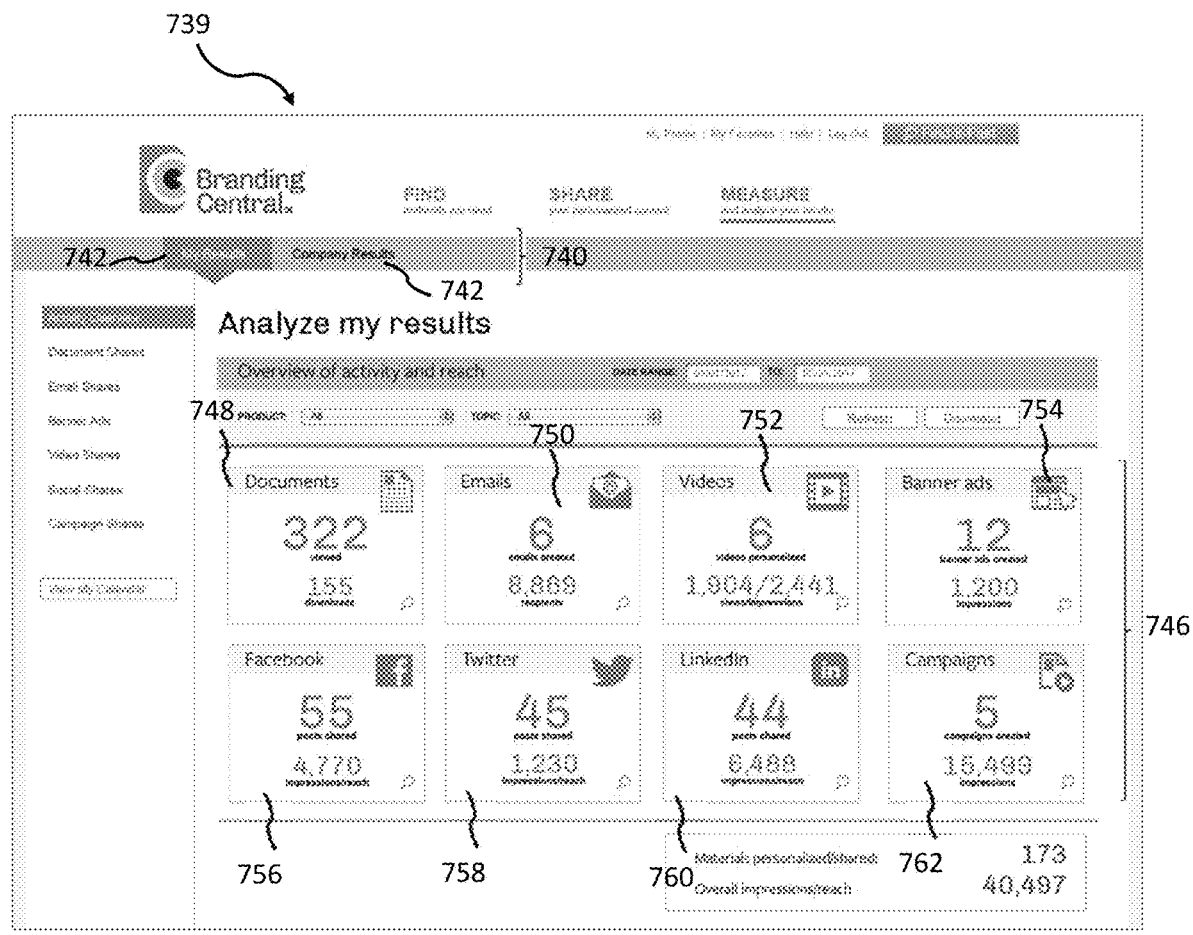
FIG. 7J is a screen illustration of the User Platform System of FIG. 7A according to embodiments of the present disclosure.

FIG. 7I is a view of a screen 729 of the UPS of FIG. 7A. The screen 729 in FIG. 7I depicts a calendar view of a campaign after the user has selected a launch date for the campaign. From this calendar view, the user can preview materials, delete and even reschedule individual pieces of the campaign from a preview window 730. Throughout the course of the campaign, users receive automated email reminders of campaign activity. From the view in FIG. 7I, the content item 730 (ecard 730) of the campaign is currently scheduled for Thursday Jul. 7, 2016. However, from the calendar view screen 729 schedule options field 731 the user 218 can reschedule the distribution of the content item 730 to a different date/time, such as, Jul. 13, 2016. If the user reschedules the content item 730 from this view, the content item 730 will be distributed at the newly scheduled time with the previously personalized content. Alternatively, the user can select the content item 730 and select a link within the preview window 732 to preview and, if desired, change the personalized content of the content item 730. Additionally, from this calendar view 729, the user can select the Add Content button 733.

Users of the UPS of FIG. 7A may have access to a content library screen. From the content library screen, users have access to their personal library of materials/content that they previously personalized, allowing them to leverage existing content with new audiences. Their personal content library can be refined using a variety of filters available on, for example, the left of the screen. In addition, above the results, users have access to additional sorts such as keyword, sort by date ascending/descending, sort by alpha ascending/descending, and the like. From the library of personalized materials, the user can determine when an item was last shared and across which channel. Users also have ready access to previews, the ability to quickly share the item again, and any metrics resulting from its use.

FIG. 7J is a view of a screen 739 of the UPS of FIG. 7A. The screen 739 in FIG. 7J shows an exemplary User Level Activity Overview dashboard. The dashboard is sortable by date range, product and topic. However, the type of sort filters can be tailored based on the needs of the client (e.g. admin 210). From the view in FIG. 7J, a roll-up of each share type, e.g., documents, emails, videos, and the like, is displayed, giving the user high-level activity insights across share types from a single dashboard. More detailed analytics are readily accessible to the user by selecting individual results modules or by selecting the share type from the left-hand navigation menu.

Figure 7K:
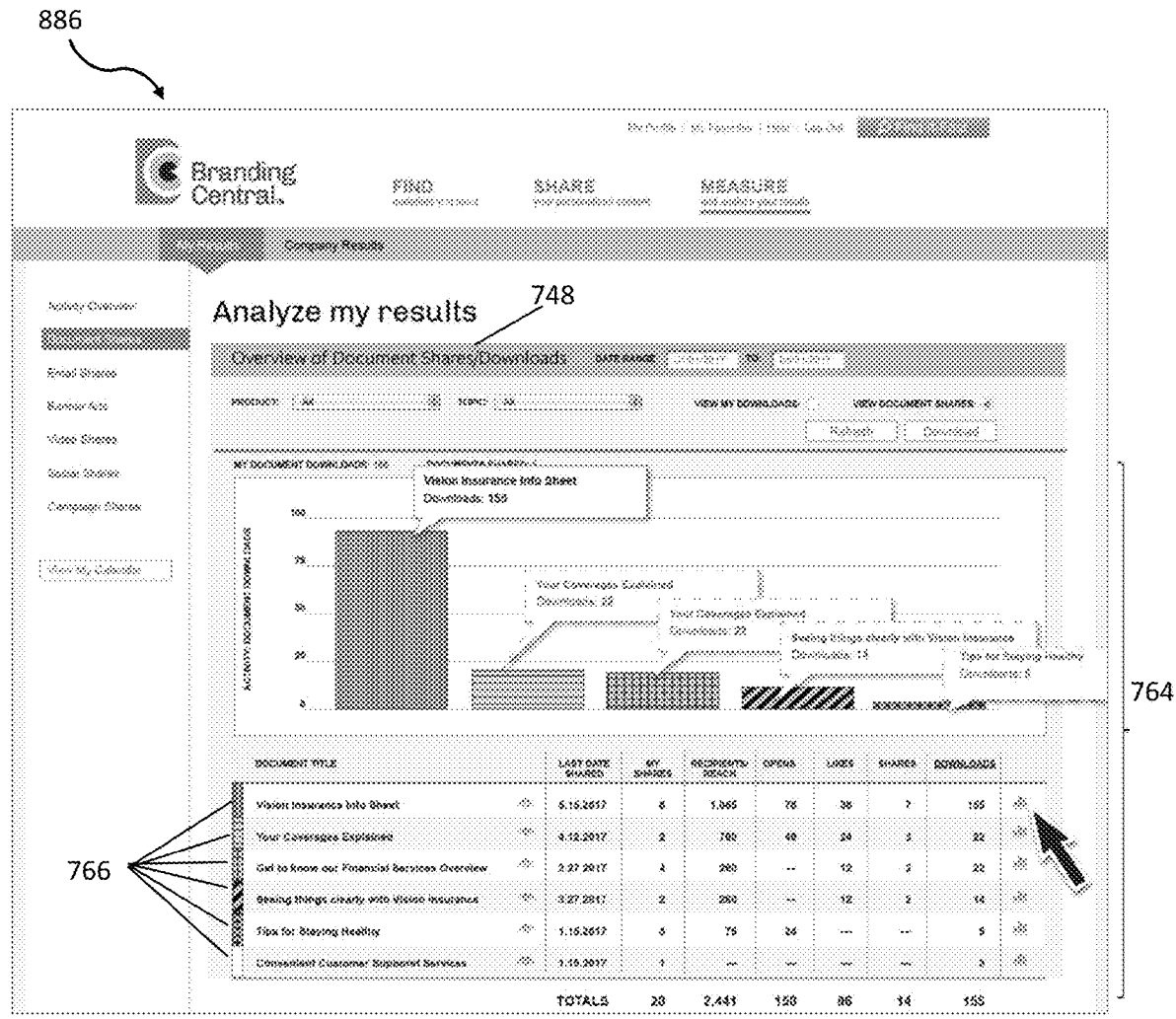
FIG. 7K is a screen illustration of the User Platform System of FIG. 7A according to embodiments of the present disclosure.

FIG. 7K is a view of a screen 886 of the UPS of FIG. 7A. The screen 886 in FIG. 7K depicts the User Level Activity Overview all for document shares 748. This view is accessible from either the individual results modules or by selecting the share type from the left-hand navigation menu. The report 764 is sortable by date range, product and topic. However, the type of sort filters can be tailored based on the needs of the client (e.g. set by the administrator 210 in the CMS 206). From this view, a list of all documents 766 shared during the time date range selected are displayed. The list can be re-ordered by selecting the column headers, e.g., opens, likes, shares, and the like. The bar graph displays the top five records from the active column sort. As the user mouses over each bar, the actual material title and count is displayed. The user can "drill-down" for more detailed analytics for each title by selecting a specific record.

Figure 7L:
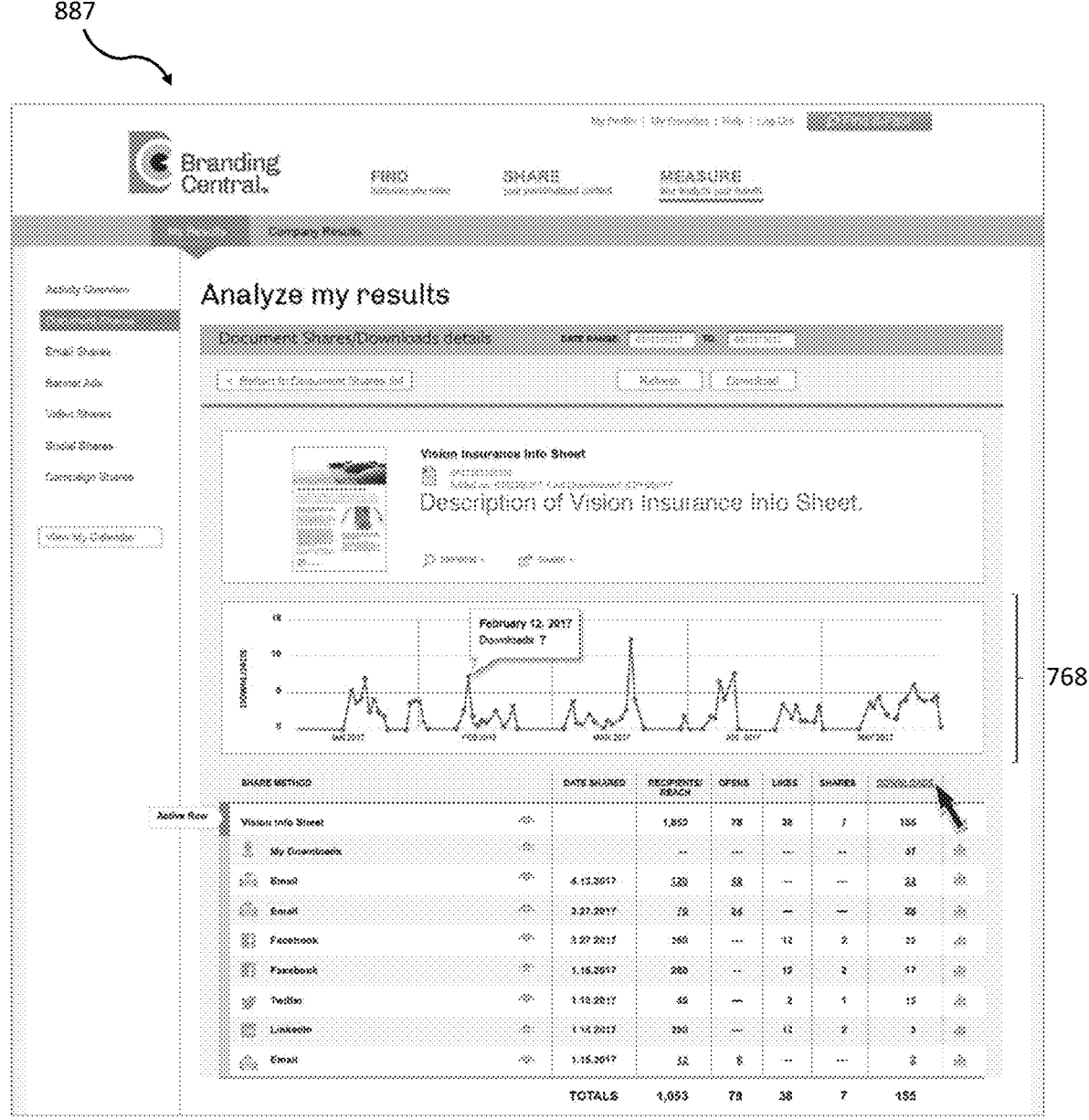
FIG. 7L is a screen illustration of the User Platform System of FIG. 7A according to embodiments of the present disclosure.

FIG. 7L is a view of a screen 887 of the UPS of FIG. 7A. The screen 887 in FIG. 7L depicts the User Level Activity drill-down details for a specific document by selecting a specific record from the previous screen. The report is sortable by date range, product and topic. However, the type of sort filters can be tailored based on the needs of the client (e.g. admin 210). This view provides users with a description of the piece/content item being displayed. In addition, the user can preview the actual personalized piece that was shared. From this view, a list of all share channels executed for a single material is displayed; the list can be re-ordered by selecting the column headers, e.g., opens, likes, shares, and the like. The line graph displays actions over time. As the user mouses over each data point, the date and Key Performance Indicator (KPI) count is displayed. In this case, the line graph depicts downloads resulting from all activity including direct downloads and downloads resulting from shares across all channels e.g., email Facebook, Twitter, LinkedIn, and the like. The user also has the option to share the content again, right from this screen.

Figure 7M:
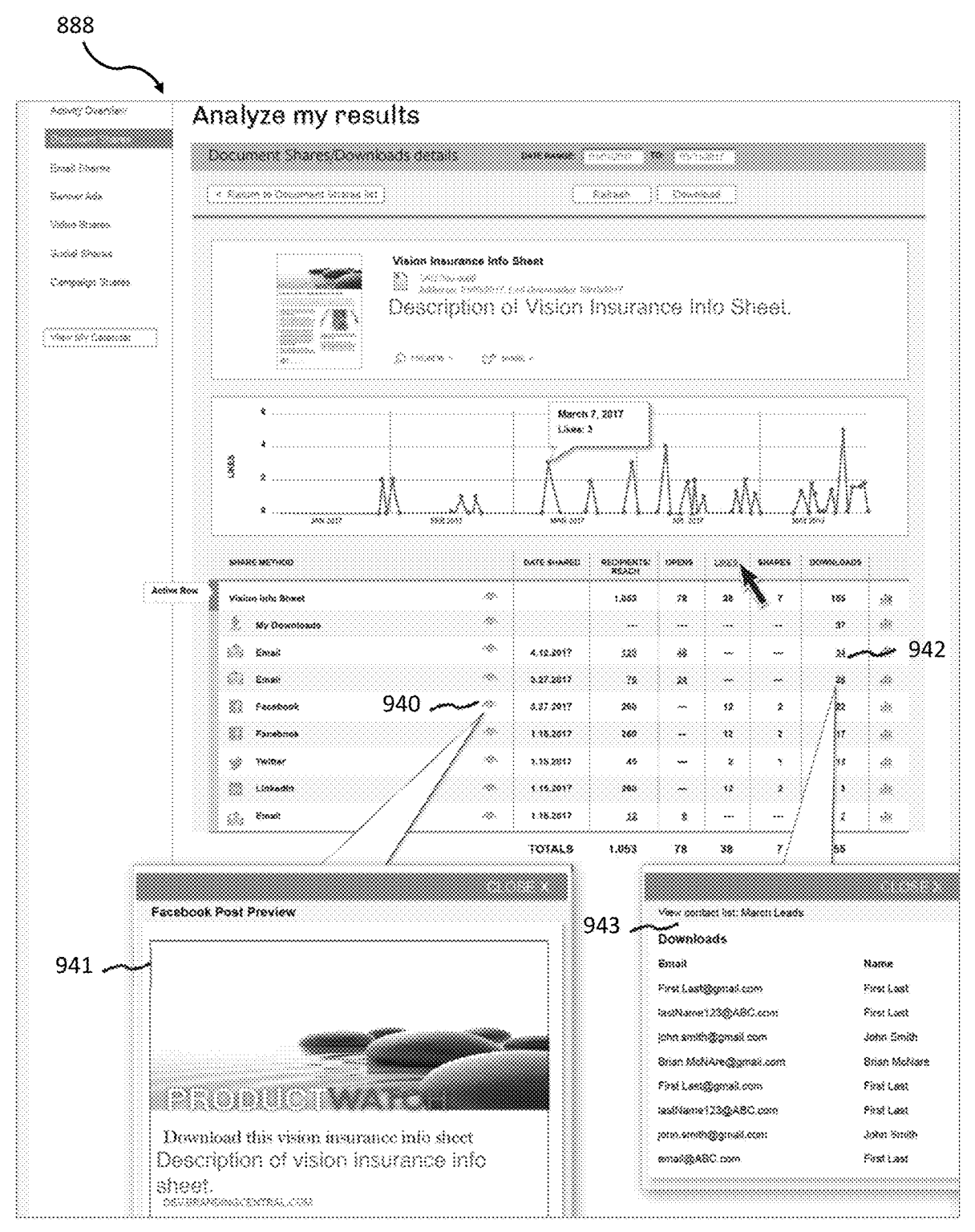

FIG. 7M is a screen 888 of the UPS of FIG. 7A. The screen 888 in FIG. 7M depicts how the line graph updates when a different column is selected in the table. In this case, "likes" is selected. The change in the vertical graph axis as well as the KPI ("likes") noted in the mouse-over call out box. Also, from all tables, the "eye" icon 940 allows users to access a preview window 941 of the channel creative content item sent, e.g. via email, Facebook post, Tweet, and the like, and email distribution lists, opens, and the like are accessible from live link text (see underlined numbers). Additionally, users can select a data item 942 in the report and a preview window 943 displaying detailed results of the selected data item 942 is generated and displayed to the user, e.g. list of what contacts downloaded the content shared on that day.

Figure 7N:
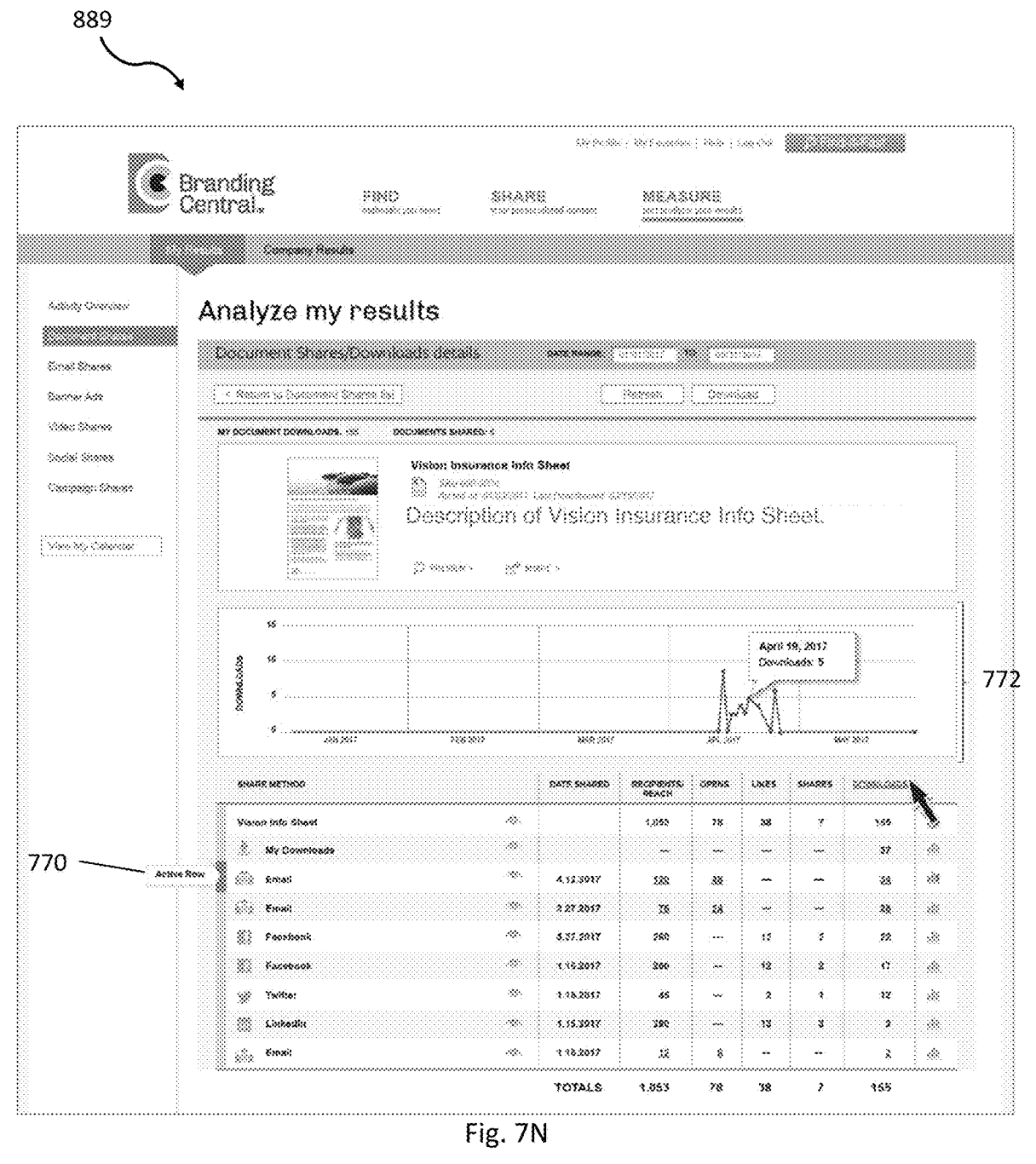

FIG. 7N is a screen 889 of the UPS of FIG. 7A. The screen 889 in FIG. 7N depicts how the line graph updates when a specific channel (row) in table selected indicating the dates and total downloads resulting from a specific channel or share. In this case, "email" is selected.

While FIGS. 7H, 7I, 7J and 7K have been shown and described as providing a platform for displaying metrics for document shares, it should be readily understood that UPSs according to the present application may be similarly configured to for other channel and content types. For example, UPSs may be configured for email shares, banner ads, video shares, social shares, campaign shares, and the like. Because campaigns occur over time, many items columns may display two indicators, for example, how many pieces are included in the campaign versus how many have been executed or completed.

Figure 7P:
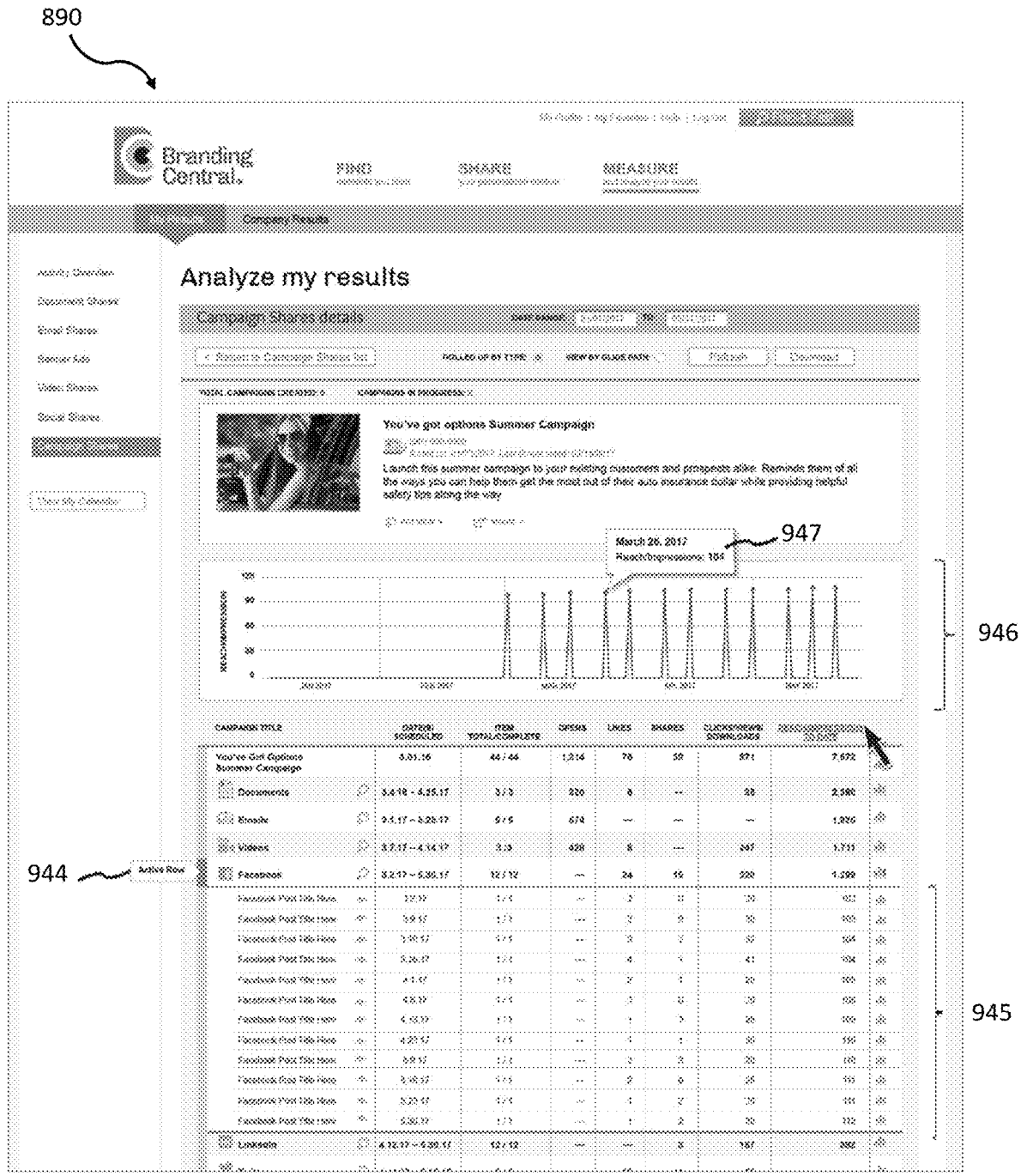
FIG. 7P is a screen illustration of the User Platform System of FIG. 7A according to embodiments of the present disclosure.

FIG. 7P is a view of a screen 890 of the UPS of FIG. 7A. The screen 890 in FIG. 7P depicts an expanded state of a screen showing User Level Activity Overview of a selected campaign. This view illustrates the detailed or "expanded" view that is made available when a specific channel is selected—in this case the Facebook channel 944. Because a campaign is comprised of many items that are executed over time, this expanded view displays all of the individual Facebook posts 945 that are part of the campaign and their share dates. The line graph 946 displays actions over time. In this case, the line graph 946 is showing distributed items "rolled-up" by type. As the user mouses over each data point in the line graph 946, the date and KPI count 947 is displayed. The term "Reach/Impressions" for the dated KPI count 947, is channel specific. In the case of Facebook, the term "Reach/Impressions" may refer to the actual number of followers at the time of the post. In the case of email, it may refer to the number of recipients in the distribution list. The user also has the option to launch this specific campaign from this screen 890.

Figure 7Q:
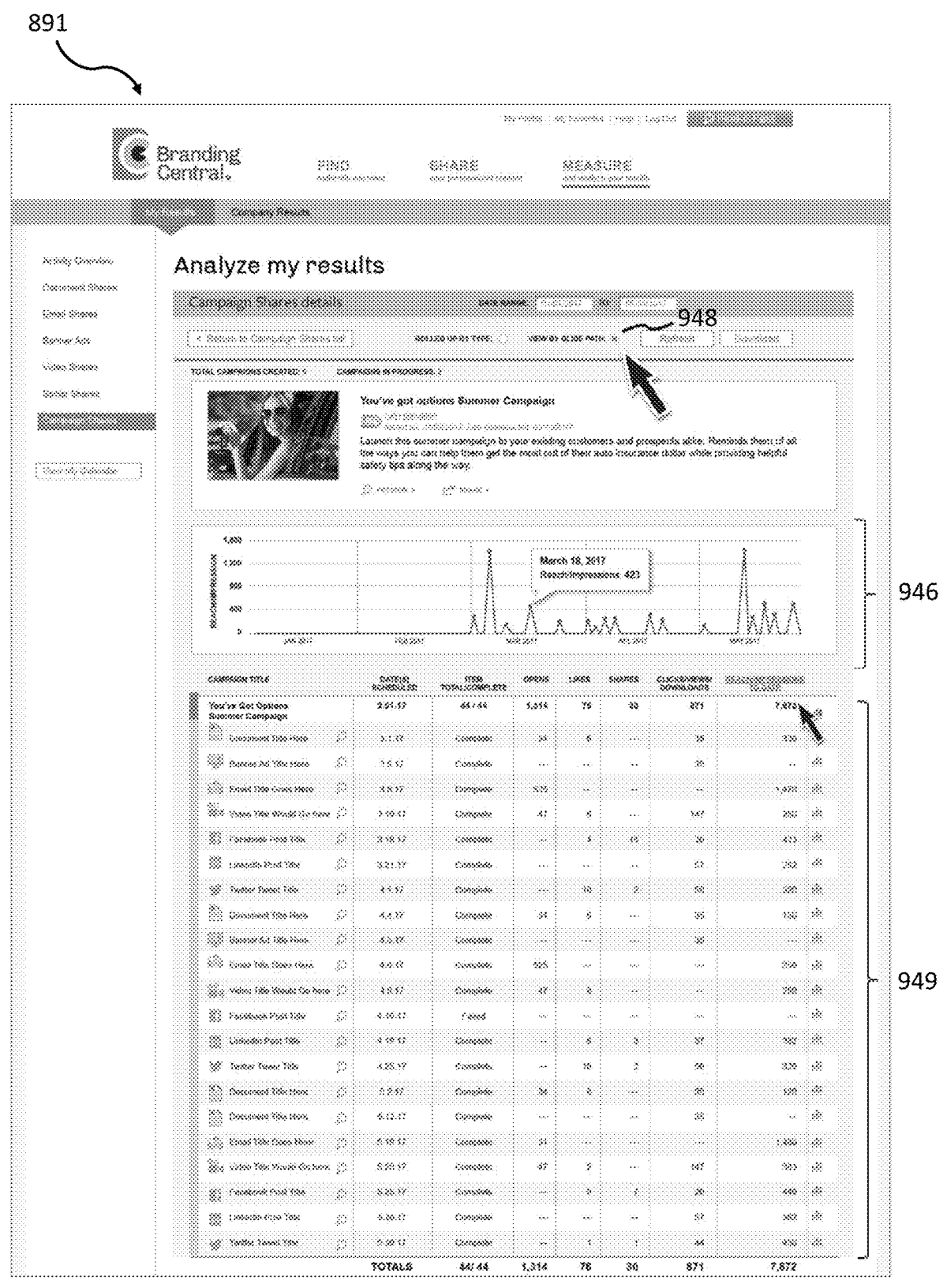

FIG. 7Q is a view of a screen 891 of the UPS of FIG. 7A. The screen 891 in FIG. 7Q depicts how the line graph 946 (FIG. 7P) updates when viewed by "glide path" 948 or sequentially versus rolled up by material type (as shown in FIG. 7P). When viewed by channel as discussed above in connection with FIG. 7P, each channel is "rolled up," providing the user an aggregate of all activity and engagement in a single channel while still giving them the ability to drill down to specific materials within those channels. When viewed by "glide path," all the individual items 949 that comprise the campaign are listed sequentially by the date they are executed or schedule to execute.

Figure 7R:
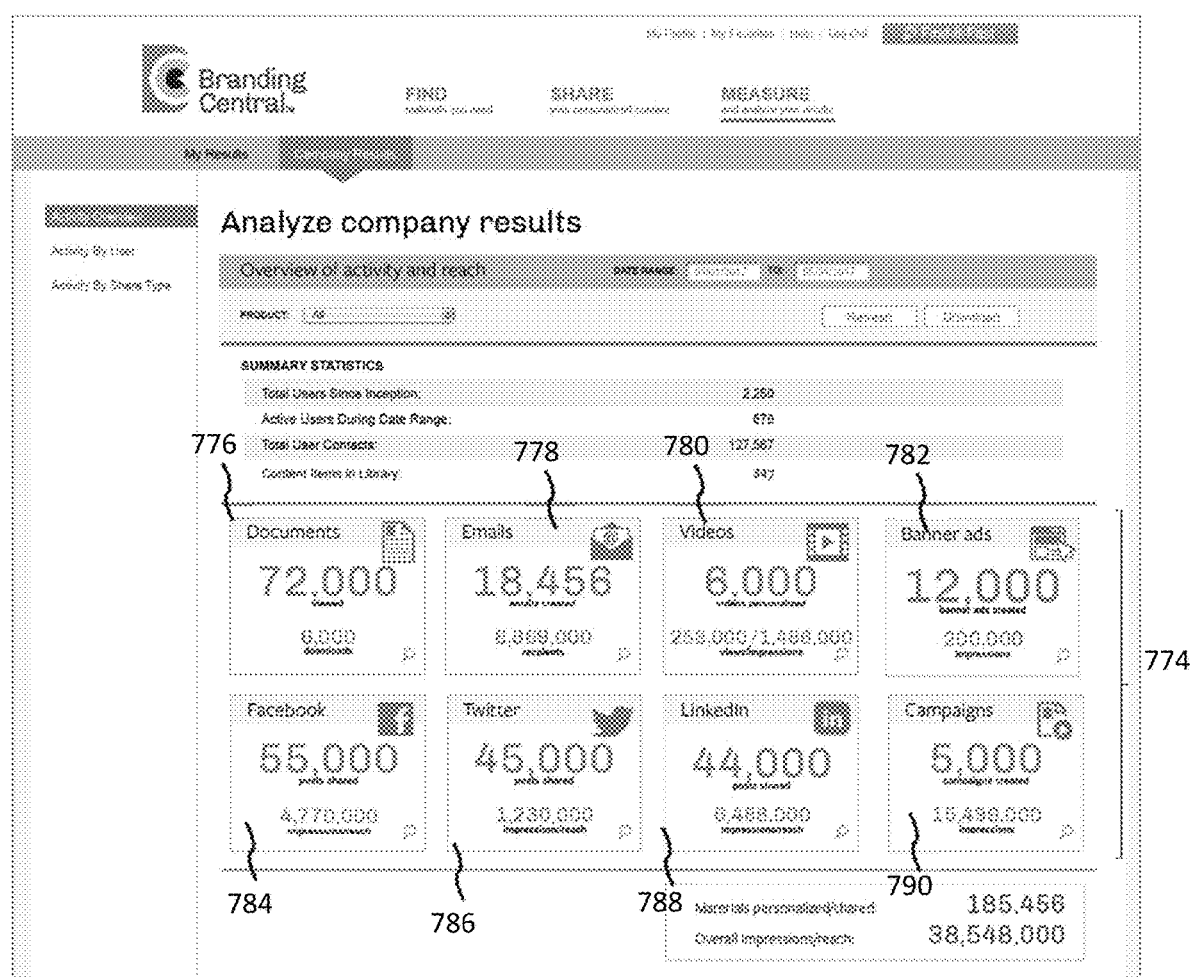
FIG. 7R is a screen illustration of the User Platform System of FIG. 7A according to embodiments of the present disclosure.

FIG. 7R is a view of a screen 892 of the UPS of FIG. 7A. The screen 892 in FIG. 7R depicts the Admin/Company Results Level Activity Overview dashboard. The dashboard is sortable by date range, product and topic. However, the type of sort filters can be tailored based on the needs of the client (e.g. admin 210). From this view, the administrator 210 is presented summary statistics that include, total users, active user during the date range, total contacts, and the total number of items in the library. From the dashboard view, an aggregate of each share type, e.g., documents, emails, videos, and the like, across all users are displayed, providing the user high-level company-wide utilization data across share types from a single dashboard. The UPS can also be configured for data across a predetermined subset of the company. More detailed analytics/results are readily accessible to the user by selecting the individual results modules or by selecting the Activity by User by Share Type from the left-hand navigation menu.

Figure 7S:
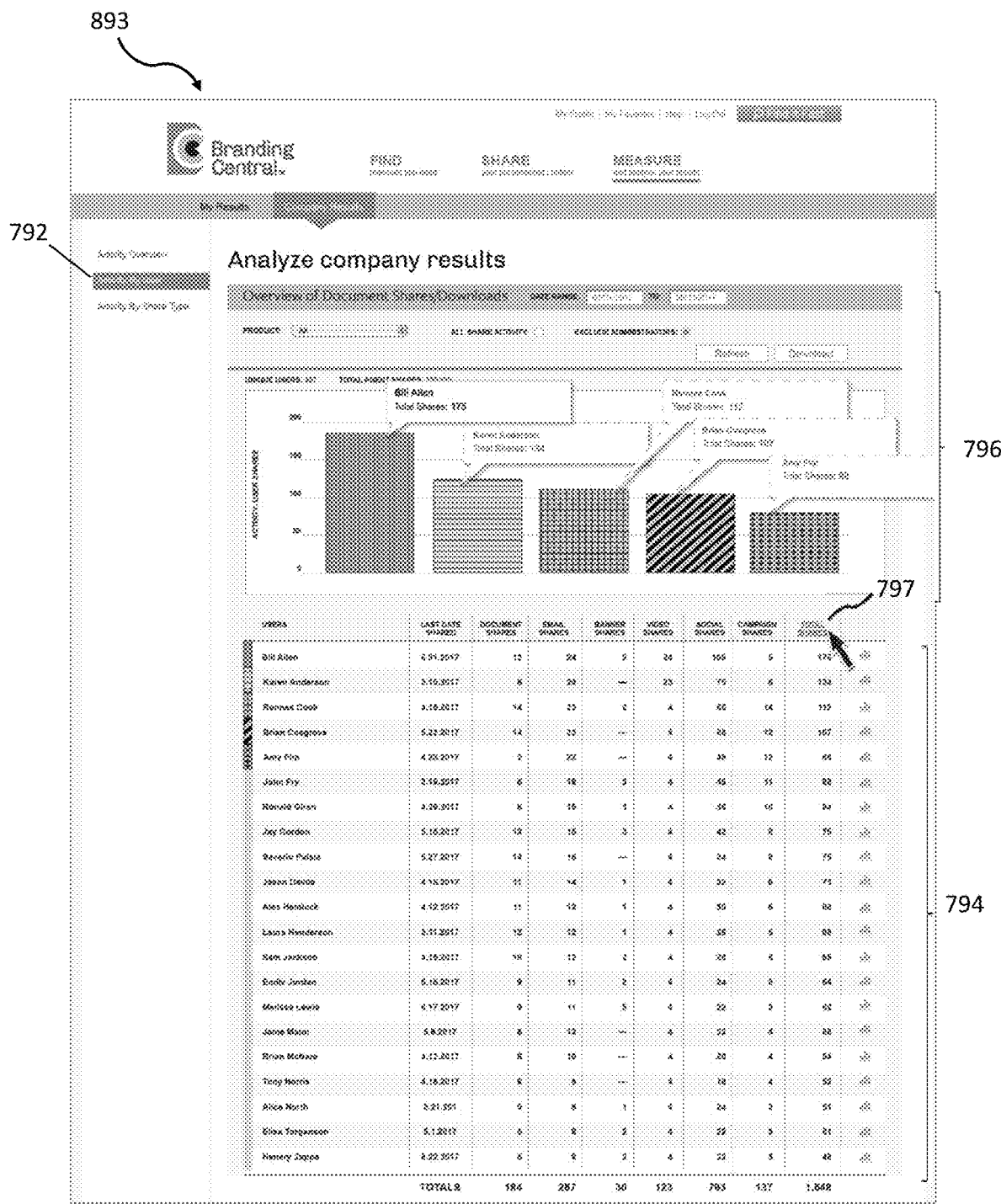
FIG. 7S is a screen illustration of the User Platform System of FIG. 7A according to embodiments of the present disclosure.

FIG. 7S is a view of a screen 893 of the UPS of FIG. 7A. The screen 893 in FIG. 7S depicts the Company Results 742 (FIG. 7J)>Activity by User 792. The report is sortable by date range, product, and topic. However, the type of sort filters can be tailored based on the needs of the client (e.g. admin 210). From this view, a list 794 of all activity by users during the time and date range selected are displayed. The list can be re-ordered by selecting the column headers. The bar graph 796 displays the top five users from the active column sort, in this case, total shares 797. As the administrator 210 mouses over each bar, the actual user name and total share count is displayed. The user can "drill-down" for more detailed utilization data for each user by selecting their specific record.

The UPS may also generate a screen depicting Company Results>Activity by Share Type (not shown). The report provided in this screen is sortable by date range, product, and topic. However, the type of sort filters can be tailored based on the needs of the client (or admin 210 or user 218). From this report, a list of all titles from a specific share type across all users during the time/date range selected may be displayed. The list can be re-ordered by selecting column headers. A bar graph (not shown) may be displayed displaying the five (or any other number) top content items from the active column sort (e.g. downloads). As the administrator 210 mouses over each bar in the bar graph, the actual document title and total KPI count is displayed. The user can "drill-down" for more detailed utilization data for each title by selecting the specific record. This display screen format is similar to the screen 886 shown in FIG. 7K (with table and bar graph 764) except the data would be for all users (or a predetermined group thereof).

The UPS may also generate a screen (not shown, but similar to FIG. 7P) depicting Company Results>Activity by Share Type drill-down>Document Shares for a specific document by selecting a specific record from the screen depicting Company Results>Activity by Share Type. The report provided in this screen is sortable by date range, product, and topic. However, the type of sort filters can be tailored based on the needs of the client (e.g. admin 210). Once a document has been selected, the view provides a list of users that have used the specific material during a given date range. In addition, the administrator 210 can preview the piece shared. From this view, the administrator 210 can drill-down even further for more information by selecting a user name, at which point, user level share/usage data is displayed. A line graph displays all actions over time even when viewing individual user data. As the administrator 210 mouses over each data point, the date and KPI count is displayed. This screen may be generated for any channel or document type.

A screen (not shown) depicting the Company Results>Activity by Share Type>Email Shares may be generated and displayed. From this screen, a report is displayed that is sortable by date, range, product, and topic. However, the type of sort filters can be tailored based on the needs of the client (e.g. admin 210). From this view, a list of all titles from a specific share type across all users during the time date range selected are displayed. The list can be re-ordered by selecting column headers. A bar graph may be displayed that displays the five (or any other number) top emails from the active column sort (e.g. recipients). As the administrator 210 mouses over each bar, the actual document title and total KPI count is displayed. The user can "drill-down" for more detailed utilization data for each title by selecting the specific record.

The UPS may be configured to provide drill-down details for a specific email by selecting a specific record from a previous screen. Once an email has been selected the view provides a list of all users that have used the specific material during a given date range. In addition, the administrator 210 can preview the piece shared. From this view, the administrator 210 can drill-down even further for more information by selecting a user name (e.g. John Fry) at which point, user level share/usage data is displayed. A line graph (not shown) displays all actions over time even when viewing individual user data. As the administrator 210 mouses over each data point, the date and KPI count is displayed. The UPS can similarly do the same for Video Shares.

The screens not shown but described above are provided in the commonly owned Provisional Patent Application No. 62/475,673, filed Mar. 23, 2017, which is herein incorporated by reference in its entirety to the extent needed to understand the present disclosure.

Figure 8:
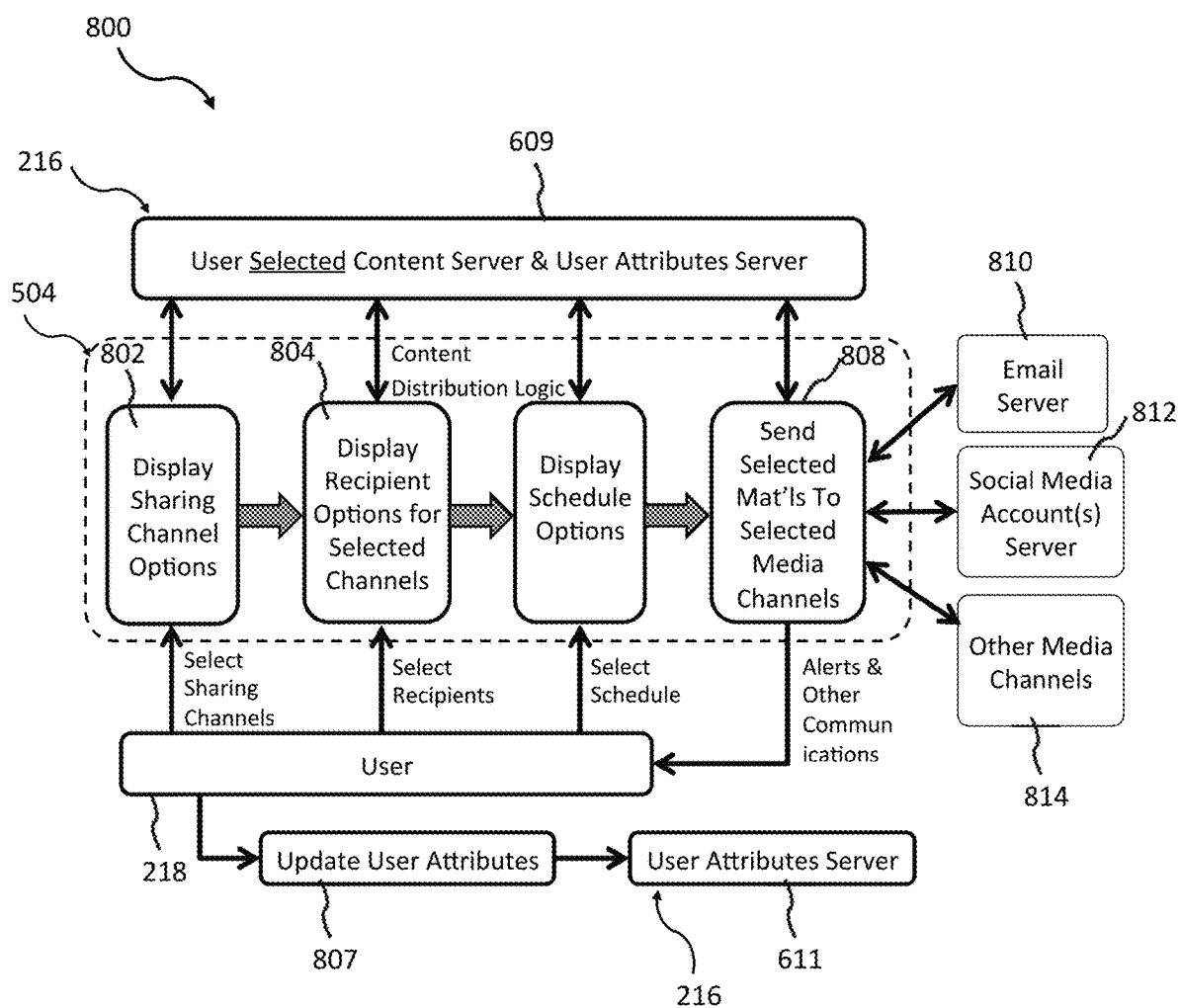
FIG. 8 is an overview of logic that may be used to provide the Content Share/Distribution of the User platform logic, in accordance with embodiments of the present disclosure.

FIG. 8 is a block diagram 800 showing logic components that may be used to implement the Content Distribution Logic 504 (FIG. 5A), and example iterations with the user 218, data exchanges, actions or results, and interactions with certain servers, e.g., user content and user attribute servers, some of which are also shown/described in the flow diagrams 533 (FIG. 5D) and 547 (FIG. 5E), and may also be referred to herein as "share/distribution." Referring to FIG. 8 (and FIG. 5D, FIG. 5E, and FIGS. 7D-7I) the logic 504 at block 802 displays sharing channel (or distribution channel) screen options (e.g. FIG. 7D) to the user 218 for various media distribution channels (e.g., email, Facebook, twitter, LinkedIn, and the like) to share the selected content. Next, at block 804, the logic 504 displays recipient options (e.g. FIG. 7E, 727) for the user-selected distribution channels (e.g. FIG. 7E, email), and the user selects the desired recipients for the selected channels (e.g., from contact lists, email lists, and the like). The distribution channels may be digital channels, and may also be other media channels, such as radio or TV ads, or the like, which can be identified/selected by the user and the platform will send reminders or alerts to the user to prompt the user to launch the various other media channel distribution (as discussed herein). Next, at block 806 the logic 504 displays a schedule or calendar (e.g. FIG. 7F, 728) for selecting a distribution schedule for the selected content in the selected channels, and the user selects the desired distribution schedule. Next, at block 808 the logic 504 sends the selected materials to the selected media channels at the scheduled times/days. In particular, examples of distribution channels include email, social media, and any other desired digital media channels, in which the case the logic 504 and/or block 808 would communicate with one or more email servers 810, social media servers 812, and any other digital media distribution channels/servers 814, to provide the selected content items at the scheduled date/time to the selected channels, as described herein. In addition, block 808 may provide the user 218 with alerts, such as pre-distribution messages (as described with FIGS. 5E and 10), and any other messages communications or alerts that may be needed, desired or required by the user 218 or administrator 210. For each of the blocks 802-808 the logic 504 may access, as needed, to read or write, content or data to the "selected" content server 609 and/or the User Attributes Server 611. In addition, the logic 504 may at block 807 update the User Attributes Server with information/data about the user distribution selections or other information/data or updates about the user for future use, similar to that described herein, e.g., with FIG. 6, block 607.

FIG. 9 is a block diagram 900 showing logic components that may be used to implement the Results Measurement and Display Logic 506 (FIG. 5A), and show example interactions with the user 218, or data exchanges, actions, or results, and interactions with certain servers, e.g. Results Server, some of which are also shown/described in the flow diagram 506A (FIG. 5F), and may also be referred to herein as "Measure and Analyze" or "Measure." Referring to FIG. 9 (and FIG. 5F and FIGS. 7J-7S) the logic 506 includes Results Collection Logic 902 which receives data from selected media channels, e.g., email, social media, and the like. The Results Collection Logic 902 collects, categorizes and sorts the data so it can be displayed in the various forms and formats described herein and may store the data on a Results Server 906. The logic 506 at block 904 also displays results measurement viewing options (FIG. 7J, 739A) to the user 218 for results from various media distribution channels (e.g., email, Facebook, twitter, LinkedIn, and the like), and may also at 908 display a default top-level screen (or "Dashboard") of results (FIGS. 7J and 7R), obtained from the Results Server 906 for user or admin, respectively, and the user selects the desired detailed view (or visualization) of the results. Next, at block 910, the logic 506 obtains the user-selected results data from the Results Server 906 (and reformats it as needed) and displays the user-selected detailed results (FIGS. 7K-7Q and 7S) for user and admin, respectively, in the user-selected views.

Also, the present disclosure may be used with any companies or organization in any industry that wants to distribute and manage content for brand awareness/exposure and/or brand marketing management. Also, the platform of the present disclosure will work with organizations having single-level or multi-level sales or marketing structures, such as principal/agent, franchisee/franchisor, corp parent/subsidiary, and the like.

Also, the graphs and images shown herein are for illustrative purposes, and may use sample numbers or language, and may not be indicative of actual data or actual language. Further, the functions of find, personalize, share and measure, may be viewed individually or grouped in various ways for illustrative purposes. For example, find and personalize content may be viewed together for convenience as in FIG. 6, or personalize and share may be shown together described herein; however, the overall performance and functionality does not change from that described herein. Further, the administrator 210 may also use the user platform to view top level or company results.

Figure 10:
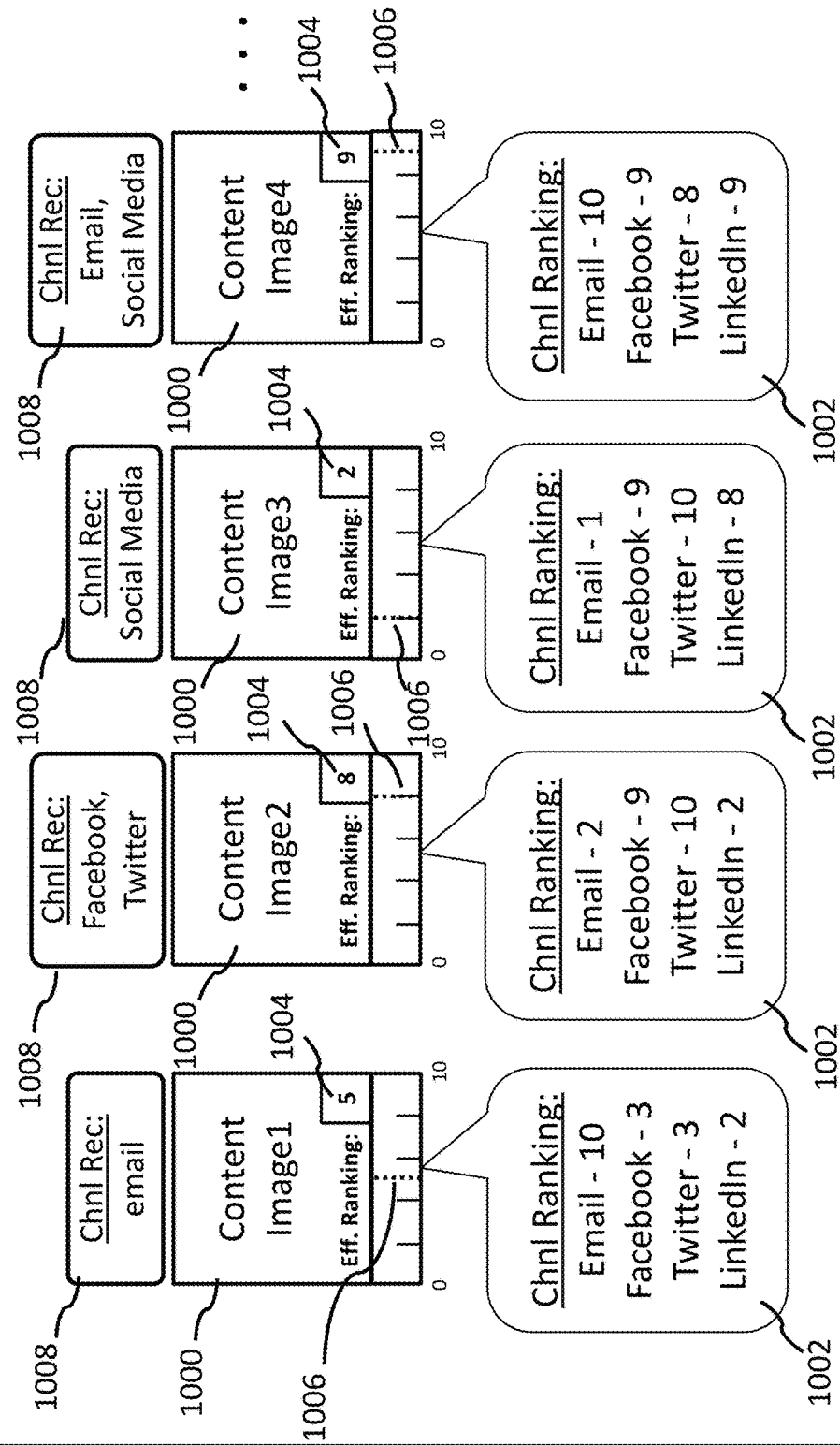
FIG. 10 is a screen illustration of content ranking and/or recommendations for selected content that was distributed via various media channels, which may be provided by a user platform system, according to embodiments of the present disclosure.

FIG. 10 is a screen illustration of content ranking and/or recommendations for selected content that was distributed via various media channels, which may be provided, in some embodiments, by the platform of the present disclosure. Referring to FIG. 10, for example, when the user goes to the user's content library, the previously used content images 1000 (e.g., Content Images1-4) may appear on the screen.

When the user mouses over an image 1000, a pop-up box 1002 may appear showing a ranking of the performance of that particular content piece 1000 for each of the media channels used. The ranking may be based on various factors a determined by the platform and/or the user or administrator 210, and may include utilization, engagement, or other factors. In this case, the ranking may be on a scale of 1-10, 10 being the best performance and 1 being the lowest, or in list order, where it may be displayed in descending order from highest performance to lowest, or displayed in ascending order from lowest performance to highest. In some embodiments, an effectiveness ranking may be displayed that provides an indication to the effectiveness of the content image 1000 for a selected goal/objective and/or strategy. The effectiveness ranking may be shown as a number 1004 and/or a visual depiction such as a meter 1006. The effectiveness ranking 1004, 1006 may be based on results from prior distribution(s) of the user 218 and/or a group of users 218. Based on the ranking 1002 (and/or effectiveness ranking 1004, 1006 and/or other factors if desired), a recommendation 1008 may be provided by the platform for each content piece, which may appear as a box above the content image 1000. In the example shown in FIG. 10, Content Image1 1000 has a recommendation of email only, as the performance of social media for that image was very low. Also, Content Image2 1000 has a recommendation of only Facebook and Twitter, based on the performance of those channels. Content Image3 1000 has a recommendation of all social media channels but not email, and Content Image4 1000 has a recommendation of email and all social media channels. Other factors may also be taken into account for the ranking and/or recommendations, or they may be provided as a separate informational pop-ups or indicators associated with the piece, such as direct customer feedback, amount of investment in the content piece, staleness (how long a piece has been active), age group popularity, or other factors. This may also be used for campaigns, where ranking and/or recommendations may also be made regarding timing or releases and the like.

Also, as discussed hereinbefore, the Results Analysis and Recommendation logic may, in some embodiments, assess the results and identify whether a campaign should be adjusted to optimize results for a given user or organization. For example, additional content pieces may be added if the results from this user or other users with similar conditions and other applicable attributes have benefited from such a change. The present system may be constantly learning from the results data to improve or optimize a campaign or content recommendations. Such learning or optimization may be done by known machine learning, expert systems, predictive analytics/modeling, pattern recognition, mathematical optimization, learning algorithms, neural networks or any other techniques and technology that enable the results data provided to the user to improve the results over time. In particular, Results Analysis and Recommendation logic may receive positive and negative results data from various users, and use that data to train the logic to identify what parameters work best for users with certain input characteristics. Such correlations, or predictions, or classifications may be learned over time by the logic of the present disclosure, using machine learning techniques and classifiers, such as support vector machines (SVMs), neural networks, decision tree classifiers, logistic regression, random forest, or any other machine learning or classification techniques that perform the functions of the present disclosure. This would also apply for the use of a given single piece of content, and the composition, timing, and number of the content pieces in a given campaign.

As discussed hereinbefore with the pre-distribution logic 547 (FIG. 5E) FIG. 12 is a view of an exemplary pre-distribution message 1200 (or notification email) according to embodiments of the present disclosure. The pre-distribution message 1200 may be distributed by a plurality of different forms of communication such as email, text message, platform notification message or any other form of digital communication provided to the user 218. The UPS 214 (FIG. 2) may send notification emails 1200, and/or push notifications via a mobile application, for any scheduled distribution of a content item by the UPS 214 and/or for, as discussed above, throughout the course of a campaign for reminding the user of any campaign activity that are scheduled for that day. In the case of a campaign, the notification email 1200 may provide the campaign title, date created, number of items pending, and the number of pieces executed (or items distributed). In addition, a link to each item that is scheduled for distribution that day may be provided. Using the link, the user 218 can preview, reschedule or cancel any item scheduled.

The notification email 1200 also includes a Pre-Distribution Message Notices/Settings section 1250. This section 1250 includes a subsection 1252 that provides an indication as to whether one or more content items scheduled for distribution are not available, for example, due to the content item being obsolete/stale, or not optimal, or the permissions for the user 218 (FIG. 2) to distribute the content item have been changed by an administrator 210 (FIG. 2). From this subsection 1252, the user 218 can replace the scheduled distribution with one or more content items. In some embodiments, the UPS 214 may be configured to automatically remove obsolete/stale, or not optimal content items and replace the content item with a suitable replacement content item. For example, the content item may be replaced with an available content item having the highest effectiveness ranking for the selected objective and/or distribution channel. The notification email 1200 also includes a subsection 1254 that provides a recommendation to replace the content item scheduled for distribution with a different content item based on the ranking of the content items by distribution channel. From this subsection 1254, the user 218 can replace the scheduled content item with the recommended content item. The notification email 1200 also includes a subsection 1256 that provides a recommendation to replace the content item scheduled for distribution with a different content item based on the ranking of the content items based on the objective associated with the scheduled content item. From this subsection 1256, the user 218 can replace the scheduled content item with the recommended content item. The notification email 1200 also includes a subsection 1258 that includes inputs for user preferred options. The user preferred options in this subsection 1258 may be to always replace content items with the most effective (highest ranked) content items, always replace content items with highest ranked distribution channels and/or make all suggested replacements provided in that notification email 1200. The notification email 1200 also includes a "done" button 1260 that will instruct the UPS 214 to perform the distribution of the content item as scheduled, or modified if one or more replacement options are provided by the user in the notification email 1200.

Content items in a notification email 1200 may be provided with a link for the user to preview the content item before its distribution. Some content items stored and/or managed by the platform may be included in the notification email 1200, but the UPS 214 may be unable to physically distribute the content item. For example, if the content item is a phone call (to be placed by the user 218 to a recipient), radio/TV ad, etc. then the content item may be provided with an indicator, such as a broken link and/or red text. In this case, the notification email 1200 serves as a reminder for the user 218 to effectuate the necessary steps to implement or distribute the content item at the appropriate time. Additionally, the notification email 1200 may include materials and/or other instructions for the user 218 to use when implementing or distributing these types of content items. For example, the notification email 1200 may contain a script (attached, linked there in, or provided therein) for the user 218 to reference during a phone call with the intended recipient.

Figure 13:
FIG. 13 is a screen icon key for channel/format icons and action/edit icons according to embodiments of the present disclosure.

FIG. 13 illustrates an exemplary screen icon key according to embodiments of the present disclosure. The icon key 1300 shows a plurality of images and their corresponding meaning within the context of embodiments discussed herein. The icons displayed by a CMS 206 and/or UPS 214 (FIG. 2) according to the present disclosure may be configured for aesthetic and/or utility purposes. Other symbols or Icons may be used if desired.

Figure 11:
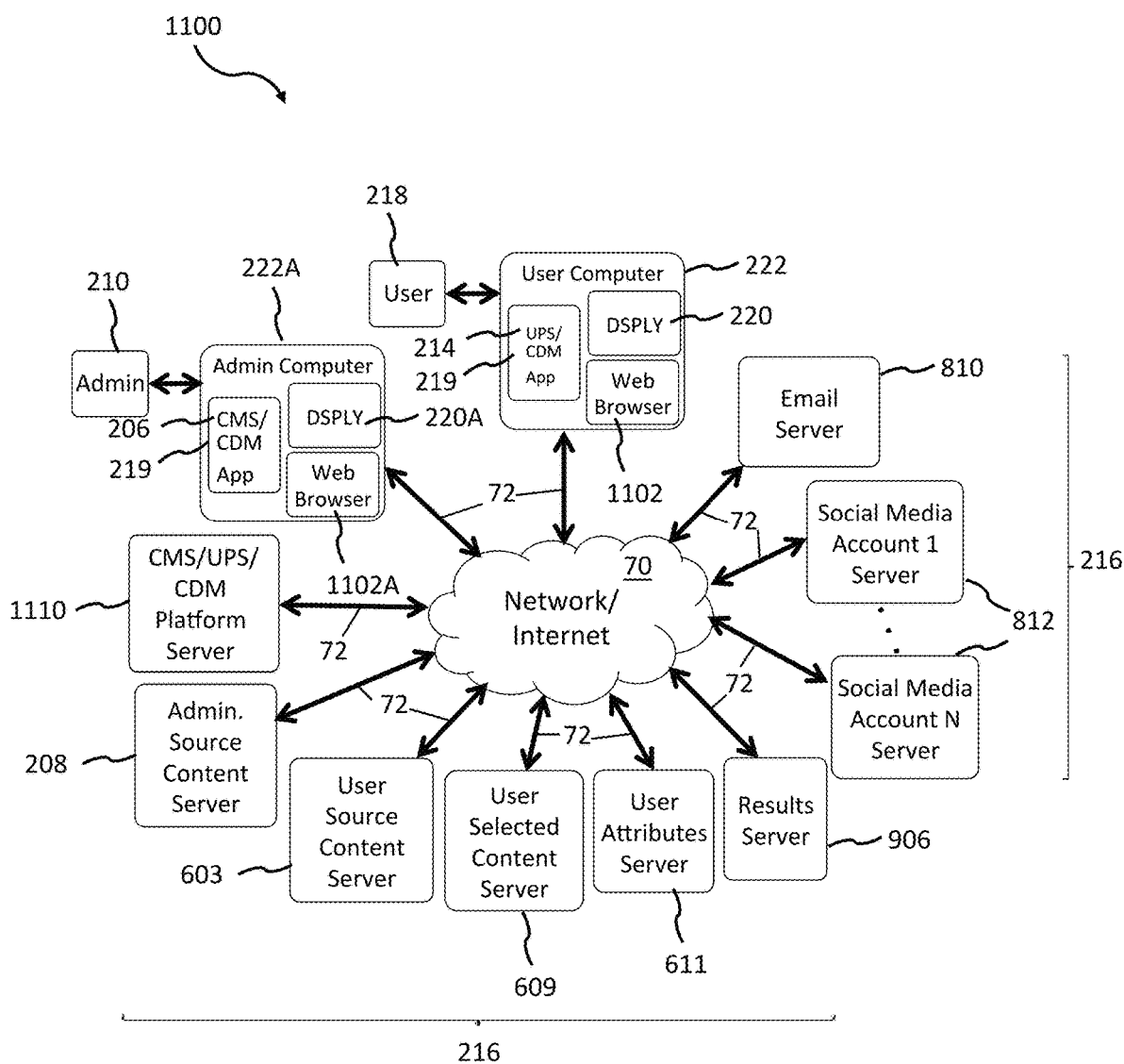
FIG. 11 is a block diagram of various components of the system of FIG. 2 in a network environment according to embodiments of the present disclosure.

Referring to FIG. 11, the present disclosure may be implemented in a network environment 1100. In particular, FIG. 11 illustrates a top level block diagram of various components (or devices or logic) of an embodiment of a system of the present disclosure, which includes one or more user computers 222, an administrator computer 1104, an email server 810, one or more social media account servers 812, and various other servers 216, 1110 that interact with the user computer 222 and/or administrator computer 1102 to perform the functions described herein. Also the user computer 222 and admin computer 222A may be the same computer, and there may be a plurality of users 218, each of which interact with a respective user computer 222, where in some embodiments the user 218 may be an administrator 210 having special privileges. Also, a given user 218 may be associated with one or more computers (or computer-based devices) 222.

The user computer 222, the administrator computer 1102, the email server 810, the social media account servers 812, and the various other servers 216, 1110 (such as a CMS/User Platform Server 1110, Admin. Source Content Server 208, User Source Content Server 603, User Selected Content Server 609, User Attributes Server 611, and Results Server 906) may each be connected to or communicate with each other through a communication network 70, such as a local area network (LAN), wide area network (WAN), virtual private network (VPN), peer-to-peer network, or the internet, by wired or wireless transmission links, as indicated by sold bi-directional arrow lines 72, by sending and receiving digital data over the communications network 70.

The user computer 222 may have the User Platform Logic (UPS) 214 running thereon (or hosted thereby) which provides various functions as discussed herein, including displaying, searching, and selecting content, distributing content, measuring and displaying results, and analyzing results, as discussed herein. The user computer may also have a web browser 1102 and interface with a display 220 to provide a GUI described more hereinafter. The user computer 222 may also interact with the user 218, which views the User GUI on the display 220 and may provide user information or settings for the User Platform Logic (UPS) 214, as discussed herein. The user 218 may interact with the computer 222 using the display 220 (or other input devices/accessories such as a keyboard, mouse, or the like) and may provide input data to the computer to control certain aspects of the operation of the user platform logic (UPS) 214 running on (or hosted by) the user computer 222 (as discussed herein). The user 218 may be an advertising or marketing person responsible for communicating with current and prospective clients/customers or any other user that may be able to use the information and data provided herein. The user display 220 also interacts with the local operating system on the user computer 222 and any hardware or software applications, video and audio drivers, interfaces and the like, needed to view the visualizations or other output data and display the appropriate user GUI for the user platform logic UPS 214, as described herein.

The administrator computer 222A may have the Content Management System (CMS) 206 running thereon (or hosted thereby) which provides various functions as discussed herein, including displaying, searching, and selecting content, and creating the platform "look and feel" design and functionality, as discussed herein. The admin. Computer 222A may also have a web browser 1102A and interface with a display 220A to provide the Admin. GUI described herein. The administrator computer 222A may also interact with the administrator 210, which views the User GUI on the display 220A and may provide user information or settings for the User Platform Logic UPS 214, as discussed herein. The administrator 210 (similar to the user computer) may interact with the administrator computer 222A using the display 220A (or other input devices/accessories such as a keyboard, mouse, or the like) and may provide input data to the computer to control certain aspects of the operation of the CMS 206 running on (or hosted by) the administrator computer 222A (as discussed herein). The administrator 210 may be an advertising or marketing person responsible for managing others, such as agents and the like, who handle the communication with current and prospective clients/customers or any other user that may be able to use the information and data provided herein. The administrator display 220A also interacts with the local operating system on the administrator computer 222A and any hardware or software applications, video and audio drivers, interfaces and the like, needed to view the visualizations or other output data and display the appropriate Admin. GUI for the CMS 206, as described herein.

As discussed herein, the user and administrator computers 222, 222A, respectively, may communicate with one or more separate computer servers via the network 70 such as the CMS/UPS/CDM Server 1110, Admin. Source Content Server 208, User Source Content Server 603, User Selected Content Server 609, User Attributes Server 611, and Results Server 906. These servers 1110, 216 may be any type of computer server with the necessary software or hardware (including storage capability) for performing the functions described herein. Also, these servers 1110, 216 (or the functions performed thereby) may be located, individually or collectively, in a separate server on the network, or may be located, in whole or in part, within one (or more) of the User or Administrator Computers on the network. In addition, the User and Administrator Computers 222, 222A, the Social Media Servers 812 and the email Server 810, may each communicate via the network 70 with any other network-enabled devices or logics as needed, to provide the functions described herein.

Portions of the present disclosure may be implemented (or distributed) outside the user and administrator computers, as shown by the CMS/UPS/CDM Server 1110. For example, portions of the CMS 206 or the user platform logic 214 may be performed on the administrator computer 222A or user computer 222, respectively, or, in some embodiments, portions may be run remotely or distributed or run-in-parallel by separate computers or processors or processing centers, or clusters (e.g., multiple CPU cores operating in parallel), such as may be provided by Rackspace® or Amazon® web services, or the like.

In some embodiments, the Content Management System (CMS) 206 and the User platform 214 may be configured (individually or together) as completely web-based software applications, which are run through the web browsers on the Admin and User computers, and executed by software located on one or more remote servers, such as the CMS/UPS/CDM Server 1110 (FIG. 11). In that case, there may not be CMS/UPS/CDM software applications loaded on the Admin or User computers 222A, 222, and users 218 and administrator 210 may log into their respective accounts online to access the respective CMS 206 and User platform 214 GUI environments and functionality discussed herein. The CMS 206 and User platform 214 or CDM 219 may also be run as a "Software as a Service" (SaaS). In that case, the CMS/UPS/CDM boxes shown in the Admin and User Computers 222A, 222, respectively, would not be present, and the Admin and User computers may be the same computers or a single computer with multiple users, which hosts the remotely run platform software. The term "platform", or content distribution and measurement (CDM) App or Logic or System as used herein, may be used to collectively represent the Content Management System (CMS) and the User Platform System (UPS) described herein. Also, the CMS ("back-end") and the User Platform ("front-end") may be a single combined software application (e.g. CDM Application 219) having two separate functional components or modules or areas (with separate login access for users and administrators 210), or may be two separate standalone software applications which may run on the computers 222A, 222 or on the CMS/UPS/CDM server 1110.

In addition, the platform or CDM Application of the present disclosure may use various third party services, applications, and/or utilities (some of which may be provided via the network), to perform some of the functions or features described herein, such as PHP programming language (or any other programming language), MySQL database server, Yii MVC framework for PHP, FFMPEG video conversion utility, Zend PHP framework, WKHtmltoPDF to allow PDF generation using open source tool, DataValidation email list validation service, Mailgun email delivery service (also known as MTA, mail transfer agent), Linkpeek service provides screen shot of webpages and provides an image, Wista video hosting provider, Amazon S3 video hosting provider, and/or APIs provided by major social media platforms, e.g., Facebook, Twitter, LinkedIn. Other third party services, applications, and/or utilities may be used if desired provided they provide the functions and performance comparable to that described herein.

The system, computers, servers, devices and the like described herein may be any computer-based device having the necessary electronics, computer processing power, interfaces, memory, hardware, software, firmware, logic/state machines, databases, microprocessors, communication links, displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: desktop computers, tablets, laptop computers, smartphones, smart TVs, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process flow diagrams provided herein indicate one potential implementation, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

The invention claimed is:

1. A computer-based method for providing automatic distribution of digital content, comprising:
   displaying selectable distribution objectives;
   receiving from a user a selection of at least one of the objectives as selected objectives;
   displaying selectable digital content items based on the selected objectives;
   receiving from the user a selection of one of the selectable content items as a selected content item, the selected content item having at least one personalizable field;

updating the personalizable field based on personalized data received from the user corresponding to the selected content item, to create a personalized selected content item;

displaying selectable distribution channel options for the personalized selected content item based on the selected content item;

receiving from the user a selection of at least one of the selectable distribution channel options as selected distribution channels for the personalized selected content item;

receiving schedule data from the user indicative of when the personalized selected content item is to be automatically distributed;

automatically distributing the personalized selected content item to the selected distribution channels based on the schedule data, as a distributed content item; and measuring results of the selected distribution channels for the distributed content item.

2. The method of claim 1, further comprising adjusting the content items displayed based at least on the result.

3. The method of claim 1, wherein the displaying content items includes a ranking for each of the selected content items based on the selected objective selected by the user.

4. The method of claim 1, wherein the distribution channel options comprises at least one of email, social media, radio or television.

5. The method of claim 1, further comprising:
generating a schedule for distribution of one or more of the selected content items; and
distributing one or more of the selected content items according to the schedule.

6. The method of claim 5, further comprising notifying the user to perform activities according to the schedule.

7. The method of claim 5, wherein the generating a schedule is based on the selected content items.

8. The method of claim 7, wherein an administrator predetermines the schedule for at least some of the content items and the generating a schedule is based on the schedule predetermined by the administrator.

9. The method of claim 8, wherein the generated schedule is configured to be modified by the user.

10. The method of claim 1, wherein the content items for the displaying selectable content items is predetermined by an administrator.

11. The method of claim 1, wherein the distribution channels for the displaying distribution channel options is predetermined by an administrator.

12. The method of claim 11, wherein the distribution channels predetermined by the administrator vary based on the selected content items.

13. The method of claim 1, further comprising generating a report for an administrator based on a plurality of distributions of selected content items by a plurality of users, wherein the report can be filtered by selecting, by the administrator, an individual user, or a plurality of users.

14. The method of claim 13, wherein the generating a report is based on activity results of the plurality of distributions.

15. The method of claim 14, wherein the activity results comprises at least one of email opens, clicks, downloads, shares on social media, impressions and views.

* * * * *